(12) United States Patent
Mackenzie et al.

(10) Patent No.: US 11,810,212 B2
(45) Date of Patent: Nov. 7, 2023

(54) ACCESS CONTROLLED DISTRIBUTED LEDGER SYSTEM FOR ASSET MANAGEMENT

(71) Applicant: Koch Capabilities, LLC, Wichita, KS (US)

(72) Inventors: Stephen Mackenzie, Wichita, KS (US); Michael Kruljac, Roswell, GA (US); Tim Davies, Wichita, KS (US)

(73) Assignee: KOCH CAPABILITIES, LLC, Wichita, KS (US)

( * ) Notice: Subject to any disclaimer, the term of this patent is extended or adjusted under 35 U.S.C. 154(b) by 0 days.

(21) Appl. No.: 16/976,523

(22) PCT Filed: Mar. 14, 2019

(86) PCT No.: PCT/IB2019/052097
§ 371 (c)(1),
(2) Date: Aug. 28, 2020

(87) PCT Pub. No.: WO2019/175837
PCT Pub. Date: Sep. 19, 2019

(65) Prior Publication Data
US 2021/0004923 A1 Jan. 7, 2021

Related U.S. Application Data

(60) Provisional application No. 62/643,971, filed on Mar. 16, 2018.

(51) Int. Cl.
G06Q 50/18 (2012.01)
G06F 16/27 (2019.01)
(Continued)

(52) U.S. Cl.
CPC ....... *G06Q 50/184* (2013.01); *G06F 16/2379* (2019.01); *G06F 16/27* (2019.01); *G06N 20/00* (2019.01)

(58) Field of Classification Search
USPC .......................................... 705/310
See application file for complete search history.

(56) References Cited

U.S. PATENT DOCUMENTS

2005/0160084 A1\* 7/2005 Barrett .................. G06Q 10/06
2017/0193619 A1 7/2017 Rollins et al.
(Continued)

FOREIGN PATENT DOCUMENTS

WO WO-2005008403 A2 \* 1/2005 ............. G06Q 10/06

OTHER PUBLICATIONS

Leonidas Aristodemou et al. The state-of-the-art on Intellectual Property Analytics (IPA): A literature review on artificial intelligence, machine learning and deep learning methods for analysing intellectual property (IP) data, World Patent Information, vol. 55, pp. 37-51, ISSN 0172-2190 (Year: 2018).\*

(Continued)

*Primary Examiner* — Michael Young
(74) *Attorney, Agent, or Firm* — ALSTON & BIRD LLP

(57) ABSTRACT

Various embodiments provide an asset management distributed ledger system for capturing, storing, and providing access to asset information/data. For example, the distributed ledger system may capture and store asset information/data that provides a complete record of an asset and further provide access to the asset information/data via an IUI or search function of the distributed ledger system.

18 Claims, 28 Drawing Sheets

(51) Int. Cl.
　　　*G06F 16/23*　　　(2019.01)
　　　*G06N 20/00*　　　(2019.01)

(56) References Cited

U.S. PATENT DOCUMENTS

2017/0220928 A1* 8/2017 Hajizadeh .......... G06Q 10/0637
2017/0236094 A1* 8/2017 Shah .................. H04L 9/0637
　　　　　　　　　　　　　　　　　　　705/300
2018/0285996 A1* 10/2018 Ma .................... H04L 9/3297

OTHER PUBLICATIONS

International Searching Authority, International Search Report and Written Opinion for International Application No. PCT/IB2019/052097, dated Aug. 2, 2019, (35 pages), European Patent Office, Rijswijk, Netherlands.

Anonymous. "Ethereum Homestead Documentation, Release 0.1," Mar. 1, 2017, XP055590492, (126 pages). [Retrieved from the Internet Sep. 11, 2020] <URL: https://buildmedia.readthedocs.org/media/pdf/ethereum-homestead/latest/ethereum-homestead.pdf>.

*Blockchain Technology and IP*, TaylorWessing, Mar. 2017, (2 pages), (article, online), [Retrieved from the Internet May 21, 2019] <URL: https://www.taylorwessing.com/download/article-blockchain-technology-and-ip.html>.

D'Aliessi, Michele. *How Does the Blockchain Work?*, OneZero, Jun. 1, 2016, (18 pages), (article, online), [Retrieved from the Internet Mar. 28, 2018] <URL: https://onezero.medium.com/how-does-the-blockchain-work-98c8cd01d2ae>.

*Protocol Documentation*, Bitcoin Wiki, Sep. 18, 2016, (24 pages), (online), [Retrieved from the Internet Mar. 28, 2018] <URL: https://en.bitcoin.it/w/index.php?title=Protocol_documentation&oldid=61587>.

* cited by examiner

BRIAN SMITH
INVENTOR
714

( SUBMIT IDR FORM )  DOWNLOAD IDR FORM  — 702

OPEN TASK — 704

| IP ASSET | TITLE | STATUS | DUE DATE | ACTION |
|---|---|---|---|---|
| #KOC23420 | DISPENSER | PENDING REVIEW | 13MAR2017 | VERIFY/SIGN |
| #KOC23420 | CAST IRON... | DISCLOSED | 26SEP2017 | ASSIGN OWNER |
| #KOC23420 | WHEEL SP... | PENDING REVIEW | 08JAN2018 | REVIEW |

VIEW MORE

COMPLETED TASK — 706

| IP ASSET | TITLE | STATUS | FILE DATE | DOCUMENT |
|---|---|---|---|---|
| #KOC27347 | GLASSBOTTLE | DISCLOSED | 13MAR2017 | [PDF] |
| #KOC96843 | RAILINGS | DISCLOSED | 26SEP2017 | [PDF] |
| #KOC47646 | PLASTIC TUBES | DISCLOSED | 08JAN2018 | [PDF] |

VIEW MORE

712

● PROFILE

SNAPSHOT — 708

| TRADEMARKS | PATENTS | |
|---|---|---|
| 2 | 5 | 1 | 3 |
| #AGENTS INSTRUCTED | RECORDAL FILED | OFFICIAL RECORDAL DATE | CERTIFICATES OUTSTANDING |

100%
50%
0%
AGENTS INSTRUCTED  RECORDAL FILED  OFFICIAL RECORDAL DATE  CERTIFICATES OUTSTANDING

PROJECTS — 710

VIEW DETAILS
VIEW DETAILS

| IP ASSEST ▼ | APPLICATION # ▼ | SUBMISSION ▼ | STATUS ▼ | ACTION ▼ | | PERMISSION ••• |
|---|---|---|---|---|---|---|
| #KAS-111-PAT-0223-JP | 543578 | 13MAR2017 | PENDING | [PDF] VIEW ASSIGNMENT | 🌐 ⊙ 🔒 | ❯ |
| #KAS-968-PAT-4321-CH | 968426 | 02SEP2017 | FILED | | 🌐 ⊙ 🔒 | ❯ |
| #KAS-472-PAT-6643-AU | 472660 | 26APR2017 | DISCLOSED | [PDF] VIEW ASSIGNMENT | 🌐 ⊙ 🔒 | ❯ |
| #KAS-762-PAT-6432-JP | 476265 | 09OCT2017 | GRANTED | [PDF] VIEW ASSIGNMENT | | ❮ |

| ASSIGNOR | | DATE OF PATENT 02JAN2018 | PATENT NUMBER PAT-1234-JP |
|---|---|---|---|
| SMITH. B | SMITH, BILLY SMITH, BOB SMITH, BRIAN | CLAIMS 3 | JURISDICTION WORLDWIDE |
| ABSTRACT LOREM IPSUM DOLOR SIT AMET, CONSECTETUR ADIPISCING ELIT. SED DAPIBUS, MAGNA A PRETIUM INTERDUM, ORCI URNA MOLESTIE NUNC, VEL | | DRAWINGS N.A | |

| | | | | | | |
|---|---|---|---|---|---|---|
| #KAS-607-PAT-8354-CA | 607839 | 18MAR2017 | PENDING | | 🌐 ⊙ 🔒 | ❯ |
| #KAS-828-PAT-8376-CH | 828838 | 25AUG2017 | GRANTED | [PDF] VIEW ASSIGNMENT | 🌐 ⊙ 🔒 | ❯ |

ROWS PER PAG:6

⬆ UPLOAD DOCUMENT

1802 — INVENTION TITLE: DISPENSER    IP ASSEST ID: #KAS-762-PAT-6432-JP    PROFILE

1804 — ⊕ ADD ADDITIONAL IP ASSESTS

⊕ ADD MULTIPLE EMPLOYEE(S)

LICENCEE ID — 1806
[ EG. EM-1234 ]

LICENSOR ID — 1808
[ EG. EM-1234 ]

EFFECTIVE DATE — 1810
[ 📅 MM/DD/YYYY ]

EXPIRY DATE — 1812
[ 📅 MM/DD/YYYY ]

⊕ ADD TERMS AND CONDITIONS — 1814

FREQUENCY OF PAYMENTS — 1816

PAYMENT FROM   [ LICENSEE ⇵ ]   [ AMOUNT ]   [ CURRENCY ⇵ ]
☐ DAILY  ☐ WEEKLY  ☐ BI-WEEKLY  ☐ MONTHLY
☐ ANNUALLY  ☐ QUARTERLY

TERMS OF JURISDICTION — 1818

JURISDICTION
UNI
UNITED STATES
UNITED KINGDOM
UKRAINE

EXCLUSIVITY
⦿ EXCLUSIVE   ○ NON-EXCLUSIVE
○ SOLE

☑ I AGREE, THE TERMS OF THIS AGREEMENT WILL BE AUTOMATICALLY EXECUTED AND ENFORCED VIA SMART CONTRACT ON THE BLOCKCHAIN — 1820

SAVE AS DRAFT — 1822     ( CREATE SMART CONTRACT ) — 1824

FIG. 18

Figure 19:
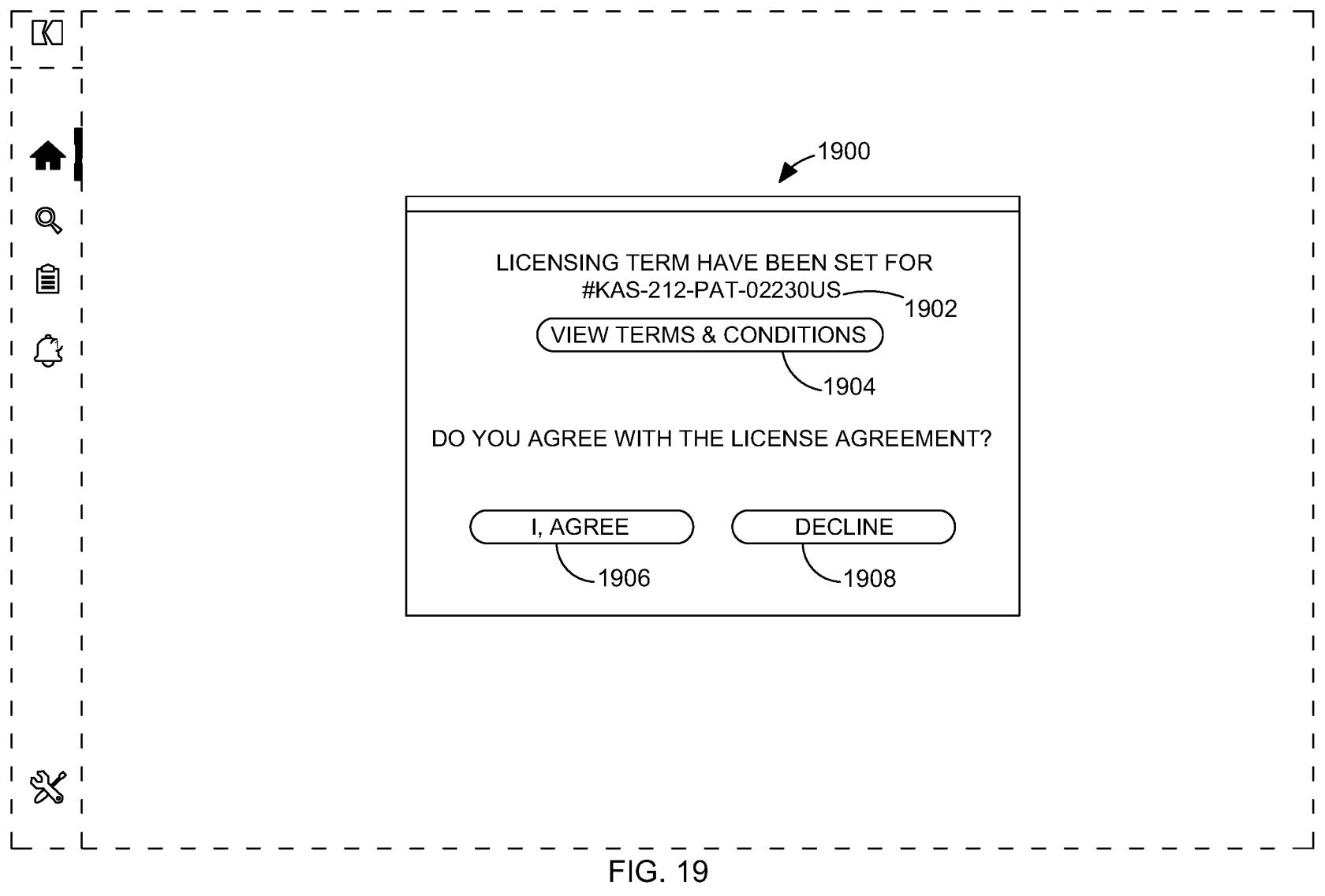

LICENSING TERM HAVE BEEN SET FOR
KAS-212-PAT-02230US — 1902

VIEW TERMS & CONDITIONS — 1904

DO YOU AGREE WITH THE LICENSE AGREEMENT?

I, AGREE — 1906

DECLINE — 1908

IP DISTRIBUTED LEDGER DUE DILIGENCE SEARCH

IP TYPE:
- ○ PATENT
- ○ PVP CERTIFICATE
- ○ TRADEMARK
- ○ OTHER

IP ASSET IDENTIFIER: _____

IP ASSET TITLE: _____

CURRENT OWNER: _____

JURISDICTION: _____

DATE: _____

DATE TYPE:
- ○ FILING
- ○ GRANT
- ○ PUBLICATION
- ○ EXPIRATION

SEARCH TYPE:
- ○ CHAIN OF TITLE
- ○ LIEN DETAILS
- ○ AGREEMENT DETAILS
- ○ LEGAL PROCEEDING DETAILS
- ○ STATUS DETAILS

SUBMIT

| BACK 2202 | | | ● PROFILE |
|---|---|---|---|
| PATENT ID: #PAT-1234-JP | | 2208 | |
| ABSTRACT 2204 | ASSIGNMENT 1 | 2210 | VIEW ⋮⋮⋮ ⊣⊢ |
| LOREM IPSUM DOLOR SIT AMET, CONSECTETUR ADIPISCING ELIT. SED DAPIBUS, MAGNA A PRETIUM INTERDUM, ORCI URNA MOLESTIE NUNC, VEL VULPUTATE RISUS RISUS SEMPER EROS. ELLENTESQUE UT LEO AUGUE. | DOCUMENT ID #KAS-762-PAT-6432-JP | APPLICATION/PATENT# PAT-1234-JP | CURRENT ASSIGNEE JANUARY 15, 2012 |
| | FILED DATE JANUARY 15, 2009 | JURISDICTION WORLDWIDE | INVENTORS BRIAN SMITH GARY MARSH ROBERT COLBERT |
| | ORIGINAL ASSIGNEE COMPANY NAME LTD | ASSIGNMENT DATE JANUARY 28, 2012 | |
| CLAIMS 2206 | ASSIGNMENT 2 | | |
| CLAIMS 1 > | DOCUMENT ID #KAS-452-PAT-1222-US | PUBLICATION DATE JANUARY 15, 2012 | CURRENT ASSIGNEE JANUARY 15, 2012 |
| CLAIMS 2 > | FILED DATE JANUARY 15, 2009 | JURISDICTION UNITED STATE | INVENTORS BRIAN SMITH GARY MARSH ROBERT COLBERT |
| CLAIMS 3 > | ORIGINAL ASSIGNEE COMPANY NAME LTD | ASSIGNMENT DATE JANUARY 28, 2012 | |
| ( VIEW LICENSING AGREEMENTS ) 2212 | ASSIGNMENT 3 | | |
| ( VIEW ASSIGNMENT ) 2214 | DOCUMENT ID #KAS-672-PAT-0253-US | PUBLICATION DATE JANUARY 15, 2012 | CURRENT ASSIGNEE |
| | FILED DATE | JURISDICTION | INVENTORS |

ACCESS CONTROLLED DISTRIBUTED LEDGER SYSTEM FOR ASSET MANAGEMENT

CROSS-REFERENCE TO RELATED APPLICATIONS

This application is a National Stage Application, filed under 35 U.S.C. § 371, of International Application No. PCT/IB2019/052097, filed Mar. 14, 2019, which claims priority to U.S. Application No. 62/643,971, filed Mar. 16, 2018; the contents of both of which are hereby incorporated by reference in their entireties.

FIELD

Various embodiments relate generally to distributed ledgers and interactive user interfaces for providing information/data for recording in the distributed ledger and for accessing information/data stored in the distributed ledger. For example, an example embodiment relates to a distributed ledger system for storing and providing information/data corresponding to managed assets.

BACKGROUND

Asset management can be a time-intensive process. For non-tangible assets (e.g., intellectual property (IP) assets, and/or the like), asset management becomes more difficult. For instance, poor visibility, transparency, and accuracy of IP data causes IP asset management to be a difficult and time-consuming process. For example, IP asset due diligence processes often rely on determinations made on multiple siloed, incomplete data sources.

Through applied effort and ingenuity, various embodiments of the present invention satisfy at least the above-mentioned needs as discussed in greater detail herein.

BRIEF SUMMARY OF SOME EXAMPLE EMBODIMENTS

Various embodiments provide methods, apparatuses, computer program products, systems, and/or the like for executing in association with a distributed ledger system. In various embodiments, the distributed ledger system comprises a distributed ledger and an interactive user interface (IUI) (e.g., executing on a user computing entity) via which users may provide information/data to be recorded/stored by the distributed ledger and access information/data stored in the distributed ledger. In various embodiments, the distributed ledger system comprises a permissioning and/or access control module for controlling the access of information/data stored in the distributed ledger.

Various embodiments provide methods, apparatuses, computer program products, system, and/or the like for managing assets and transactions in association with a distributed ledger system. In various embodiments, the managed assets are intangible assets such as IP assets (e.g., patents, trademarks, copyrights, trade secrets, plant variety protection certificates, utility models, and/or the like). The distributed ledger system is configured for receiving, storing, and providing access to information/data corresponding to the managed assets. For instance, the distributed ledger system may be configured for capturing and storing asset information/data such as assignment information/data, innovation disclosures (e.g., via electronic innovation disclosure reports (IDRs)), grant/issue information/data, maintenance and/or expiry information/data, search and/or due diligence investigation information/data, licensing, and/or the like. The asset information/data may be captured via user interaction with the IUI and/or automated processes (e.g., parsing information/data from the Official Gazette, and/or the like). A user may then access asset information/data via the IUI, in accordance with the permissioning and/or access control of the distributed ledger system.

In accordance with one aspect, a method is provided. In one embodiment, the method comprises providing, by one or more processors, an interactive user interface (IUI), wherein the IUI is configured to interact with a user and a distributed ledger system; receiving, by one or more processors, user input from the user, the user input comprising an assignment agreement associated with (a) a member identifier identifying an entity within the distributed ledger system, and (b) a user identifier identifying the user within the distributed ledger system; providing, by the one or more processors, the assignment agreement in association with the member identifier and the user identifier such that a node computing entity of the distributed ledger system causes the assignment agreement to be recorded in a distributed ledger of the distributed ledger system in association with the member identifier and the user identifier; receiving, by one or more processors, development information corresponding to an asset with the assignment agreement; and providing, by one or more processors, an indication of the development information such that a node computing entity of the distributed ledger causes the indication of the development information to be recorded in a distributed ledger of the distributed ledger system in association with the member identifier, the user identifier, and an asset identifier identifying an asset associated with the development information.

In accordance with yet another aspect, a computing system is provided. The computing system comprises a non-transitory computer readable storage medium and one or more processors, the computing system configured to provide an interactive user interface (IUI), wherein the IUI is configured to interact with a user and a distributed ledger system; receive user input from the user, the user input comprising an assignment agreement associated with (a) a member identifier identifying an entity within the distributed ledger system, and (b) a user identifier identifying the user within the distributed ledger system; provide the assignment agreement in association with the member identifier and the user identifier such that a node computing entity of the distributed ledger system causes the assignment agreement to be recorded in a distributed ledger of the distributed ledger system in association with the member identifier and the user identifier; receive development information corresponding to an asset with the assignment agreement; and provide an indication of the development information such that a node computing entity of the distributed ledger system causes the indication of the development information to be recorded in a distributed ledger of the distributed ledger system in association with the member identifier, the user identifier, and an asset identifier identifying an asset associated with the development information.

In accordance with another aspect, a computer program product for is provided. The computer program product may comprise a non-transitory computer readable medium having computer program instructions stored therein, the computer program instructions when executed by a processor, cause the processor to provide an interactive user interface (IUI), wherein the IUI is configured to interact with a user and a distributed ledger system; receive user input from the user, the user input comprising an assignment agreement associated with (a) a member identifier identifying an entity within the distributed ledger system, and (b) a user identifier identifying the user within the distributed ledger system; provide the assignment agreement in association with the member identifier and the user identifier such that a node computing entity of the distributed ledger system causes the assignment agreement to be recorded in a distributed ledger of the distributed ledger system in association with the member identifier and the user identifier; receive development information corresponding to an asset with the assignment agreement; and provide an indication of the development information such that a node computing entity of the distributed ledger causes the indication of the development information to be recorded in a distributed ledger of the distributed ledger system in association with the member identifier, the user identifier, and an asset identifier identifying an asset associated with the development information.

In accordance with one aspect, a method is provided. In one embodiment, the method comprises receiving, by a node computing entity of a distributed ledger system, license or sale agreement information for a particular license or sale agreement of an asset, wherein the license or sale agreement information comprises at least one of (a) an asset identifier, (b) an assignor identifier, (c) an assignee identifier, (d) a licensee identifier, (e) a licensor identifier, (f) an agreement effective date, (g) an agreement expiration date, or (h) agreement terms; executing, by the node computing entity, a smart contract based at least in part on the license or sale agreement information, wherein executing the smart contract comprises executing a transaction in accordance with the smart contract based at least in part on the license or sale agreement information; and recording, by the node computing entity, transaction information corresponding to the transaction in a distributed ledger of the distributed ledger system.

In accordance with yet another aspect, node computing entity of a distributed ledger system is provided. The node computing entity comprising a non-transitory computer readable storage medium and one or more processors, the node computing entity configured to receive license or sale agreement information for a particular license or sale agreement of an asset, wherein the license or sale agreement information comprises at least one of (a) an asset identifier, (b) an assignor identifier, (c) an assignee identifier, (d) a licensee identifier, (e) a licensor identifier, (f) an agreement effective date, (g) an agreement expiration date, or (h) agreement terms; execute a smart contract based at least in part on the license or sale agreement information, wherein executing the smart contract comprises executing a transaction in accordance with the smart contract based at least in part on the license or sale agreement information; and record transaction information corresponding to the transaction in a distributed ledger of the distributed ledger system.

In accordance with another aspect, a computer program product for is provided. The computer program product may comprise a non-transitory computer readable medium having computer program instructions stored therein, the computer program instructions when executed by a node computing entity, cause the node computing entity to receive license or sale agreement information for a particular license or sale agreement of an asset, wherein the license or sale agreement information comprises at least one of (a) an asset identifier, (b) an assignor identifier, (c) an assignee identifier, (d) a licensee identifier, (e) a licensor identifier, (f) an agreement effective date, (g) an agreement expiration date, or (h) agreement terms; execute a smart contract based at least in part on the license or sale agreement information, wherein executing the smart contract comprises executing a transaction in accordance with the smart contract based at least in part on the license or sale agreement information; and record transaction information corresponding to the transaction in a distributed ledger of the distributed ledger system.

In accordance with one aspect, a method is provided. In one embodiment, the method comprises receiving, by a node computing entity of a distributed ledger system, an indication that a grant for the asset has been completed; capturing, by the node computing entity, renewal information corresponding to the asset; and generating, by the node computing entity, a smart contract based at least in part on the renewal information, wherein execution of the smart contract causes a node computing entity of the distributed ledger system to (a) renew the asset in accordance with the renewal information, or (b) determine if the asset was renewed in accordance with the renewal information.

In accordance with yet another aspect, node computing entity of a distributed ledger system is provided. The node computing entity comprising a non-transitory computer readable storage medium and one or more processors, the node computing entity configured to receive an indication that a grant for the asset has been completed; capture renewal information corresponding to the asset; and generate a smart contract based at least in part on the renewal information, wherein execution of the smart contract causes a node computing entity of the distributed ledger system to (a) renew the asset in accordance with the renewal information, or (b) determine if the asset was renewed in accordance with the renewal information.

In accordance with another aspect, a computer program product for is provided. The computer program product may comprise a non-transitory computer readable medium having computer program instructions stored therein, the computer program instructions when executed by a node computing entity, cause the node computing entity to receive an indication that a grant for the asset has been completed; capture renewal information corresponding to the asset; and generate a smart contract based at least in part on the renewal information, wherein execution of the smart contract causes a node computing entity of the distributed ledger system to (a) renew the asset in accordance with the renewal information, or (b) determine if the asset was renewed in accordance with the renewal information.

In accordance with one aspect, a method is provided. In one embodiment, the method comprises receiving, by one or more processors, application filing information corresponding to an application for intellectual property (IP) protection; receiving, by the one or more processors, assignment information corresponding to the application; recording, by the one or more processors, at least a portion of the application filing information in association with at least a portion of the assignment information in a distributed ledger of a distributed ledger system; responsive to receiving a request for information corresponding to the application, the request generated responsive to user interaction with an interactive user interface provided via a user interface of executing on a user computing entity, determining, by the one or more processors, whether the user is permitted to access the information corresponding to the application based at least in part on (a) a status of the application as indicated by a status indicator associated with the application and recorded to the distributed ledger, and (b) a user profile corresponding to the user; responsive to determining that the user is permitted to access the information corresponding to the application, accessing, by the one or more processors, the information corresponding to the application, wherein the information corresponding to the application comprises at least a portion of the application filing information; and providing, by the one or more processors, the at least a portion of the application filing information such that the user computing entity receives the at least a portion of the application filing information, the user computing entity configured for providing the application filing information via the interactive user interface.

In accordance with yet another aspect, a computing system is provided. The computing system comprises a non-transitory computer readable storage medium and one or more processors, the computing system configured to receive application filing information corresponding to an application for intellectual property (IP) protection; receive assignment information corresponding to the application; record at least a portion of the application filing information in association with at least a portion of the assignment information in a distributed ledger of a distributed ledger system; responsive to receiving a request for information corresponding to the application, the request generated responsive to user interaction with an interactive user interface provided via a user interface of executing on a user computing entity, determine whether the user is permitted to access the information corresponding to the application based at least in part on (a) a status of the application as indicated by a status indicator associated with the application and recorded to the distributed ledger, and (b) a user profile corresponding to the user; responsive to determining that the user is permitted to access the information corresponding to the application, access the information corresponding to the application, wherein the information corresponding to the application comprises at least a portion of the application filing information; and provide the at least a portion of the application filing information such that the user computing entity receives the at least a portion of the application filing information, the user computing entity configured for providing the application filing information via the interactive user interface.

In accordance with another aspect, a computer program product for is provided. The computer program product may comprise a non-transitory computer readable medium having computer program instructions stored therein, the computer program instructions when executed by a processor, cause the processor to receive application filing information corresponding to an application for intellectual property (IP) protection; receive assignment information corresponding to the application; record at least a portion of the application filing information in association with at least a portion of the assignment information in a distributed ledger of a distributed ledger system; responsive to receiving a request for information corresponding to the application, the request generated responsive to user interaction with an interactive user interface provided via a user interface of executing on a user computing entity, determine whether the user is permitted to access the information corresponding to the application based at least in part on (a) a status of the application as indicated by a status indicator associated with the application and recorded to the distributed ledger, and (b) a user profile corresponding to the user; responsive to determining that the user is permitted to access the information corresponding to the application, access the information corresponding to the application, wherein the information corresponding to the application comprises at least a portion of the application filing information; and provide the at least a portion of the application filing information such that the user computing entity receives the at least a portion of the application filing information, the user computing entity configured for providing the application filing information via the interactive user interface.

In accordance with one aspect, a method is provided. In one embodiment, the method comprises receiving, by one or more processors, a search request originating from user interaction with a first interactive user interface executing on a first user computing entity; initiating, by the one or more processors, a search of a distributed ledger based at least in part on the search request; providing, by the one or more processors, search results of the search such that the first user computing entity receives at least a portion of the search results for presentation via the first interactive user interface; recording, by the one or more processors, search information for the search in the distributed ledger; receiving, by the one or more processors, a search attestation request, the search attestation originating from user interaction with a second interactive user interface executing on a second user computing entity; accessing, by the one or more processors, the search information from the distributed ledger; and providing, by the one or more processors, at least a portion of the search information such that the second user computing entity receives the search information for presentation via the second interactive user interface.

In accordance with yet another aspect, a computing system is provided. The computing system comprises a non-transitory computer readable storage medium and one or more processors, the computing system configured to In accordance with another aspect, a computer program product for is provided. The computer program product may comprise a non-transitory computer readable medium having computer program instructions stored therein, the computer program instructions when executed by a processor, cause the processor to receive a search request originating from user interaction with a first interactive user interface executing on a first user computing entity; initiate a search of a distributed ledger based at least in part on the search request; provide search results of the search such that the first user computing entity receives at least a portion of the search results for presentation via the first interactive user interface; record search information for the search in the distributed ledger; receive a search attestation request, the search attestation originating from user interaction with a second interactive user interface executing on a second user computing entity; access the search information from the distributed ledger; and provide at least a portion of the search information such that the second user computing entity receives the search information for presentation via the second interactive user interface.

In accordance with one aspect, a method is provided. In one embodiment, the method comprises receive a search request originating from user interaction with a first interactive user interface executing on a first user computing entity; initiate a search of a distributed ledger based at least in part on the search request; provide search results of the search such that the first user computing entity receives at least a portion of the search results for presentation via the first interactive user interface; record search information for the search in the distributed ledger; receive a search attestation request, the search attestation originating from user interaction with a second interactive user interface executing on a second user computing entity; access the search information from the distributed ledger; and provide at least a portion of the search information such that the second user computing entity receives the search information for presentation via the second interactive user interface.

In accordance with one aspect, a method is provided. In one embodiment, the method comprises receiving, by one or more processors, a search request comprising a filter element, the filter element corresponding to a chain of title and at least one query element, the search request originating from a requesting user interacting with an interactive user interface executing on a user computing entity; identifying, by the one or more processors, an asset based at least in part on the at least one query element, the asset associated with an asset identifier; initiating, by the one or more processors, a search for assignment information (a) recorded to a distributed ledger, and (b) associated with the asset identifier; accessing, by the one or more processors, the identified assignment information from the distributed ledger; and providing, by the one or more processors, at least a portion of the assignment information, wherein (a) a user profile corresponding to the requesting user is permitted to access the at least a portion of the assignment information based at least in part on the user profile and a setting for the distributed ledger and (b) the at least a portion of the assignment information is provided such that the user computing entity receives the at least a portion of the assignment information for presentation via the interactive user interface.

In accordance with yet another aspect, a computing system is provided. The computing system comprises a non-transitory computer readable storage medium and one or more processors, the computing system configured to receive a search request comprising a filter element, the filter element corresponding to a chain of title and at least one query element, the search request originating from a requesting user interacting with an interactive user interface executing on a user computing entity; identify an asset based at least in part on the at least one query element, the asset associated with an asset identifier; initiate a search for assignment information (a) recorded to a distributed ledger, and (b) associated with the asset identifier; access the identified assignment information from the distributed ledger; and provide at least a portion of the assignment information, wherein (a) a user profile corresponding to the requesting user is permitted to access the at least a portion of the assignment information based at least in part on the user profile and a setting for the distributed ledger and (b) the at least a portion of the assignment information is provided such that the user computing entity receives the at least a portion of the assignment information for presentation via the interactive user interface.

In accordance with another aspect, a computer program product for is provided. The computer program product may comprise a non-transitory computer readable medium having computer program instructions stored therein, the computer program instructions when executed by a processor, cause the processor to receive a search request comprising a filter element, the filter element corresponding to a chain of title and at least one query element, the search request originating from a requesting user interacting with an interactive user interface executing on a user computing entity; identify an asset based at least in part on the at least one query element, the asset associated with an asset identifier; initiate a search for assignment information (a) recorded to a distributed ledger, and (b) associated with the asset identifier; access the identified assignment information from the distributed ledger; and provide at least a portion of the assignment information, wherein (a) a user profile corresponding to the requesting user is permitted to access the at least a portion of the assignment information based at least in part on the user profile and a setting for the distributed ledger and (b) the at least a portion of the assignment information is provided such that the user computing entity receives the at least a portion of the assignment information for presentation via the interactive user interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
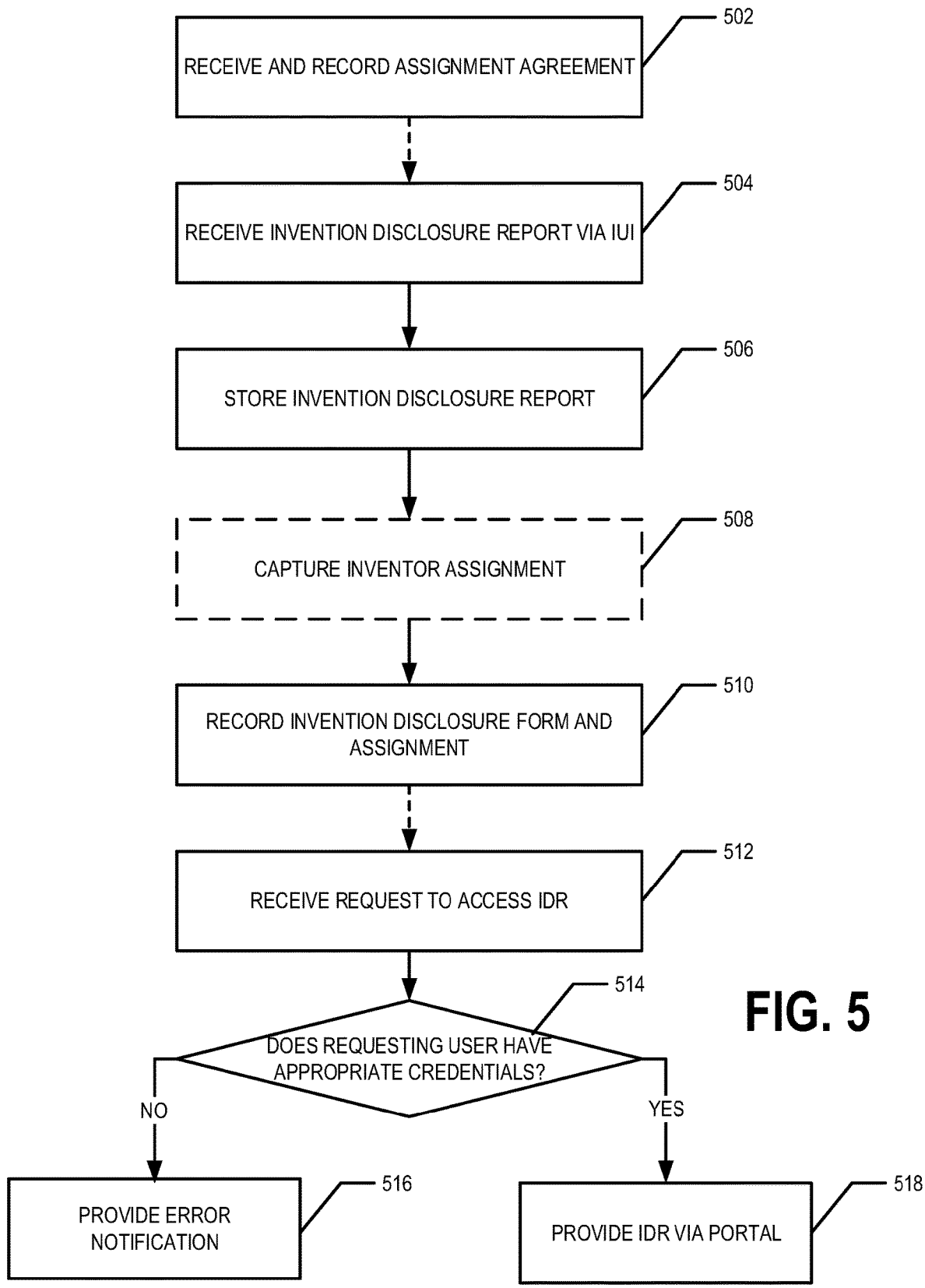
Figure 6:
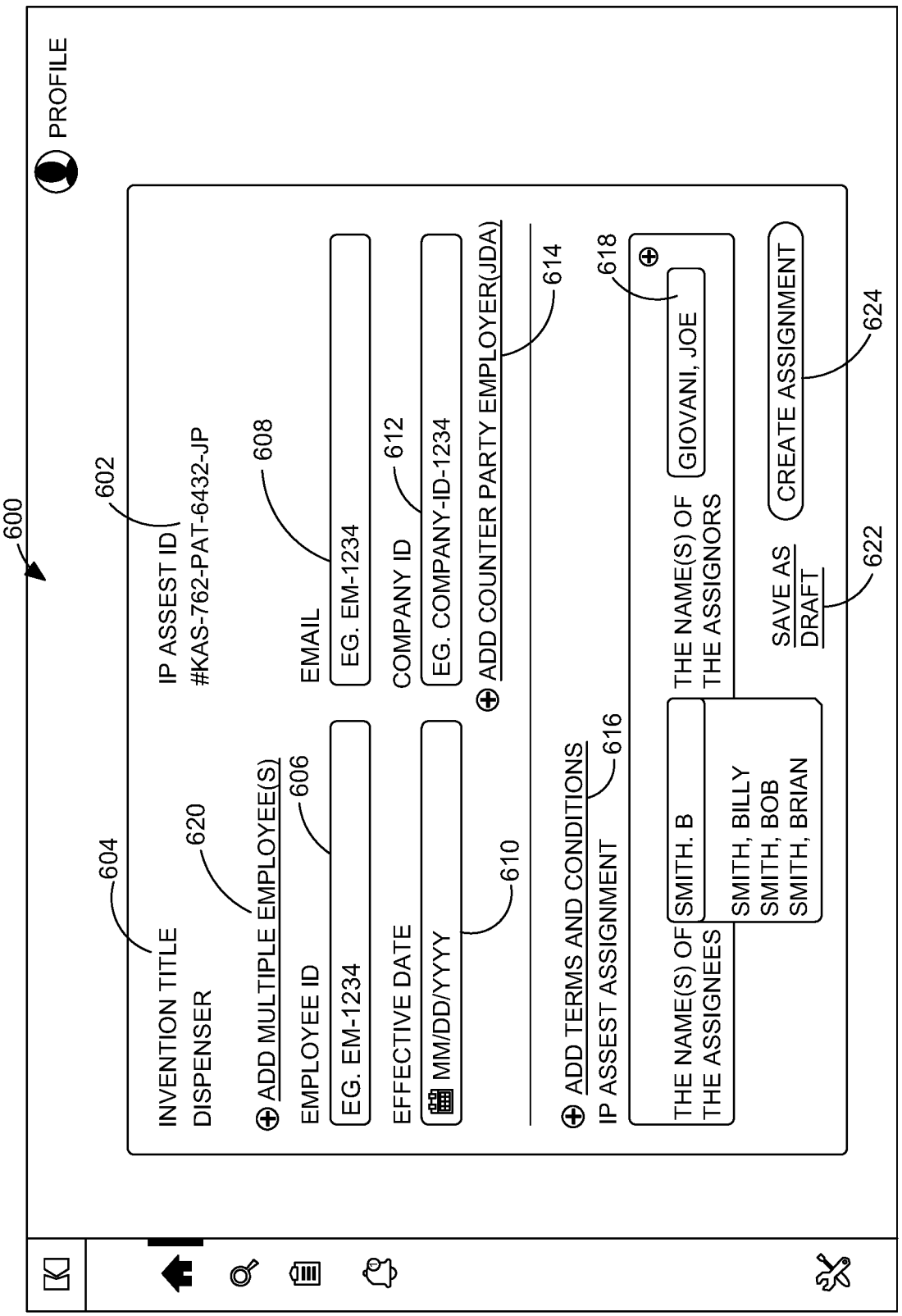
Figure 8:
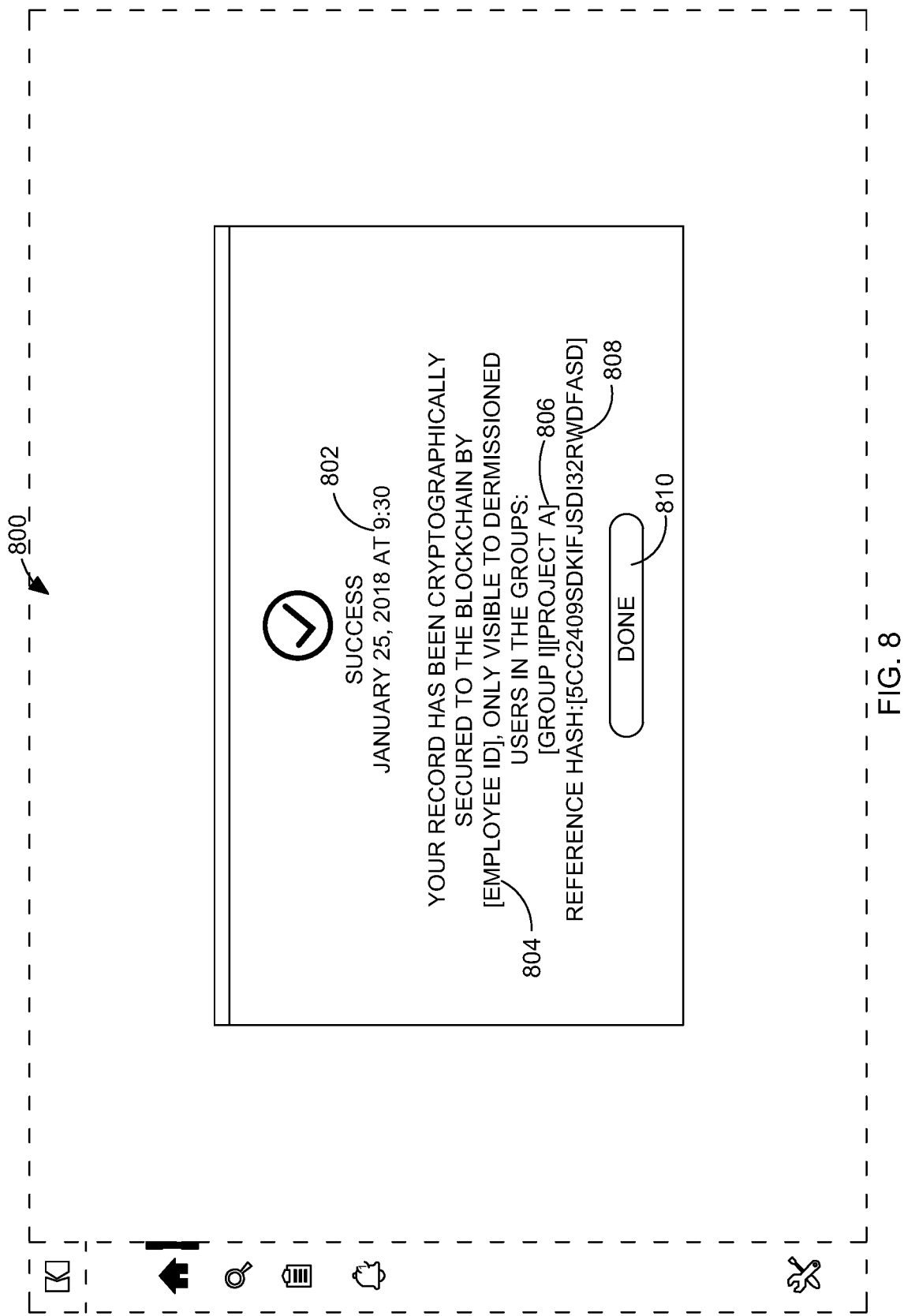
Figure 9:
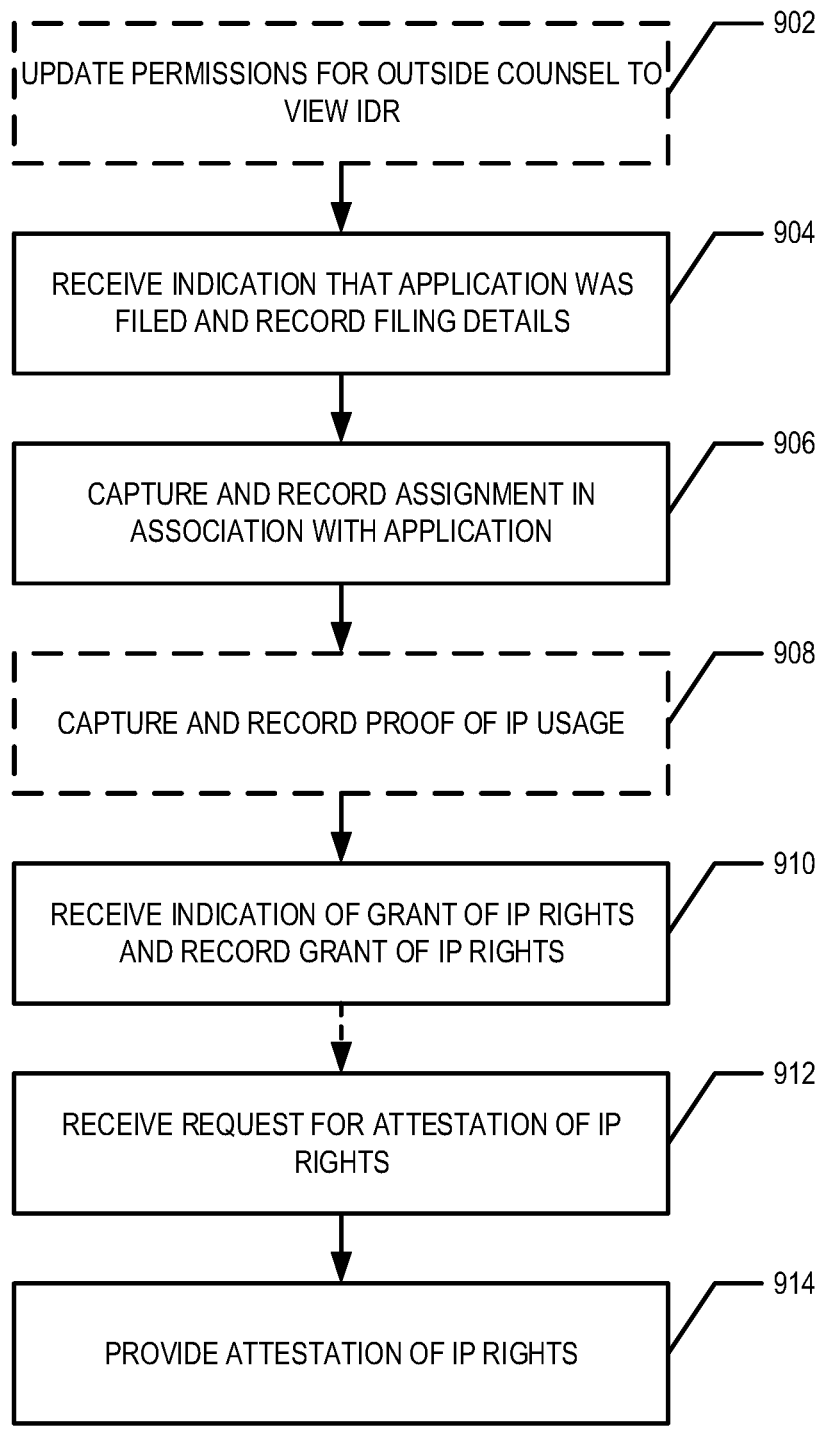
Figure 10:
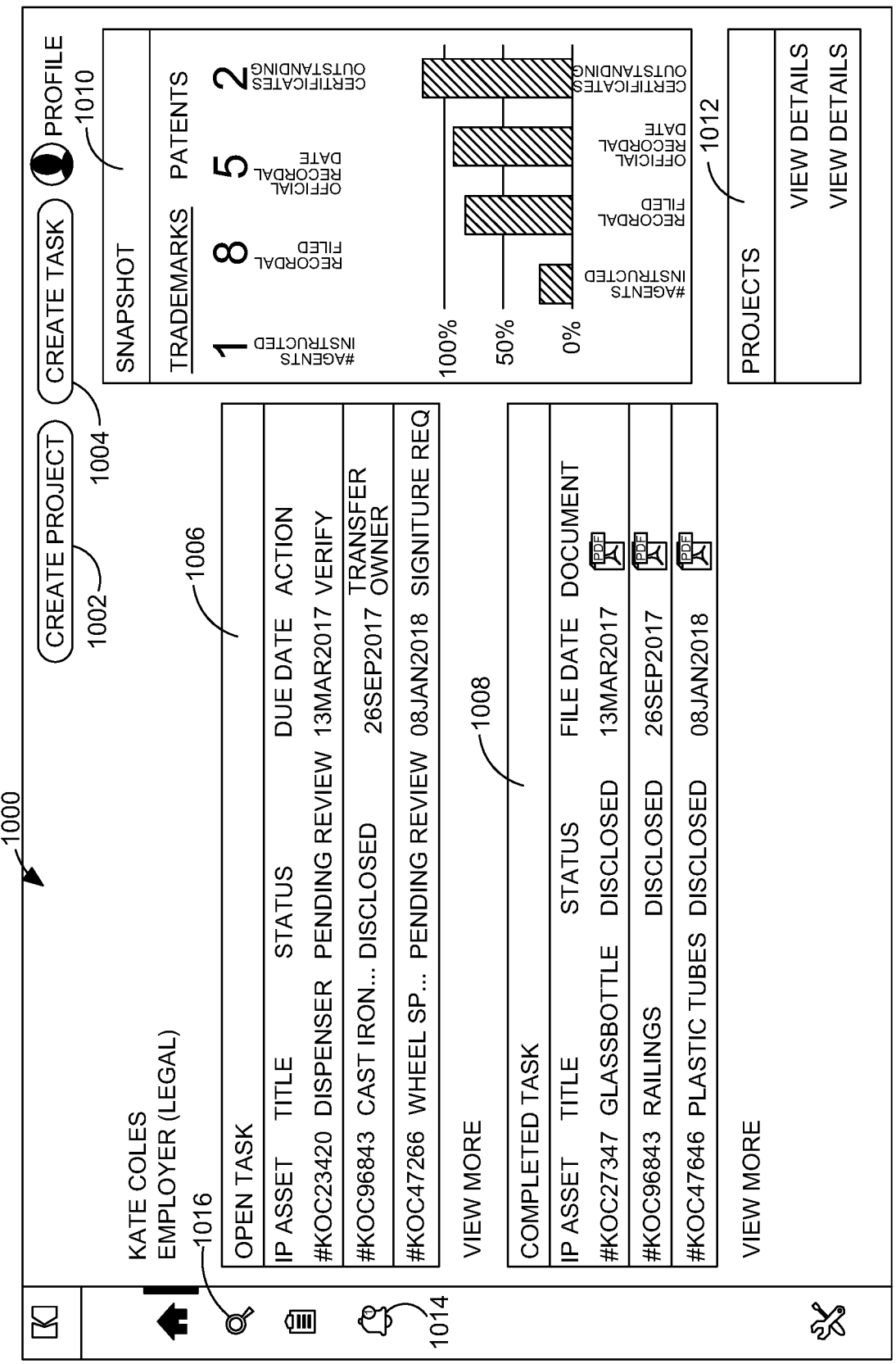
Figure 11:
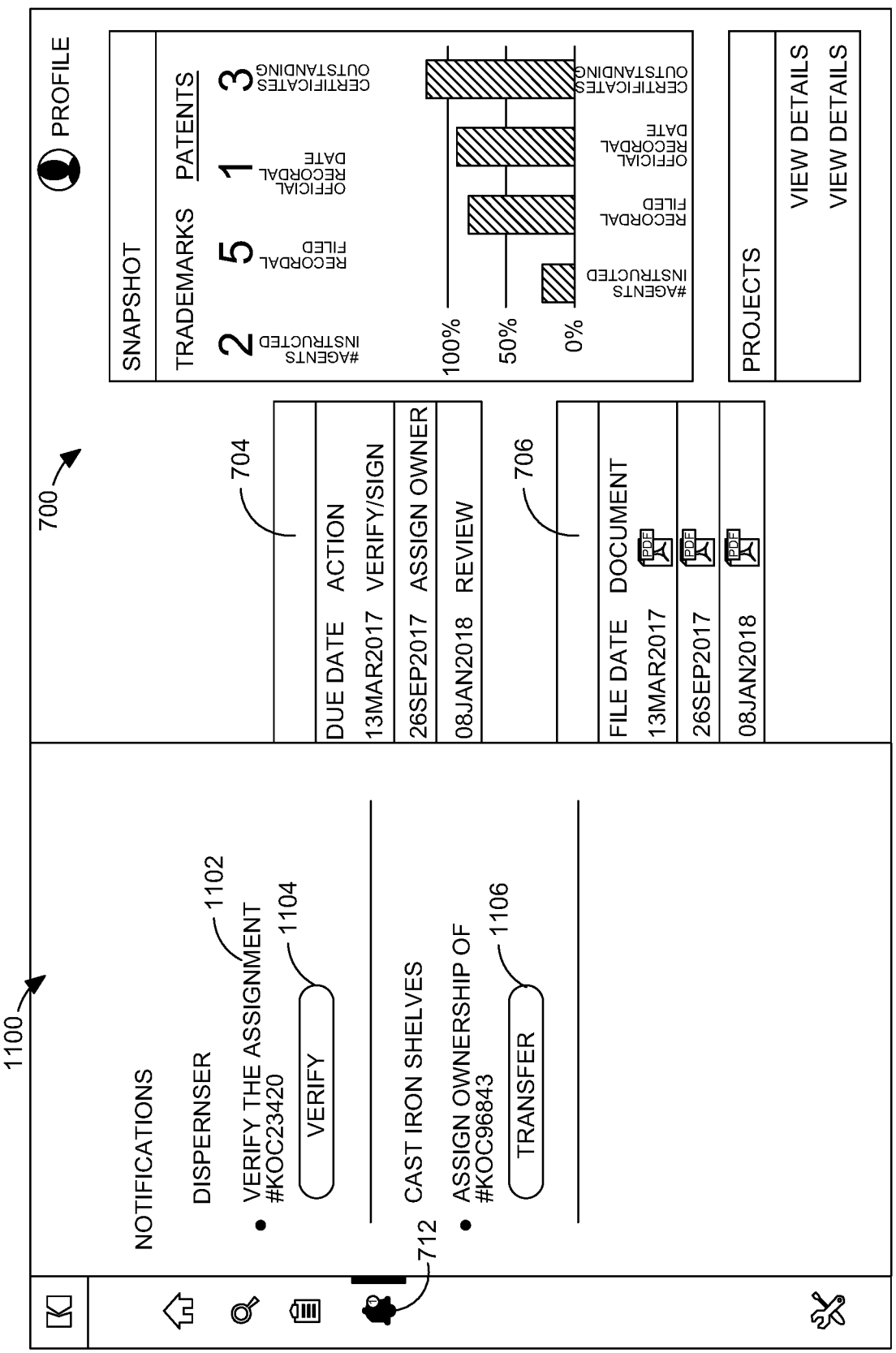
Figure 12:
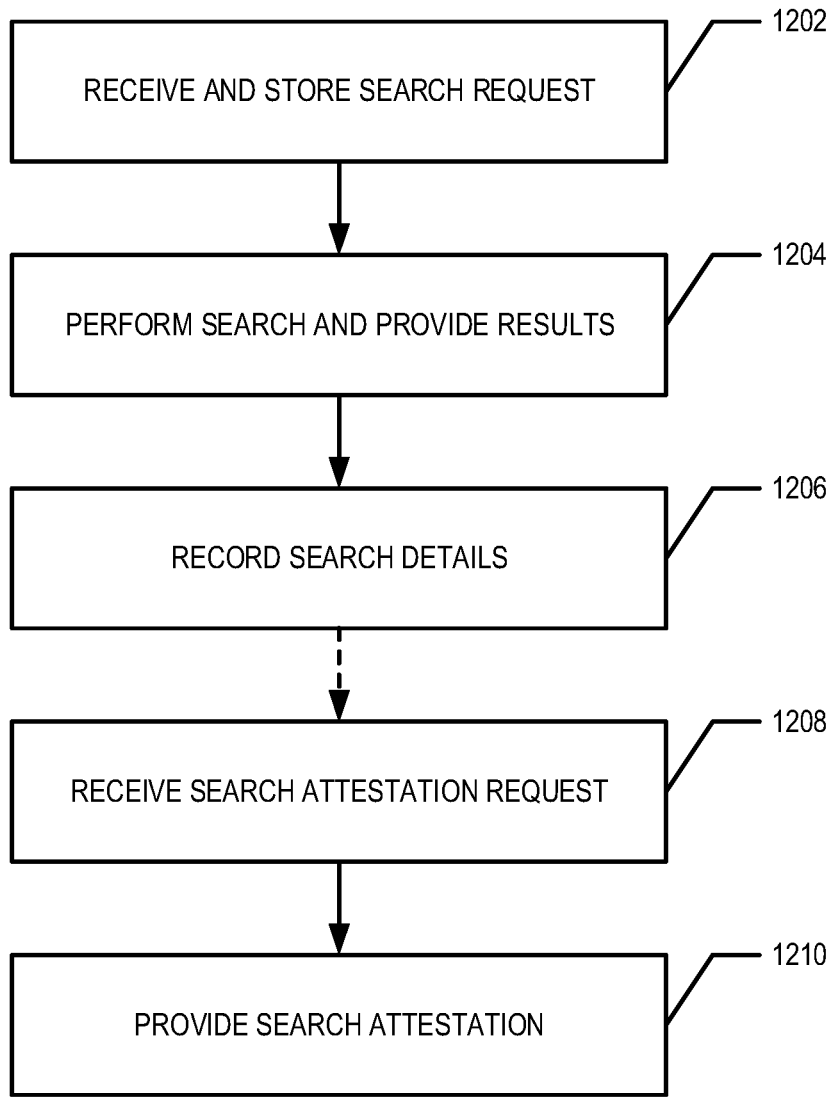
Figure 15:
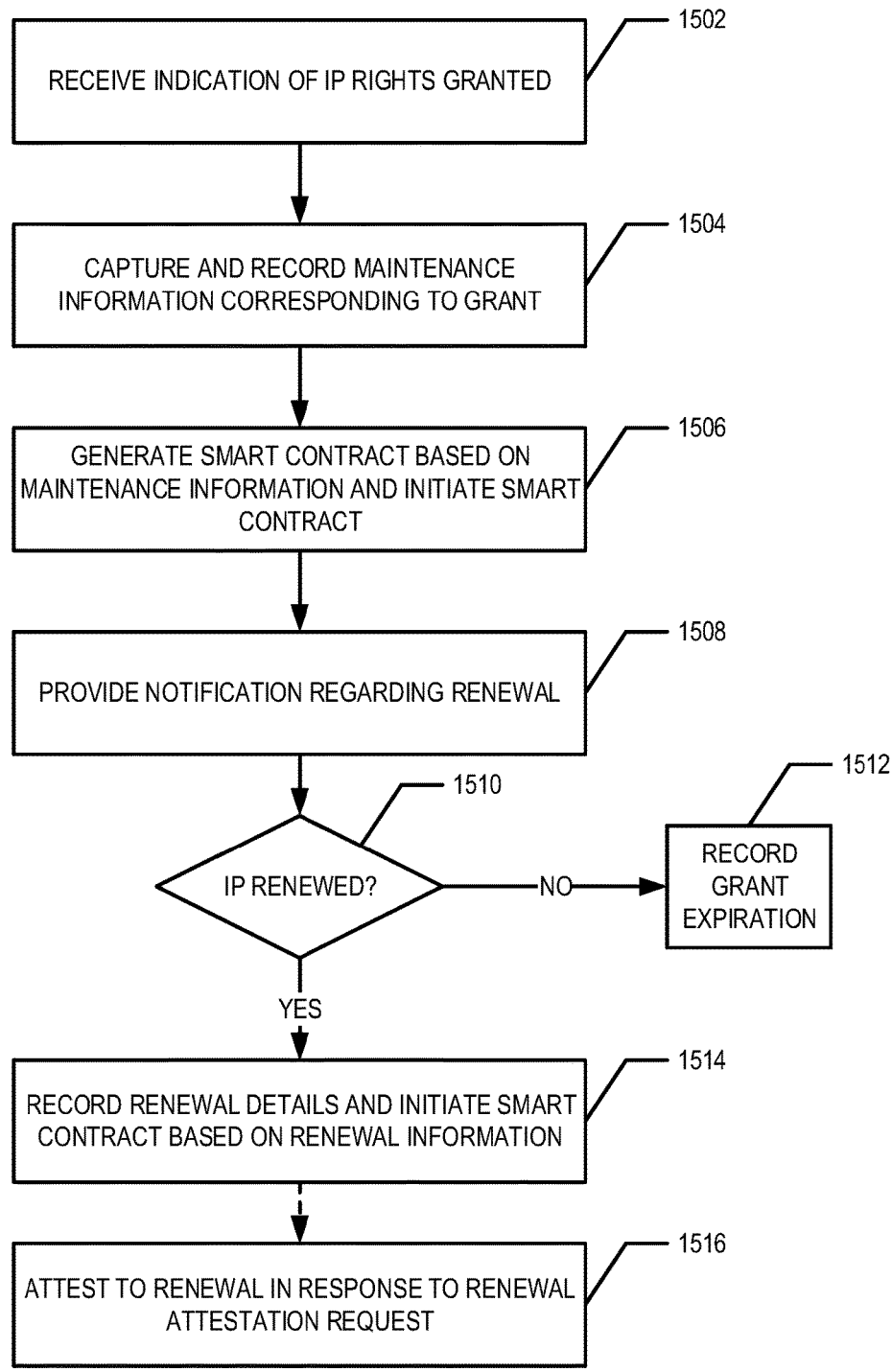
Figure 16:
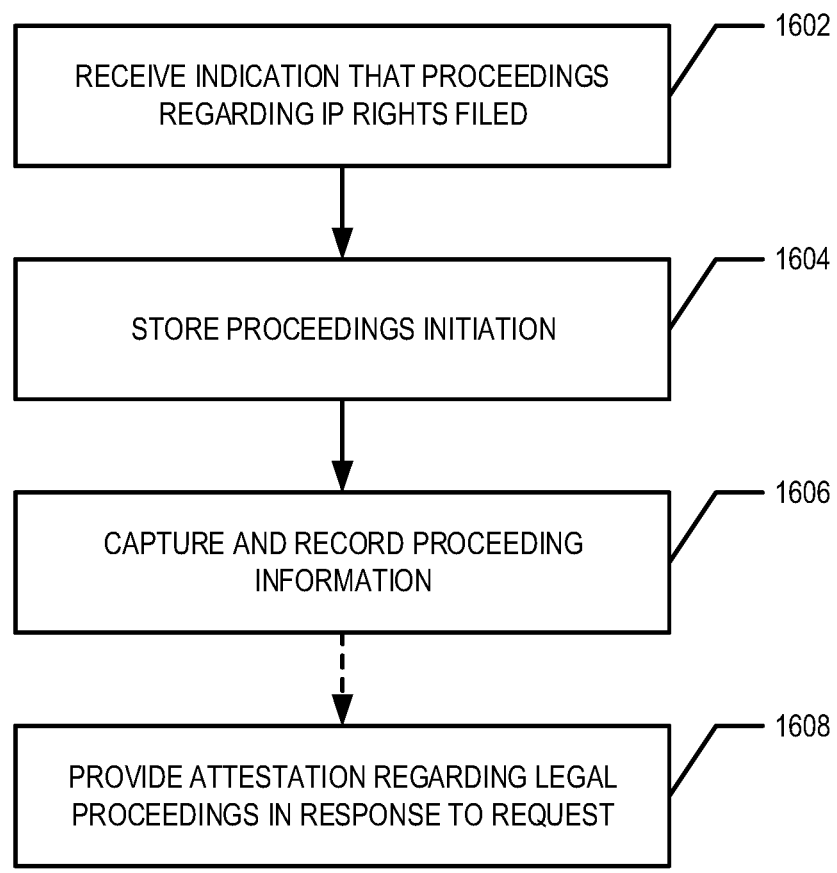
Figure 17:
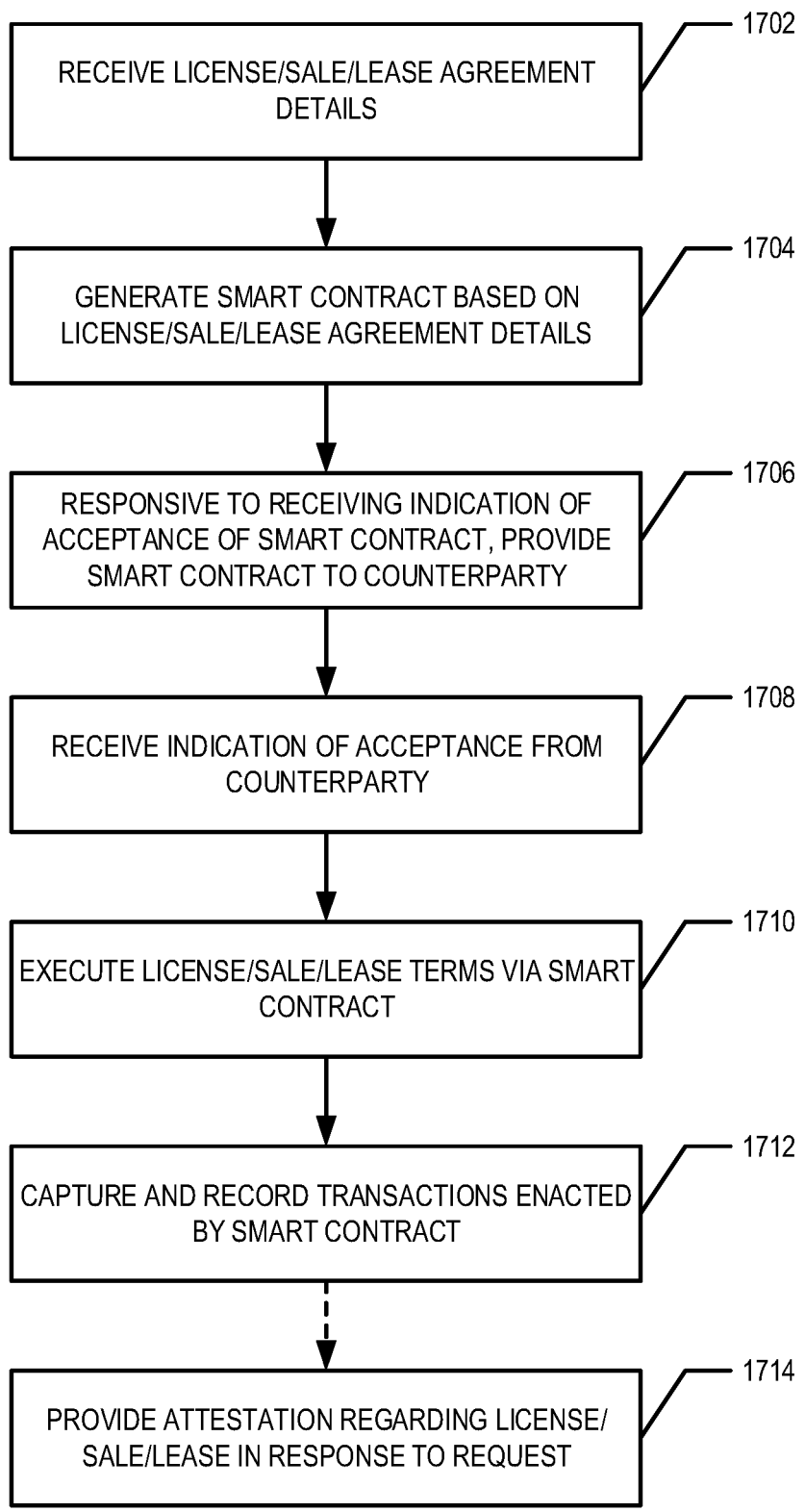
Figure 20:
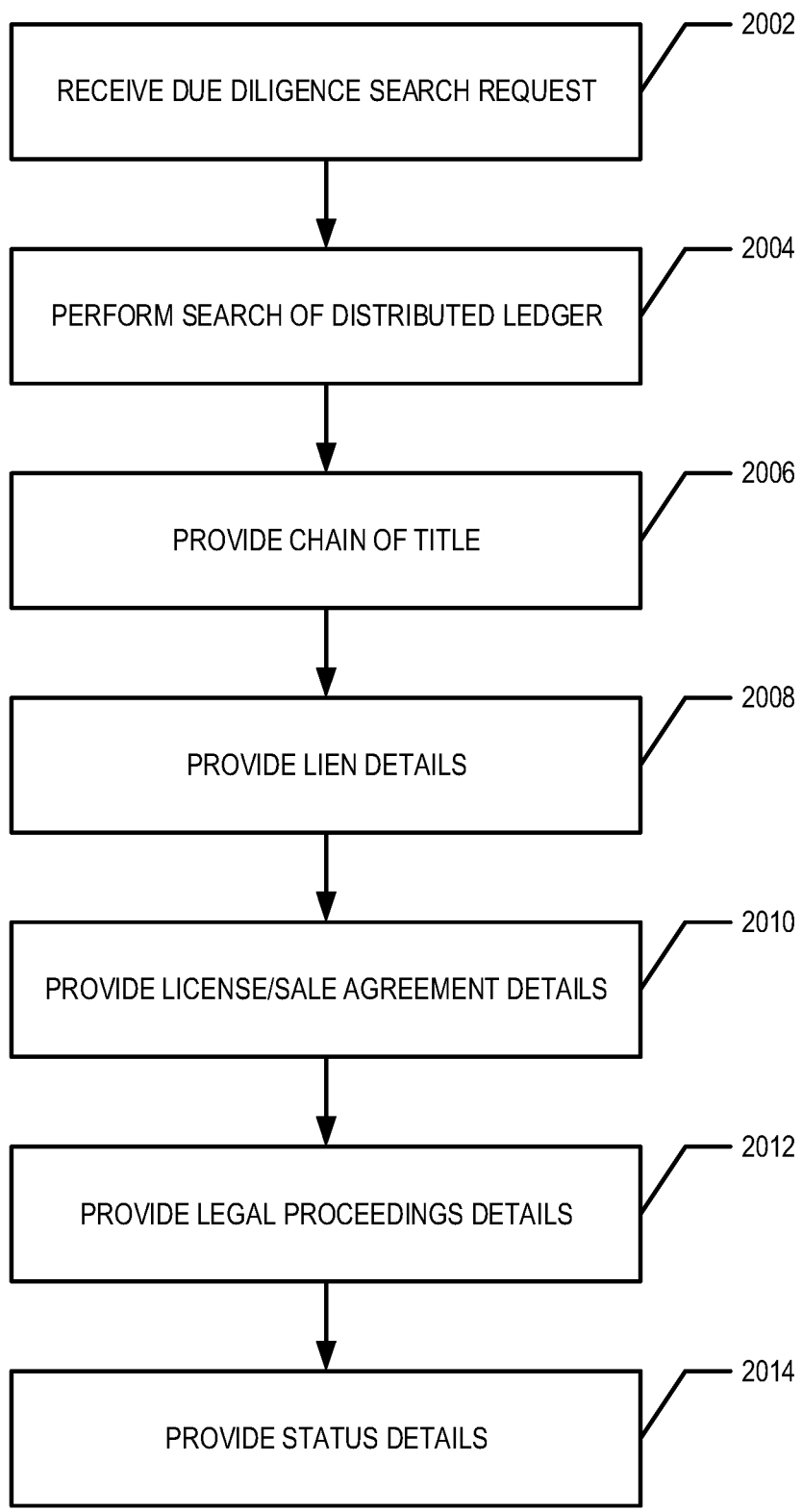
Figure 24:
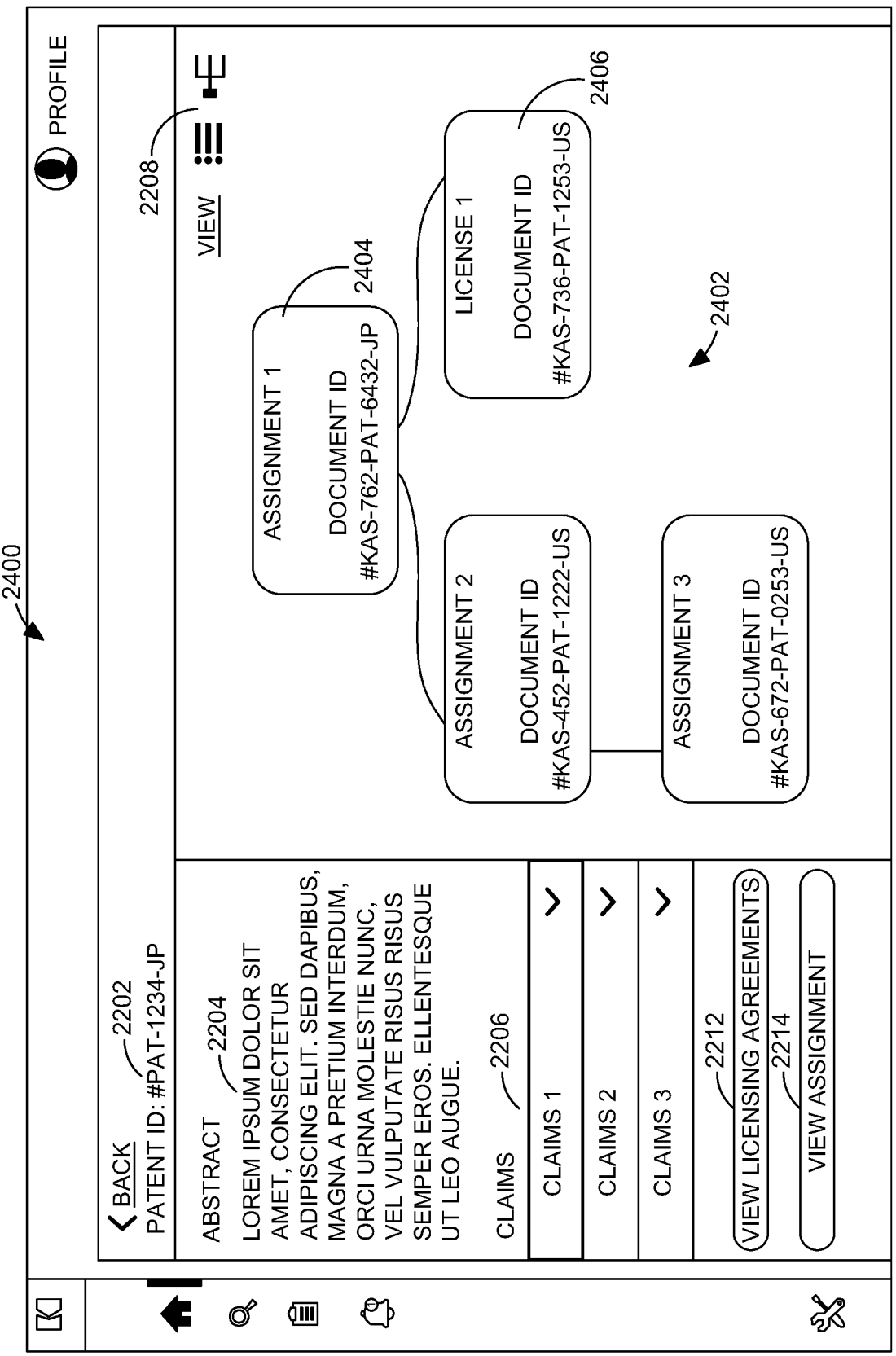
Figure 25:
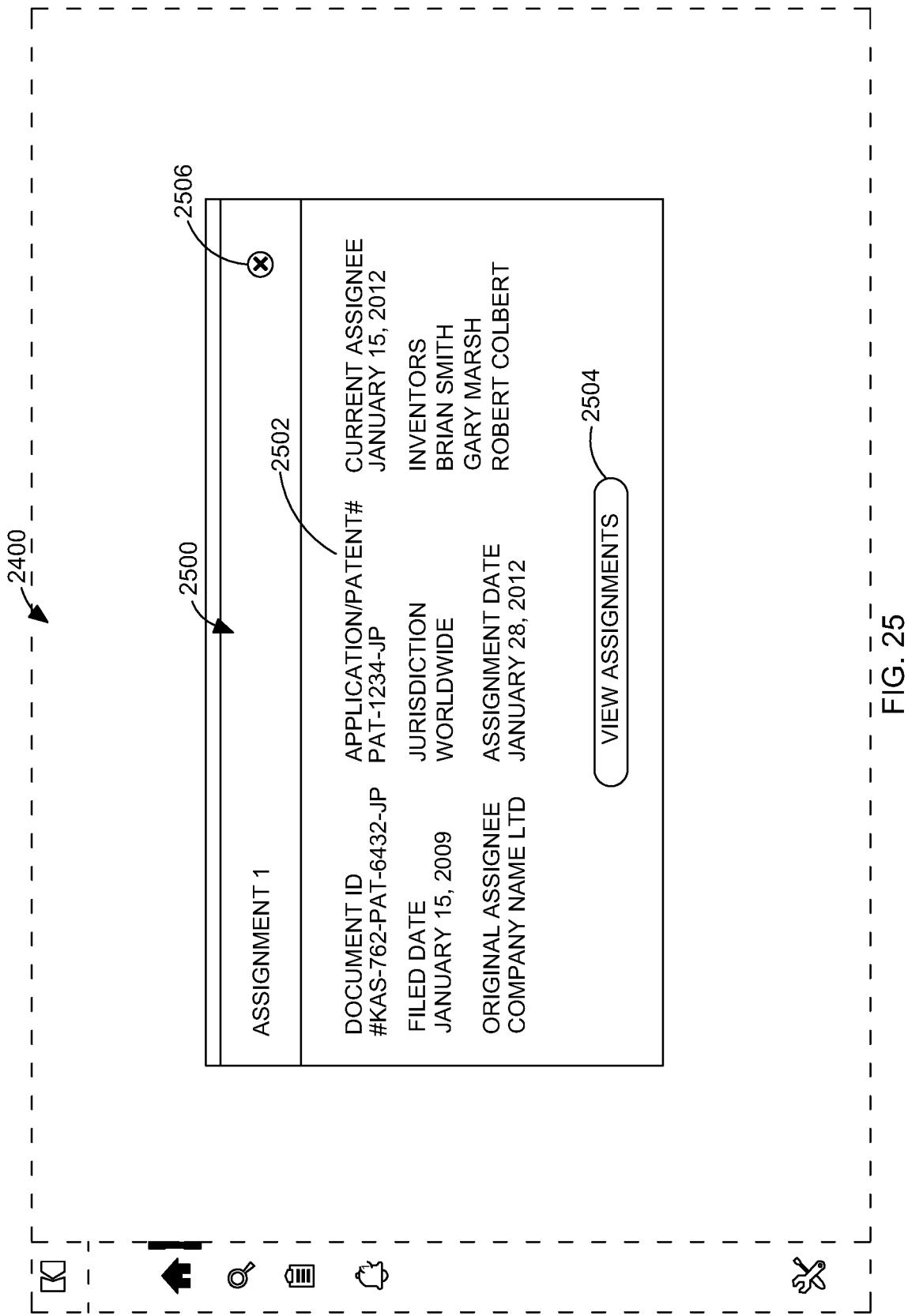
Figure 26:
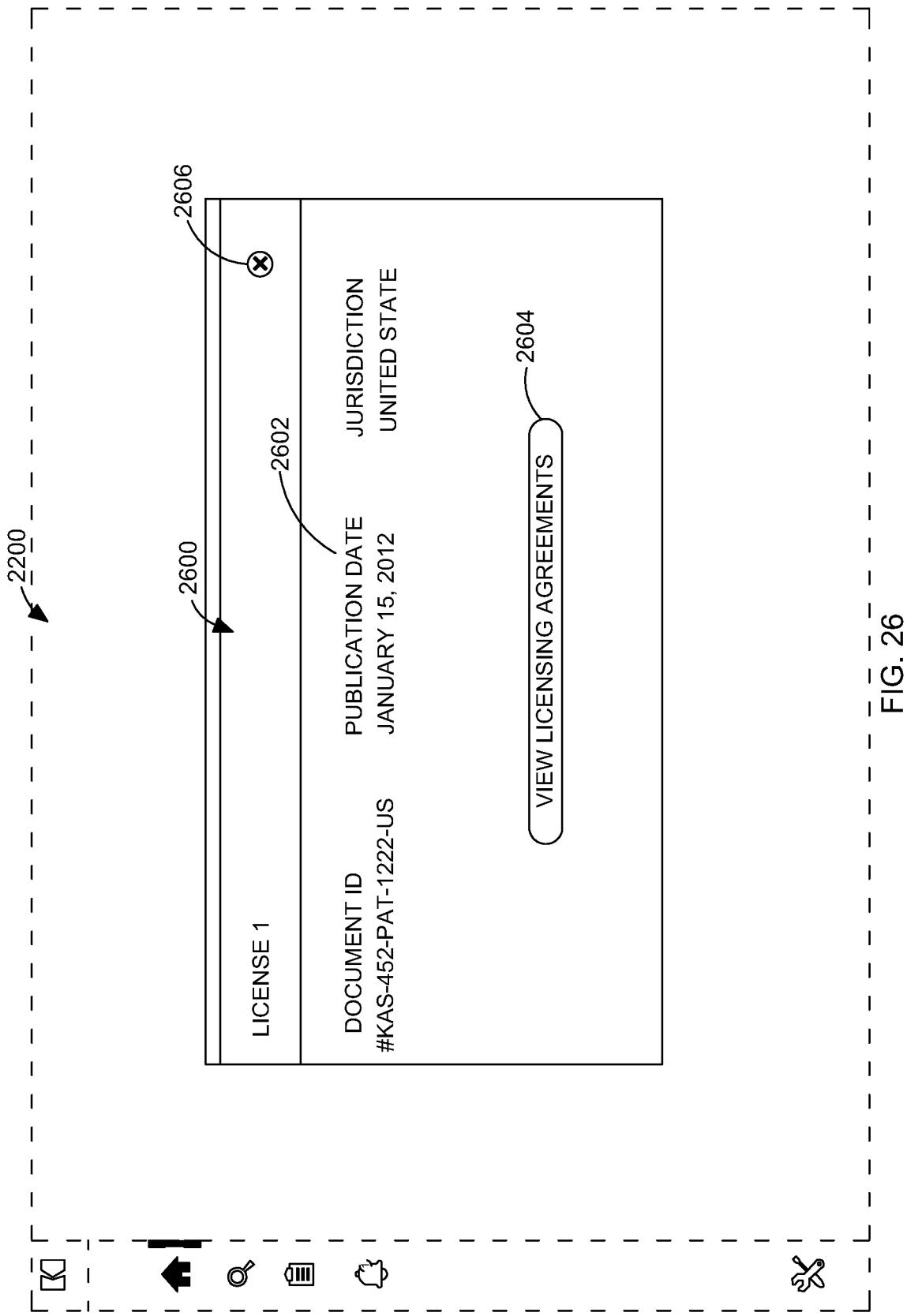
Figure 27:
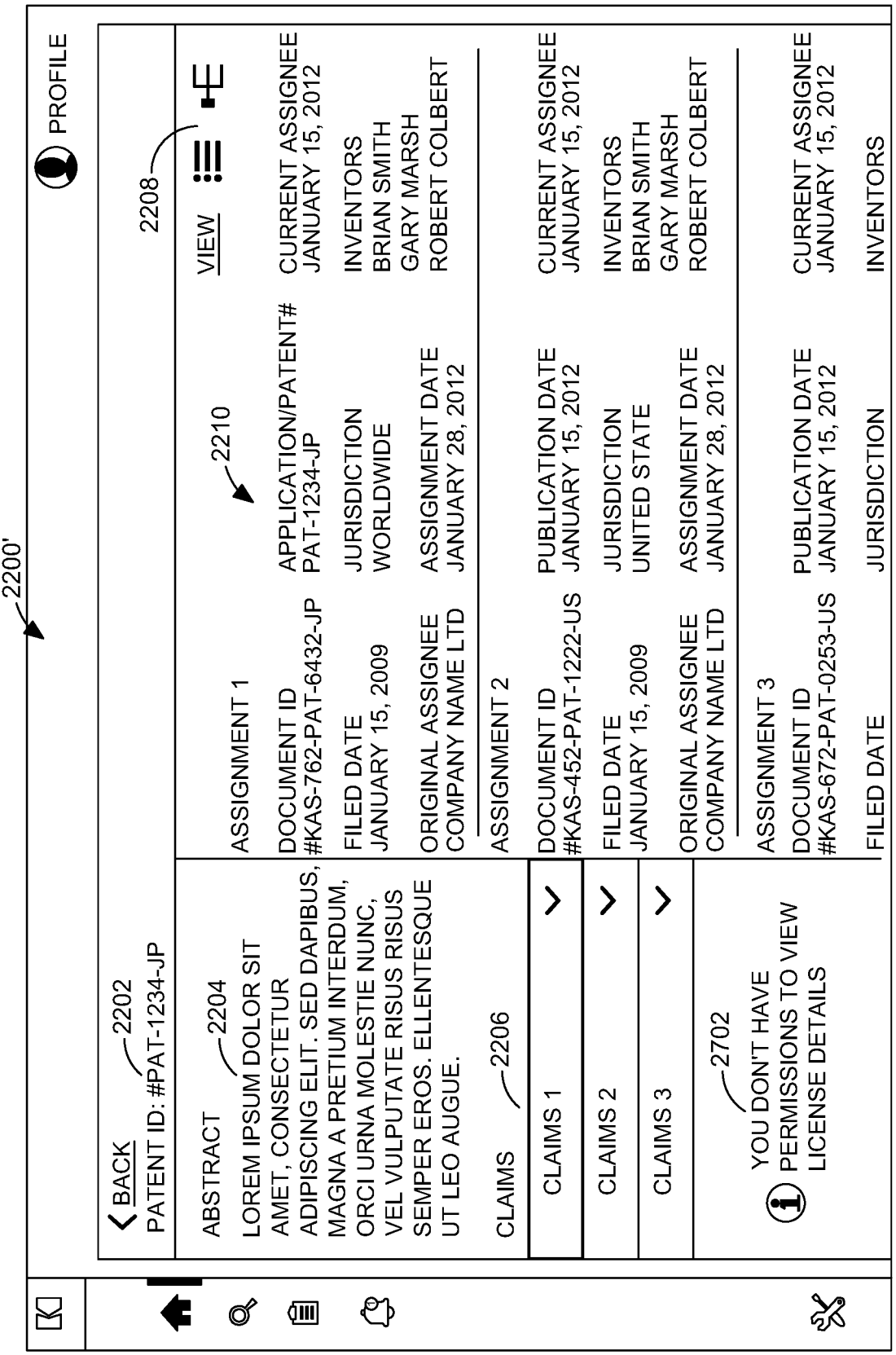

FIG. 5 provides a flowchart illustrating processes, steps, procedures, operations, and/or the like for capturing an IDR via the distributed ledger system, in accordance with an example embodiment of the present invention;

FIG. 6 provides an example interface of an assignment generation page provided via an IUI, in accordance with an example embodiment of the present invention;

FIG. 7 provides an example interface of an inventor interface provided via an IUI, in accordance with an example embodiment of the present invention;

FIG. 8 provides an example interface of a recordation confirmation message provided via the IUI, in accordance with an example embodiment of the present invention;

FIG. 9 provides a flowchart illustrating processes, steps, procedures, operations, and/or the like for filing for IP rights for an IP asset and attesting to the granting of IP rights based on the filing, in accordance with an example embodiment of the present invention;

FIG. 10 provides an example interface of a team member interface of the IUI, according to an example embodiment of the present invention;

FIG. 11 illustrates an example notification panel/portion of an interface of the IUI, according to an example embodiment of the present invention;

FIG. 12 provides a flowchart illustrating processes, steps, procedures, operations, and/or the like for performing a search and providing an attestation that the search was performed via the distributed ledger system, in accordance with an example embodiment of the present invention;

Figure 13:
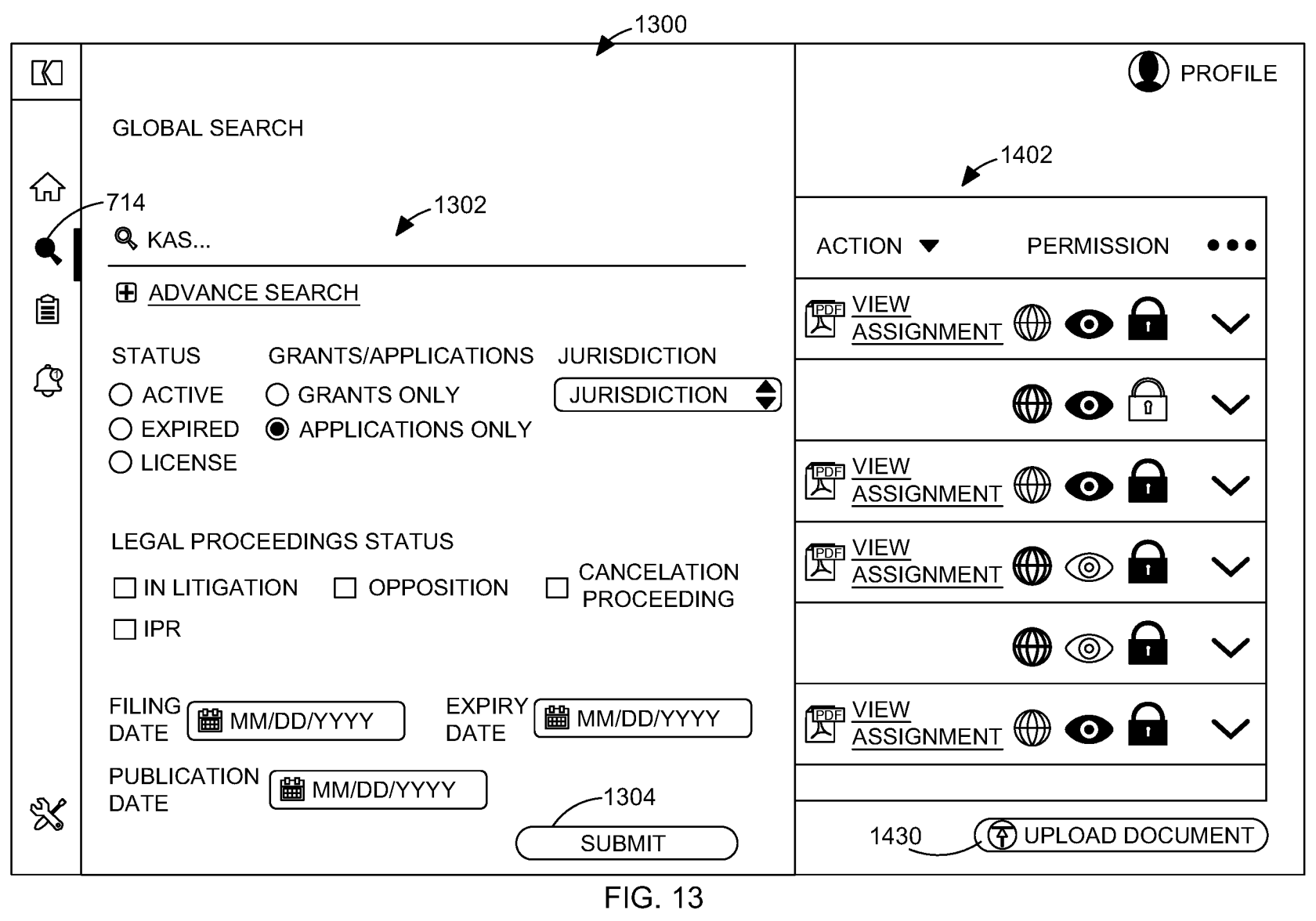

FIG. 13 provides an example search panel/portion of the IUI, according to an example embodiment of the present invention;

FIG. 14 provides an example search result panel/portion of the IUI, according to an example embodiment of the present invention;

FIG. 15 provides a flowchart illustrating processes, steps, procedures, operations, and/or the like for managing renewal (e.g., trademark renewals, payment of maintenance fees and/or annuities) of a grant for IP rights corresponding to an IP asset, according to an example embodiment of the present invention;

FIG. 16 provides a flowchart illustrating processes, steps, procedures, operations, and/or the like for capturing and recording legal proceeding details, according to an example embodiment of the present invention;

FIG. 17 provides a flowchart illustrating processes, steps, procedures, operations, and/or the like for executing a license and/or sale agreement via the distributed ledger system and recording transactions corresponding to the execution of the license and/or sale agreement via the distributed ledger, according to an example embodiment of the present invention;

FIG. 18 provides an example smart contract generation panel/portion provided via the IUI for generation of a smart contract corresponding to a license and/or sale agreement, according to an example embodiment of the present invention;

FIG. 19 provides an example counter-party agreement notification that may be provided to a user associated with a counter-party (e.g., licensee) of a license and/or sale agreement via the IUI, in accordance with an example embodiment of the present invention;

FIG. 20 provides a flowchart illustrating various processes, steps, procedures, operations, and/or the like for providing the results of a due diligence search, in accordance with an example embodiment of the present invention;

FIG. 21 provides an example view of a due diligence search interface of the IUI, in accordance with an example embodiment of the present invention;

FIG. 22 provides an example view of a chain of title list view panel/portion of the IUI, in accordance with an example embodiment of the present invention;

Figure 23:
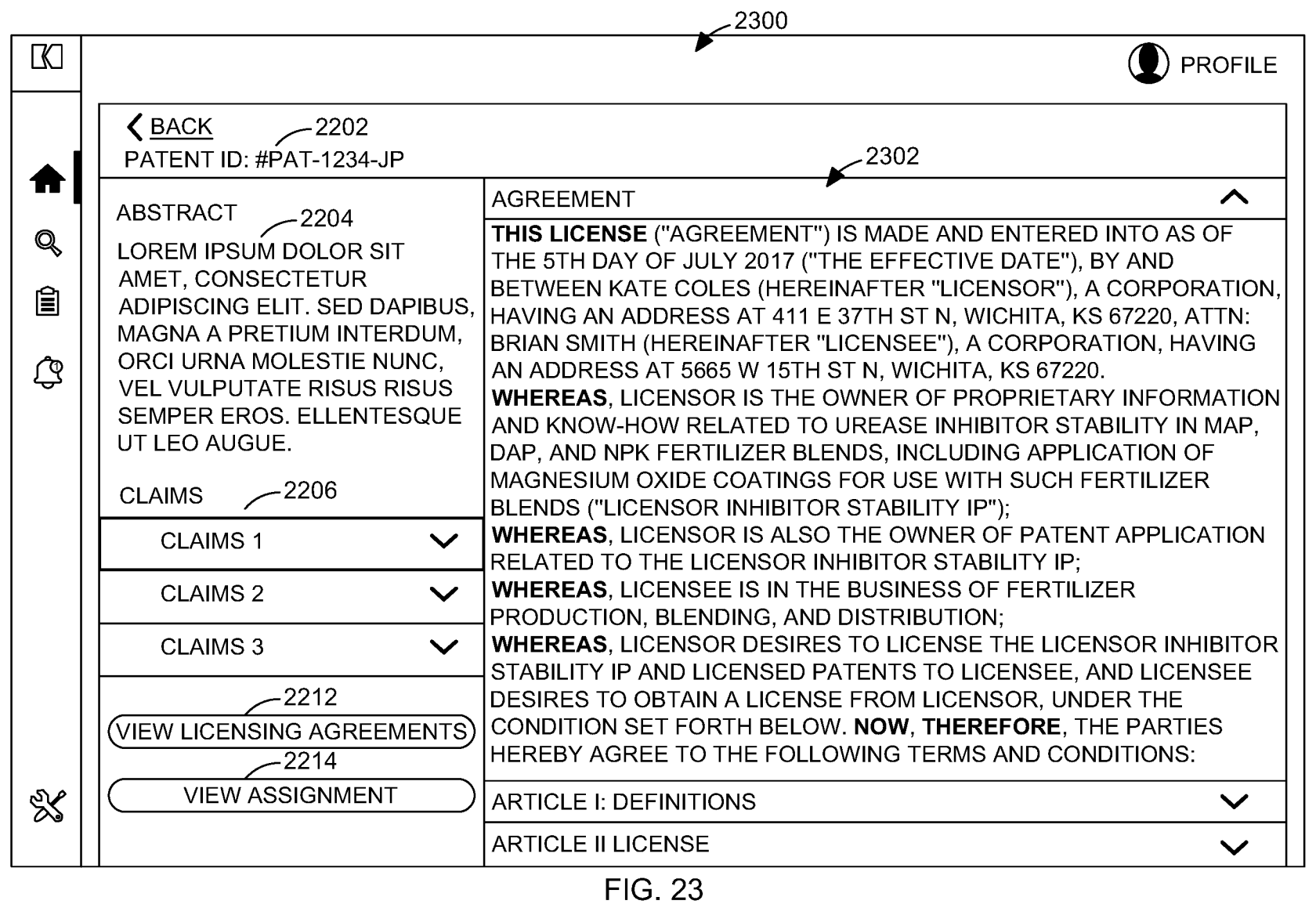

FIG. 23 provides an example view of a license agreement panel/portion of the IUI, in accordance with an example embodiment of the present invention;

FIG. 24 provides an example view of a chain of title tree view panel/portion of the IUI, in accordance with an example embodiment of the present invention;

FIG. 25 provides an example view of an assignment summary pop-up of the IUI, in accordance with an example embodiment of the present invention;

FIG. 26 provides an example view of a license summary pop-up of the IUI, in accordance with an example embodiment of the present invention;

FIG. 27 provides an example chain of title list view panel/portion that may be provided via the IUI when a user corresponding to a user profile that is not permitted and/or allowed to view licensing agreements and assignments corresponding to an IP asset access the chain of title list view panel/portion corresponding to the IP asset, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Brief Overview

Various embodiments provide an asset management distributed ledger system, referred to as the distributed ledger system herein. In various embodiments, the distributed ledger system is configured for capturing, storing, and providing access to asset information/data. The distributed ledger system is configured for capturing and storing asset information/data such as assignment information/data, innovation disclosures (e.g., IDRs), grant/issue information/data, maintenance and/or expiry information/data, search and/or due diligence investigation information/data, licensing/sale information/data, and/or the like. For example, the distributed ledger system may capture and store asset information/data that provides a complete record of an asset. The distributed ledger system is further configured to provide access to the asset information/data via an IUI or search function of the distributed ledger system. In various embodiments, the distributed ledger system is a blockchain system. A blockchain system is a particular implementation of a distributed ledger system—the terms blockchain, blockchain system, distributed ledger, distributed ledger system, ledger, and/or the like are used herein interchangeably.

In various embodiments, a distributed ledger is a data store that is stored by a plurality of nodes that may be geographically separated. In various embodiments, each node of a distributed ledger may comprise one or more node computing entities. The copies of the distributed ledger are stored by the plurality of nodes of the distributed leger. To ensure the validity of instances of information/data stored in the distributed ledger, to ensure transactions and/or value exchanges are properly and appropriately carried out, and/or to ensure that events (e.g., instances of information/data, transactions and/or value exchanges, and/or the like) written to the distributed ledger are in the appropriate format, a consensus and/or voting process may be used.

II. Computer Program Products, Methods, and Computing Entities

Embodiments of the present invention may be implemented in various ways, including as computer program products that comprise articles of manufacture. Such computer program products may include one or more software components including, for instance, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to step/operation diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For instance, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

Figure 1A:
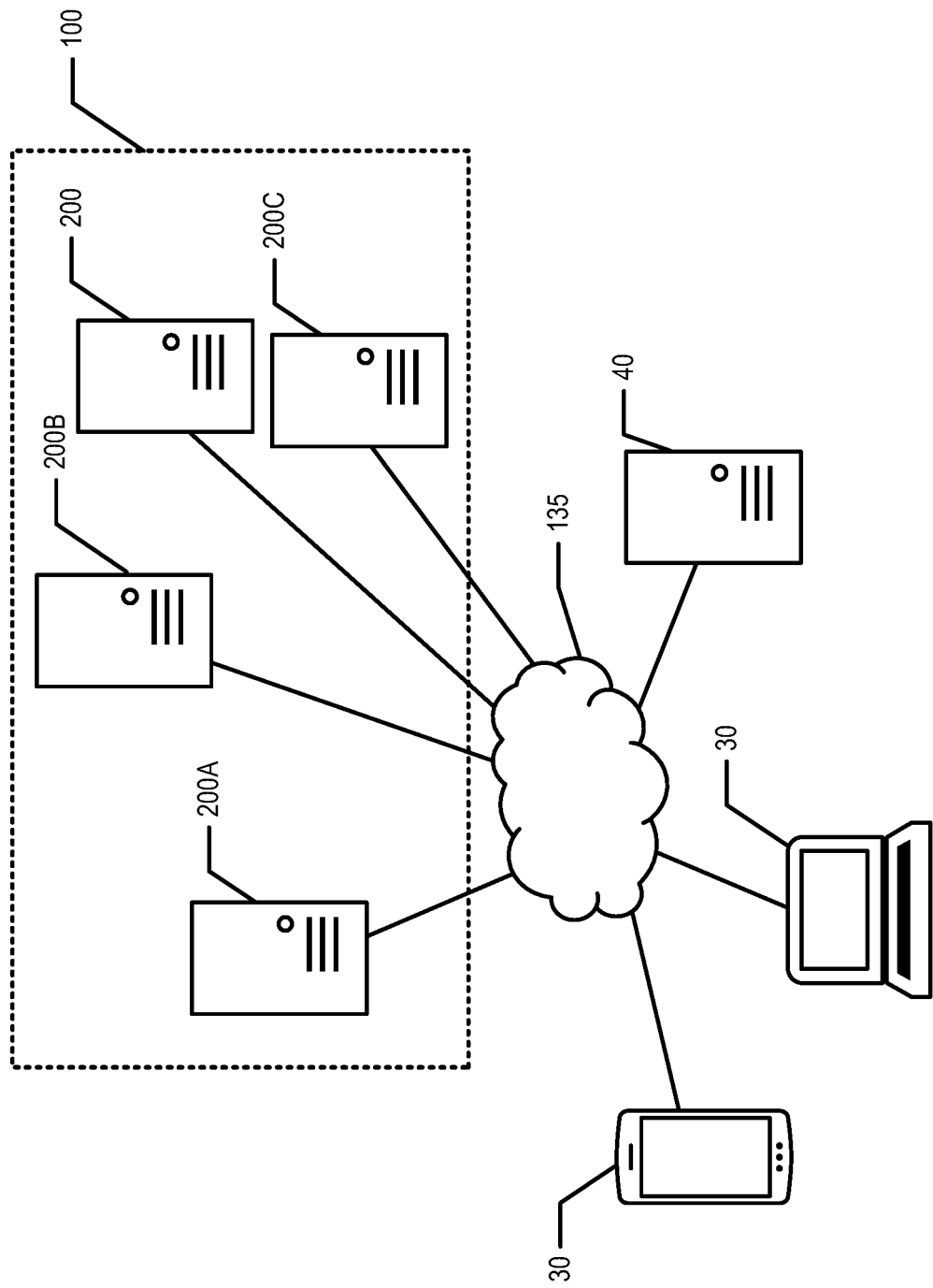
FIG. 1A is a diagram of a system that can be used to practice various embodiments of the present invention.
Figure 1B:
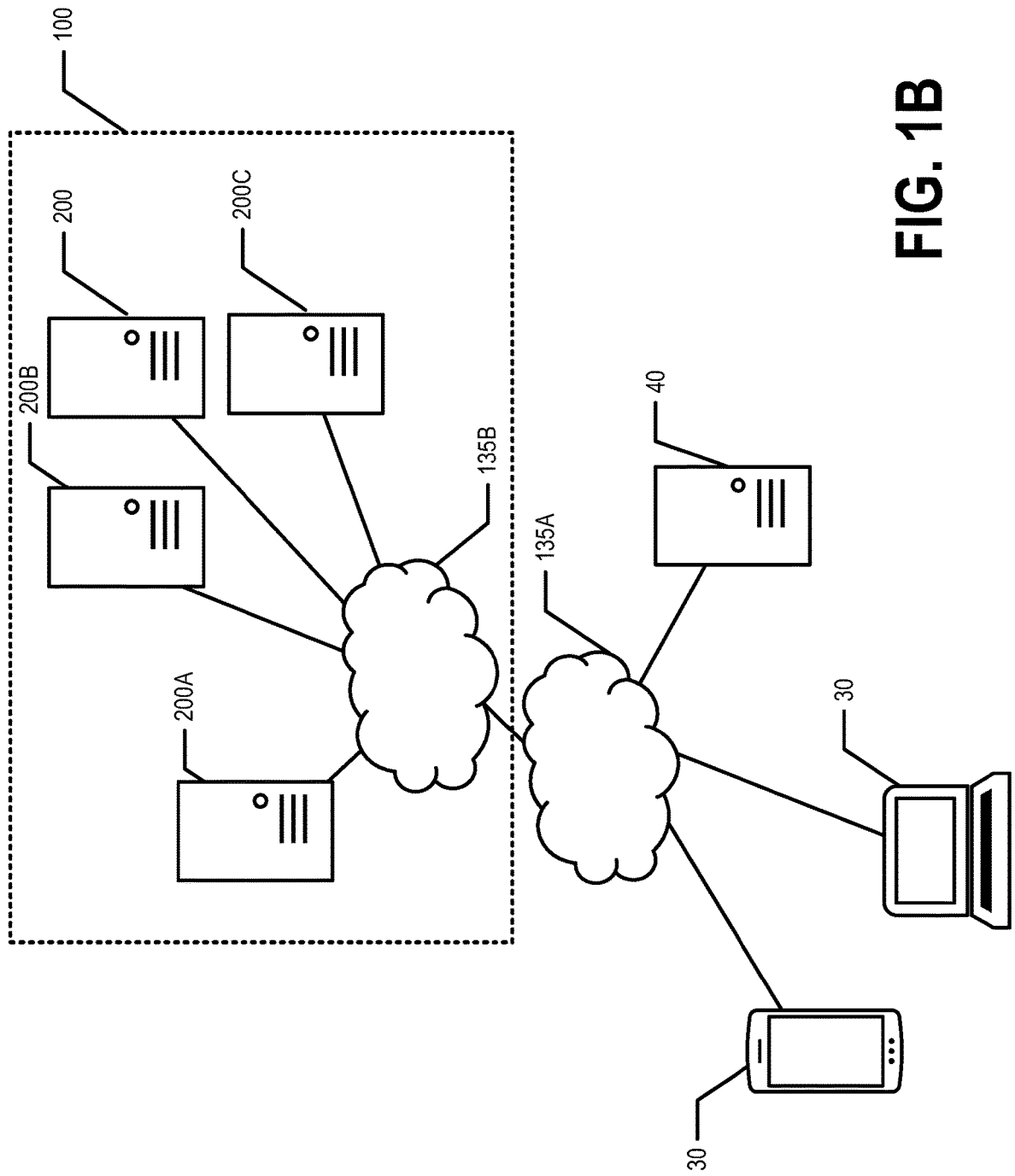
FIG. 1B is a diagram of another system that can be used to practice various embodiments of the present invention.

FIG. 1A provides an illustration of a system that can be used in conjunction with various embodiments of the present invention. As shown in FIG. 1A, the system may comprise a distributed ledger system 100 comprising a plurality of node computing entities 200. In various embodiments, the node computing entities 200 are nodes of the distributed ledger of the distributed ledger system 100. As shown in FIG. 1A, the system may further comprise one or more user computing entities 30, one or more external computing entities 40, one or more networks 135, and/or the like. FIG. 1B provides an illustration of another system that can be used in conjunction with various embodiments of the present invention. As shown in FIG. 1B, the system may comprise a distributed ledger system 100 comprising a plurality of node computing entities 200, 200' and one or more internal and/or private networks 135B. For example, in an example embodiment, the distributed ledger system 100 comprises a two or more node computing entities 200, 200' in communication with one another via an internal and/or private network 135B. For instance, the internal and/or private network 135B may be an internal or private network. As shown in FIG. 1B, the system may further comprise one or more user computing entities 30, one or more external computing entities 40, one or more other and/or external networks 135A, and/or the like. For example, the other and/or external network 135A may be external, public, and/or a different network from the internal and/or private network 135B. For instance, the external network 135A may be the Internet. Each of the components of the system may be in electronic communication with, for example, one another over the same or different wireless or wired networks 135, 135A, 135B including, for instance, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
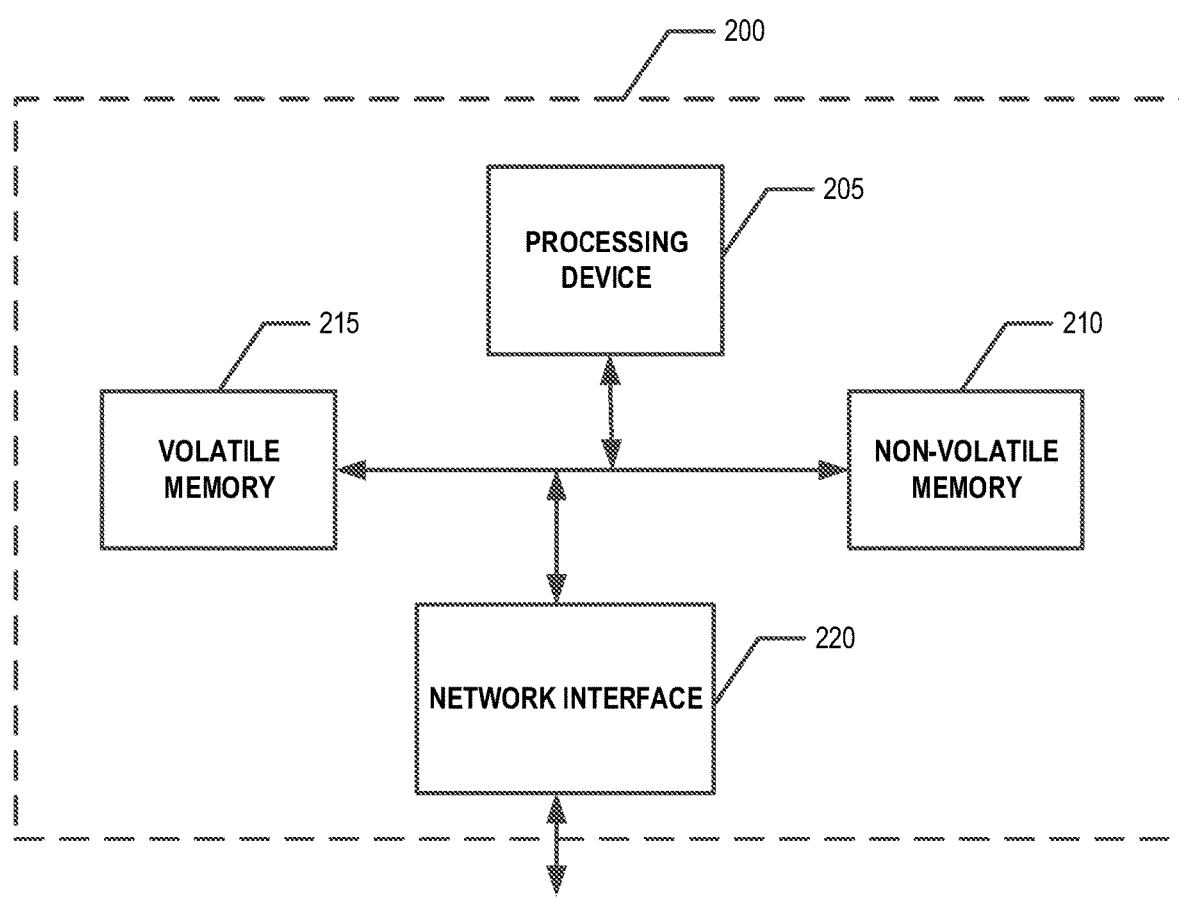
FIG. 2 is a schematic of a node computing entity in accordance with certain embodiments of the present invention.

FIG. 2 provides a schematic of a node computing entity 200 according to one embodiment of the present invention. In general, the terms node computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for instance, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In various embodiments, a node computing entity 200 is operated by and/or on behalf of an entity, individual, organization, department of a corporation, and/or the like that is a member of the distributed ledger system 100. In an example embodiment, some or all of the node computing entities 200 are nodes of the distributed ledger of the distributed ledger system 100. For example, a node of a distributed ledger may store a copy of the distributed ledger, participate in consensus and/or voting functions for the distributed ledger, supply instances of asset information/data for recording in the distributed ledger, access instances of information/data from the distributed ledger, and/or the like.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more user computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for instance. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for instance, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200', one or more external computing entities 40, and/or one or more user computing entities 30. In example embodiments, the node computing entity 200 may be in communication with one or more other node computing entities 200, 200' configured for submitting instances of information/data; validating instances of information/data; accessing and/or providing access to instances of information/data; managing time dependent values of data assets within the distributed ledger (e.g., instances of information/data), tokens, and/or data access costs; performing consensus processing; storing a copy of a distributed ledger; and/or the like. In an example embodiment, the distributed ledger is a blockchain.

b. Another Exemplary Node Computing Entity

Figure 3:
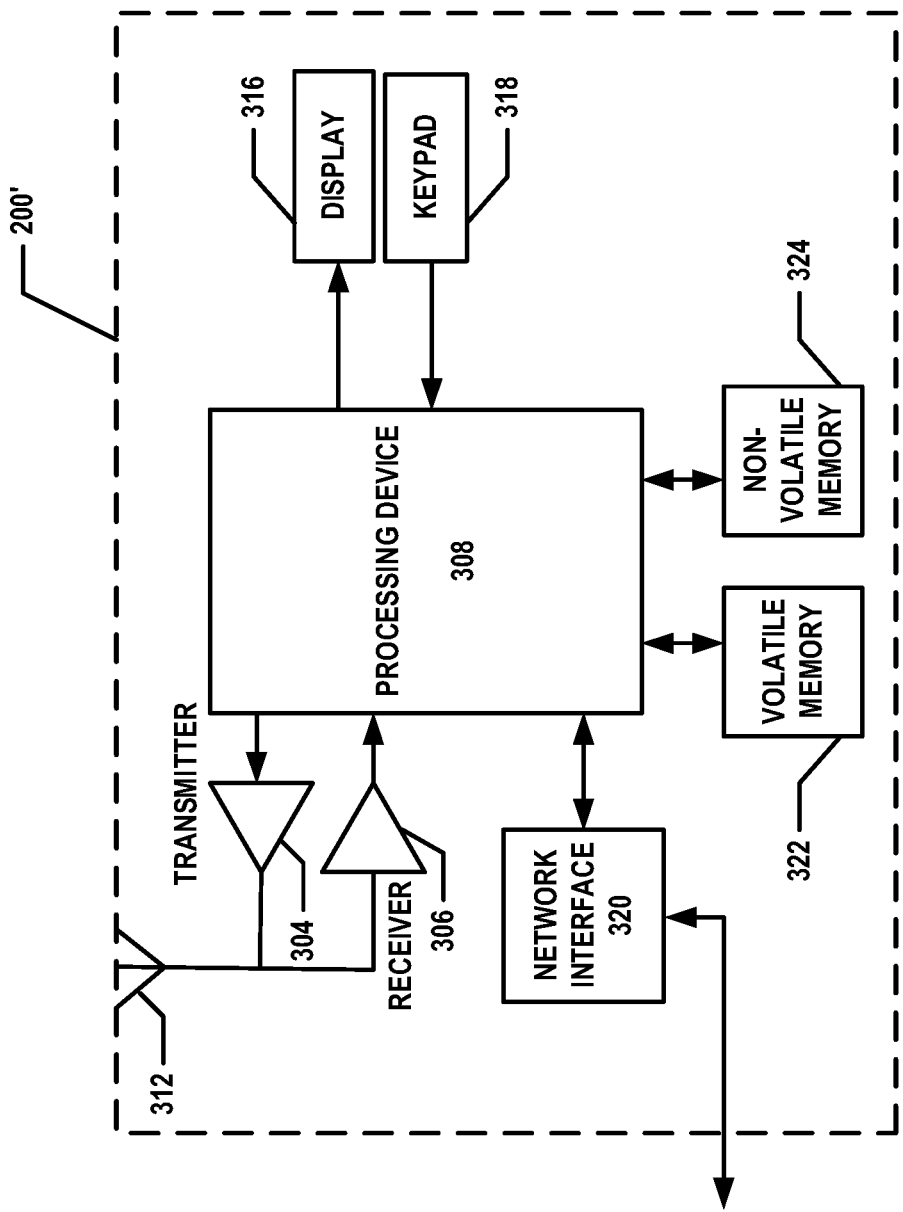
FIG. 3 is a schematic of another node computing entity in accordance with certain embodiments of the present invention.

FIG. 3 provides an illustrative schematic representative of another node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more user computing entities 30, and/or the like. In this regard, the node computing entity 200' may be capable of operating with one or more air interface standards, communication protocols, modulation types, and access types. More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for instance, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For instance, the user output interface may be configured to provide an application, browser, user interface, interface, dashboard, screen, webpage, page, and/or similar words used herein interchangeably executing on and/or accessible via the node computing entity 200' to cause display or audible presentation of information/data and for user interaction therewith via one or more user input interfaces. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect information/data, user interaction/input, and/or the like.

The node computing entity 200' can also include volatile storage or memory 322 and/or non-volatile storage or memory 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

In example embodiments, the node computing entity 200' may be in communication with one or more other node computing entities 200, 200', one or more external computing entities 40, and/or one or more user computing entities 30. In example embodiments, the node computing entity 200' may be in communication with one or more other node computing entities 200, 200' configured for submitting instances of information/data; validating instances of information/data; accessing and/or providing access to instances of information/data; managing time dependent values of data assets within the distributed ledger (e.g., instances of information/data), tokens, and/or data access costs; performing consensus processing; storing a copy of a distributed ledger; and/or the like. In an example embodiment, the distributed ledger is a blockchain.

c. Exemplary User Computing Entity

In an example embodiment, a user computing entity 30 may be a computing entity configured for user interaction (e.g., via one or more user interface devices thereof) for providing and/or accessing one or more instances of asset information/data to/from the distributed ledger. In various embodiments, a user may be a person interacting with a user computing entity 30 (e.g., via the user interface devices thereof) or a machine user (e.g., an application, service, and/or the like operating on the user computing entity 30). In various embodiments, the user computing entity 30 may be a computing entity external to the distributed ledger (e.g., the user computing entity 30 is not a node of the distributed ledger). In an example embodiment, a user computing entity 30 may be a node computing entity 200, 200'.

In an example embodiment, a user computing entity 30 may be in communication with one or more node computing entities 200, 200' and/or one or more external computing entities 40 via one or more wired or wireless networks 135. In one embodiment, the user computing entity 30 may include one or more components that are functionally similar to those of a node computing entity 200, 200'. For example, in one embodiment, a user computing entity 30 may include: (1) a processing element that communicates with other elements via a system interface or bus; (2) a user interface comprising one or more user interface devices (e.g., display, touchscreen display, hard or soft keyboard, mouse, and/or other user input and/or output devices); (3) transitory and non-transitory memory; and (4) a network and/or communications interface configured to communicate via one or more wired or wireless networks 135. For instance, the user computing entity 30 may receive user input (e.g., via the user input interface thereof) and provide (e.g., transmit) an indication of the user input to one or more node computing entities 200, 200' (e.g., via the network and/or communications interface). In another example, the user computing entity 30 may receive asset information/data provided by one or more node computing entities 200, 200' and provide at least a portion of the received asset information/data via an IUI provided via the user interface.

d. Exemplary External Computing Entity

In an example embodiment, an external computing entity 40 may be a computing entity operated by and/or on behalf of a member entity of the distributed ledger system that is not a node of the distributed ledger. For example, an external computing entity 40 may be a computing entity that stores and/or operates one or more member entity systems, such as docketing programs, financial programs, enterprise resource planning (ERP) systems, and/or the like, used by a member entity. In an example embodiment, an external computing entity 40 may be operated by and/or on behalf of a government entity and/or organization (e.g., an intellectual property office) and configured to store and/or provide access to public government records (e.g., the Official Gazette, electronic patent assignment system (EPAS), and/or the like). In various embodiments, an external computing entity 40 may interact with the distributed ledger and/or the distributed ledger system 100 via an external application integration module 414 (shown in FIG. 4). For example, member entity systems, such as docketing programs, financial programs, ERP systems, patent application information retrieval systems, and/or the like, may provide asset information/data to and/or access information/data from the distributed ledger. For example, an external computing entity 40 the external application integration module 414 may provide for integration between member entity systems (e.g., operating on external computing entities 40) and the distributed ledger system 100 such that member entities may customize their own IP management systems and/or IUIs provided to corresponding users while still experiencing the advantages of the distributed ledger system 100.

In an example embodiment, an external computing entity 40 may be in communication with one or more node computing entities 200, 200' and/or one or more user computing entities 30 via one or more wired or wireless networks 135. In one embodiment, the external computing entity 40 may include one or more components that are functionally similar to those of a node computing entity 200, 200'. For instance, in one embodiment, an external computing entity 40 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135.

e. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for instance, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary System Operation

Figure 4:
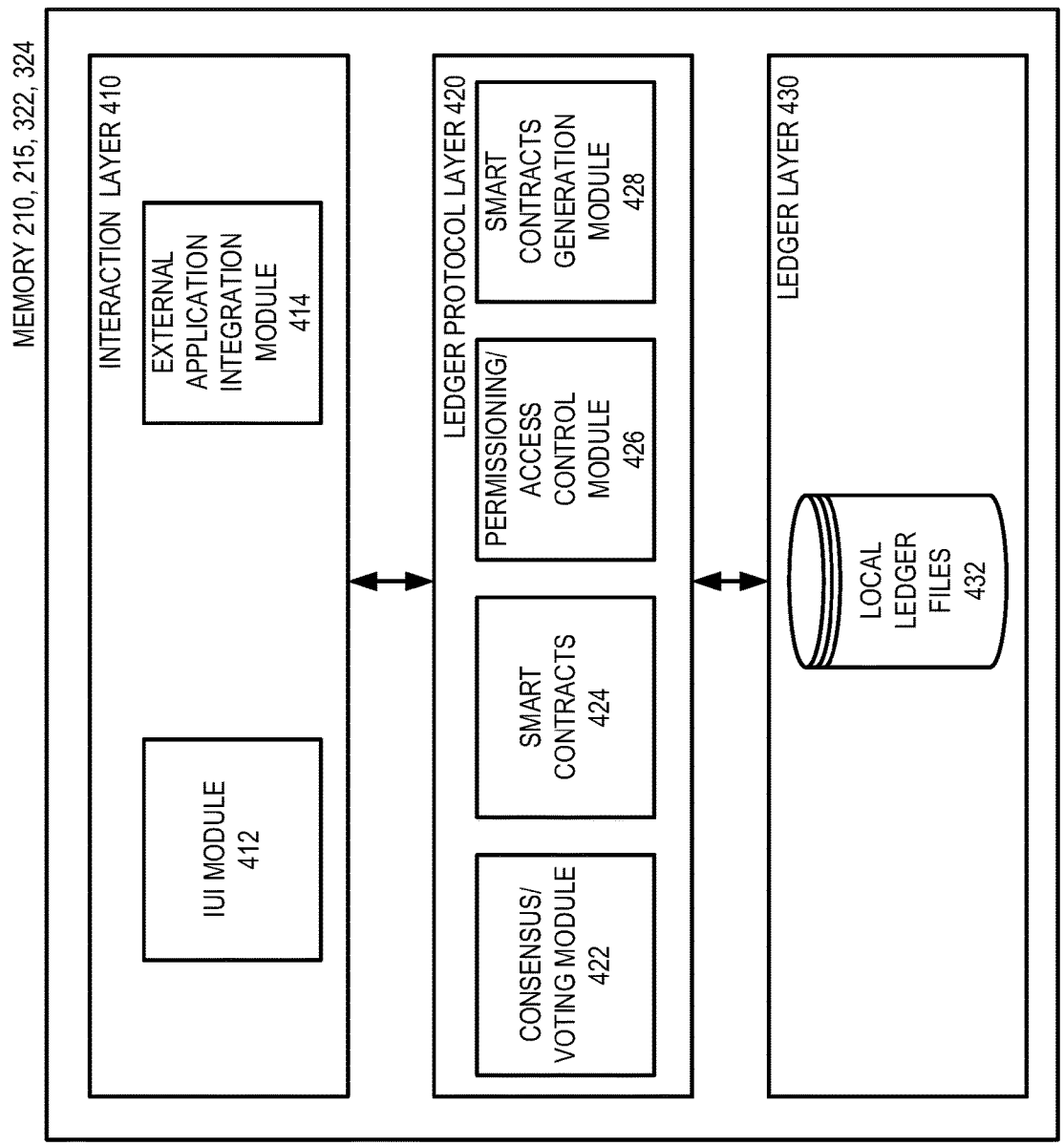
FIG. 4 is a schematic illustration of the distributed ledger system, in accordance with an example embodiment of the present invention.

FIG. 4 illustrates an example schematic diagram of modules of the stored in memory 210, 215, 322, 324 of a node computing entity 200, 200'. Each of the modules provide functionality to the distributed ledger system 100. The interaction layer 410 comprises the IUI module 412 and external application integration module 414. The IUI module 412 comprises executable computer code that, when executed by a processing element or device (e.g., 205, 308), causes a user interface of the node computing entity 200, 200' and/or a user interface of a user computing entity 30 to provide a IUI for a user to provide asset information/data and/or for a user to view and/or consume asset information/data. The external application integration module 414 is configured to provide an access point to the distributed ledger system 100 for applications external to the distributed ledger system 100 (e.g., machine users, and/or other applications). For example, the external application integration module 414 may expose one or more application programming interfaces (APIs) that may allow external applications (e.g., docketing programs; financial programs; systems, applications, and programs (SAP) and/or ERP systems; parsing programs; and/or the like) to access various elements of the distributed ledger system 100.

The ledger protocol layer 420 comprises modules configured to act as intermediaries between the IUI module 412 and the distributed ledger itself. For instance, the ledger protocol layer 420 may comprise a voting/consensus module 422, one or more smart contracts 424 and/or a module configured for generating smart contracts, a permissioning/access control module 426, and/or the like. For example, the voting/consensus module 422 may be configured to perform a consensus and/or voting process on instances of asset information/data to be recorded/stored to the distributed ledger (e.g., written to the local distributed ledger files 432). In various embodiments, the permissioning/access control module 426 may be configured to control which users are provided with access to which instances of information/data. In various embodiments, the permissioning/access control module 426 may consider a user identifier, member entity identifier, and/or role associated with a user profile; an asset identifier, an asset type, an instance of information/data type, and/or an asset status indicator corresponding to an asset and/or a particular instance of asset information/data to determine which users are able to access the particular instance of asset information/data. Thus, the modules of the ledger protocol layer 420 control the recording of information/data to the distributed ledger and the access of information/data from the distributed ledger.

In various embodiments, the ledger layer 430 comprises local ledger files 432. The local ledger files 432 comprise a copy of the distributed ledger stored by the node computing entity 200.

In various embodiments, the distributed ledger system 100 provides transparent, accurate, and comprehensive asset information/data. For example, various embodiments provide enhanced traceability of assets through the asset lifecycle in the overall ecosystem. For example, various embodiments provide enhanced traceability of IP assets through the IP asset lifecycle in the overall IP ecosystem. Various embodiments provide improved transactions, minimize business, legal, and/or reputational risk, and provide improved accessibility to IP asset information/data. Various embodiments improve the quality of asset information/data across the overall ecosystem and across various entities within the ecosystem. Various embodiments reduce errors and associated fees through use of verifiable asset information/data. Various embodiments record relevant and new asset information/data in the distributed ledger with a clear indication of users assigned and/or associated with each asset. Various embodiments provide for capturing asset information/data that has not been traditionally captured (e.g., the capturing of assignment data prior to the submission of an IDR corresponding to the IP asset). Various embodiments provide increased transactional efficiency by providing seamless and quick submission of documents and/or asset information/data between entities that are members of the distributed ledger system 100. For example, various embodiments reduce intermediaries and fees associated therewith. In another example, the exchange of value (e.g., corresponding to the licensing and/or sale of IP assets) between entities that are members of the distributed ledger system 100 is conducted through smart contracts, in an example embodiment. Various embodiments provide for increased collaboration between entities that are members of the distributed ledger system 100 and between users within a member entity (e.g., collaboration between users/employees/inventors and users that are part of the legal team and/or intellectual property team). For example, various embodiments encourage the improved sharing of knowledge about IP assets throughout the IP asset ecosystem.

In various embodiments, a distributed ledger has a plurality of members. Each member may be an entity such as an individual, organization, department of a corporation, corporation, and/or the like. Each member may have one or more users and/or user profiles associated therewith. For instance, a user may be an employee of a member entity. Each user profile may be associated with a use identifier configured to identify the user (e.g., employee identification number, user's name, and/or the like), a member entity identifier configured to identify the member entity corresponding to the user, a role indicator configured to indicate a role corresponding to the user's position at the member entity, one or more project identifiers each identifying a project the user is assigned to, and/or the like. Some example roles include employer, administrator, employee, inventor, legal team, assignor, assignee, licensor, licensee, lessor, lessee, and/or the like. In an example embodiment, a role indicator may indicate the role of the user within the member entity and one or more projects assigned to the user. In various embodiments, the permissioning/access control module 426 of the distributed ledger system 100 may be configured to use the user identifier, member entity identifier, and/or role indicator to determine types and/or instances of asset information/data that a user may access. In various embodiments, the user profiles may be stored in the distributed ledger, by a user profile database and/or module of the ledger protocol layer 420, and/or in a separate manner. For example, each member entity may store a user profile database (e.g., stored in an external computing entity 40 and/or the like) comprising user profiles corresponding to the users associated with the member entity.

In various embodiments, member entities may be able to purchase and/or license for use one or more computer programs and/or applications via the distributed ledger system 100 that provide functionality that may use the asset information/data stored in the distributed ledger. For example, a member entity may purchase and/or license for use a computer program and/or application via the distributed ledger system 100 configured to allow a user to compare IP asset portfolios, participate in fractional trading and/or investment in IP assets, perform various analyses of asset information/data stored in the distributed ledger, perform various docketing procedures, and/or the like. In an example embodiment, one or more of the computer programs and/or applications available for purchase and/or licensing for use via the distributed ledger system 100 may be configured to gain added value from asset information/data stored in and/or recorded to the distributed ledger. For example, one computer program and/or application may be configured to receive (e.g., via user interaction with an IUI provided via a user interface of a user computing entity 30) information/data identifying an IP asset portfolio (e.g., an IP asset portfolio owned by a member entity corresponding to the user), identify one or more similar IP asset portfolios (e.g., similar in term age, countries filed, renewal rates, and/or other properties), generate a comparison between the IP asset identified by the user input and the one or more similar IP asset portfolios for a plurality of criteria, and provide the comparison for user consumption via the IUI. In an example embodiment, information/data regarding the one or more similar IP asset portfolios is provided in an anonymous manner (e.g., identifying information/data regarding the owner of a similar IP asset portfolio and/or one or more IP assets within the portfolio may not be provided).

Various aspects of the operation of the distributed ledger system 100 and user interaction therewith will now be described in more detail.

a. Innovation Disclosure Report (IDR) Capture

Various embodiments provide a distributed ledger system 100 configured to capture and record information/data regarding IP assets and corresponding assignments of the IP assets at the earliest time possible. For instance, various embodiments of the distributed ledger system 100 are configured to capture and/or receive an IDR regarding a new IP asset and record/store the IDR and/or information/data regarding the IDR in association with an assignment of the corresponding IP asset. For example, the assignment corresponding to the IDR may be captured at the time the IDR is submitted via the IUI provided via the distributed ledger system 100. Various embodiments provide an IUI configured to capture and/or receive IDRs and corresponding assignments. Various embodiments provide an IUI configured to provide (e.g., display) IDRs and/or information/data regarding an IDR and/or assignment information/data corresponding to the IDR. In various embodiments, the IP asset may be captured during the development of the IP asset (e.g., prior to the submission of an IDR). In various embodiments, the distributed ledger system 100 may be configured to record/store assignment agreements such that the chain of title of IP assets, even IP assets captured while still in development, may be clear (e.g., based on the terms of the recorded/stored assignment agreement and/or development agreement). In various embodiments, the assignment agreement describes the relationship being an entity (e.g., an employer) and IP assets generated by an individual (e.g., a user/employee). In various embodiments, the assignment agreement is an employment agreement and/or a portion thereof between an entity (e.g., an employer) and an individual (e.g., a user/employee).

FIG. 5 provides a flowchart illustrating processes, steps, procedures, operations, and/or the like for capturing an IDR, and an assignment corresponding to the innovation disclosed in the IDR, according to an example embodiment. Starting at step/operation 502, an assignment agreement and/or a portion thereof may be received. For instance, a user may access a user portal and provide information/data corresponding to an assignment agreement. For example, the user may be a member of a human resources team or a member of a legal team associated with a member entity, and the assignment agreement may be an agreement between the member entity and an employee of the member entity. In an example embodiment, the assignment agreement is an employment agreement and/or a portion thereof. In an example embodiment, an entire employment agreement may be received. In another example embodiment, only a portion of an employment agreement corresponding to IP rights may be received. In an example embodiment, the assignment agreement may be recorded/stored to the distributed ledger in association with the member identifier corresponding to the member entity and the user identifier corresponding to the user/employee. For instance, a node computing entity 200 may receive the assignment agreement, one or more associated user identifiers, the associated member identifier, and/or the like and cause the assignment agreement and/or assignment agreement details to be recorded/stored to the distributed ledger in association with the member identifier and the one or more user identifiers. In various embodiments, the assignment agreement details comprises information/data corresponding to the assignment agreement and metadata corresponding to the information/data corresponding to the assignment agreement. For example, in an example embodiment, the assignment agreement details comprise one or more employee identifiers (e.g., user identifiers identifying the users/employees who are party to the assignment agreement); one or more employer identifiers (e.g., an identifier identifying the employer who is party to the assignment agreement); one or more assignee identifiers (e.g., a member or other entity identifier configured to identify the entity to whom the user/employee is to assign IP assets in accordance with the assignment agreement); one or more IP asset identifiers that identify IP assets that correspond to the included employee identifiers and that fall under the assignment agreement (e.g., the users identified by the employee identifiers are the inventors of the identified IP assets); one or more assignor identifiers that identify the entity assigning the IP assets to the assignee (if different from the employer); an effective and/or start date of the assignment agreement; an end date of the assignment agreement; an assignment agreement and/or document reference number; terms and/or conditions of the assignment agreement (possibly as logic statements); and/or the like. In other example embodiments, corresponding identifiers can be used for IP assets created and assigned from or to a collaboration counter-party in accordance with the terms of a development agreement (e.g., a joint development agreement (JDA)).

In various embodiments, an IP asset may be captured during the development of the IP asset (e.g., prior to the submission of an IDR). As early capture (e.g., during the development of the IP asset and/or prior to the submission of the IDR) permits capturing of the inventorship of various aspects of the IP asset at the development stage, various embodiments enable the determination of the inventors of an IP asset. As the assignment agreement for the user/employees inventing and/or developing the IP asset is recorded/stored in the distributed ledger, the ownership of the developing IP asset may be clear (e.g., based on the terms and/or conditions of the assignment and/or development agreement). For instance, the project specific portal may be configured to capture development information/data corresponding to the project. For example, the development information/data may comprise images, summaries, transcripts, audio recordings, and/or the like documenting brainstorming sessions corresponding to the project, experiment and/or simulation planning information/data, experiment and/or simulation results, modifications made to experiments and/or simulations, prototyping information/data, and/or the like, such that the IP asset is captured through the project specific portal as the IP asset is developed. For instance, the project specific portal may comprise a shared lab book accessible to users assigned to the project such that as the project progresses and the IP asset is developed, the shared lab book captures the developing IP asset. In another example embodiment, the webpages, portals, shared folders and/or community collaboration tools and platforms, calendars, instant messaging and/or chat room, wiki, documentation, and/or the like of the project specific portal are configured to capture the IP asset as the IP asset is being developed. The user identifiers providing various development information/data may be captured. In an example embodiment, the names of users/employees (and/or outside parties, if applicable) named in the development information/data may be identified and user identifiers corresponding thereto may be linked to the development information/data.

In various embodiments, the user computing entity 30 may provide (e.g., transmit) the development information/data and/or an indication thereof such that the node computing entity 200 receives the development information/data. In an example embodiment, the user computing entity 30 may provide the development information/data such that an external computing entity 40 receives and stores the development information/data. In an example embodiment, development information/data, a document reference to a file containing development information/data, a hash of development information/data, and/or other indication of the development information/data may be recorded/stored in the distributed ledger of the distributed ledger system 100 in association with the assignment details corresponding to the user identifiers of the users that are expected to be the inventors of the IP asset based on the development information/data. For example, the node computing entity 200 may cause the voting/consensus module 422 to initiate a voting/consensus process to record/store an indication of the development information/data to the distributed ledger in association with the assignment agreement details.

In an example embodiment, one or more machine learning models (e.g., artificial neural networks, deep nets, and/or the like) may be configured to periodically and/or on a triggered basis analyze and/or process the project specific portal and extract disclosure information/data (e.g., using a natural language processing engine, in an example embodiment) that the machine learning model expects to corresponding to a developing IP asset. In an example embodiment, the trigger for analyzing and/or processing the project specific portal may be receiving of a new document and/or new development information/data via the project specific portal. In an example embodiment, the machine learning model operates on the node computing entity 200, an external computing entity 40 corresponding to a member associated with the user/employees and/or project, and/or a user computing entity 30. The extracted disclosure information/data may be compiled into a document available through the project specific portal for review, revision, and/or approval by a user assigned to the project. In an example embodiment, an IDR may be generated by user reviewing and/or revising the extracted disclosure information/data. Thus, the IP asset may be captured at the earliest possible point (e.g., during the conception of the IP asset), in various embodiments. In an example embodiment, the ownership of the IP asset is transparent even during the development of the IP asset. In an example embodiment, the disclosure information/data, a document (e.g., file) containing the disclosure information/data, a hash of the disclosure information/data, and/or other indication of the disclosure information/data may be recorded/stored in the distributed ledger of the distributed ledger system 100 in association with the assignment details corresponding to the user identifiers of the users that are expected to be the inventors of the IP asset based on the development information/data and/or the disclosure information/data. For instance, the node computing entity 200 may cause the voting/consensus module 422 to initiate a voting/consensus process to record/store an indication of the disclosure information/data to the distributed ledger in association with the assignment agreement details.

FIG. 6 illustrates an example interface of an example assignment generation interface 600 provided via an IUI, in accordance with an example embodiment. For example, the IUI may be provided via a user interface (e.g., similar to a user interface of node computing entity 200' comprising display 316 and keyboard 318, in an example embodiment) of the user computing entity 30. In various embodiments, the IUI is provided via the user interface of the user computing entity 30 via execution of an IUI module 412 by the user computing entity 30 and/or by a node computing entity 200. In an example embodiment, the user (e.g., operating the user computing entity 30) may access the IUI via an Internet and/or network portal or through a dedicated application operating on the user computing entity 30. In an example embodiment, the assignment generation interface 600 comprises an IP asset identifier 602 identifying the IP asset the assignment is being generated for, an IP asset title 604 for the IP asset identified by the IP asset identifier 602, a user identifier field 606 configured to receive the user identifier of a user (e.g., an employee) who is an inventor (or that may be an inventor) of the IP asset, an email field 608 (or other communication information/data field) for receiving communication information/data for the use identified by the user identifier, an add additional users element 620 that a user may select to add additional user identifiers and corresponding contact information/data for users/employees who are inventors (or that may be inventors) of the IP asset, an effective date of a corresponding assignment agreement field 610, an entity identifier field 612, a JDA element 614 that may be selected to access fields for adding counter-party employer and JDA information/data, a terms and conditions element 616 that may be selected (e.g., clicked, pressed, and/or the like) to access fields for providing terms and conditions of the corresponding assignment agreement, assignee and/or assignor name entry fields 618, save draft element 622, and create and/or store assignment element 624. In an example embodiment, a user may enter (e.g., type, select, and/or the like) an assignor name (e.g., user/employee name) and assignee name (employer name or other entity to whom the IP asset is to be assigned) in the corresponding assignee and/or assignor name entry fields 618 and the user identifier field 606, email field 608, and/or entity identifier field 612 may be automatically populated based on a user profile corresponding to the entered assignor identifier and/or entity profile corresponding to the entered assignee name.

Continuing with FIG. 5, at some point in time, at step/operation 504, the user/employee operates a user computing entity 30 to access an inventor interface provided via the IUI module 412. In an example embodiment, the user computing entity 30 access the IUI via an Internet and/or network portal or through a dedicated application operating on the user computing entity 30. The user/employee provides information/data regarding an invention. For instance, the user/employee may operate the user computing entity 30 (e.g., via one or more user input devices such as a keyboard, mouse, touchscreen, and/or the like) to enter and/or provide information/data regarding or corresponding to an invention. For example, the inventor interface may provide access to an electronic IDR form and the user/employee may enter and/or provide information/data regarding the invention through the electronic IDR form. After entering and/or providing the information/data regarding the invention through the electronic IDR form, the user/employee may submit the electronic IDR form (e.g., by selecting a submit button and/or the like via the IUI). The user computing entity 30 may, in response to the user/employee submitting the electronic IDR form, provide the completed electronic IDR form to a node computing entity 200. For instance, the user computing entity 30 may provide (e.g., via a network interface similar to network interface 220, 320) the completed electronic IDR form such that a node computing entity 200 receives the information/data regarding the invention entered and/or provided by the user/employee.

FIG. 7 provides an example interface of an inventor interface 700, according to an example embodiment. In the illustrated embodiment, the inventor interface 700 comprises access to an electronic IDR form 702, an open task panel/portion 704, a completed task panel/portion 706, a current status panel/portion 708, and a project panel/portion 710. For example, the user may select (e.g., press, click, and/or the like) the access to the electronic IDR form 702 to be provided with a fillable form via the IUI that the user may populate with information/data (e.g., via one or more user input devices) regarding an invention. In another example, a user may upload a word, pdf, or text document comprising information/data regarding an invention using the access to the electronic IDR form 702. The open task panel/portion 704 may provide a list, tiled, or other view of open tasks corresponding to the user/employee. For instance, tasks corresponding to the user/employee may include execution of an inventor declaration, review a draft of an application or office action response, execute an assignment, and/or the like. Each of the tasks corresponds to a particular IP asset. As can be seen from the open task panel/portion 704, each IP asset is associated with and/or corresponds to an IP asset identifier configured to identify the IP asset. In various embodiments, the IP asset identifier is an alphanumeric string or other human or machine readable indicia. In various embodiments, each IP asset may further be associated with a title and/or a status indicator configured to indicate a status of the IP asset. In various embodiments, each task is associated with a due date and/or deadline.

Once a user/employee has completed a task, the completed task may be added to the completed task panel/portion 706. The illustrated embodiment of the completed task panel/portion 706 shows the IP asset identifier, title, status indicator, and filing date of the corresponding IP asset. The completed task panel/portion 706 may further provide the user/employee with access to one or more documents generated, completed, and/or the like during the completion of the corresponding task. For example, if the user/employee has completed the task of executing an inventor declaration, the user/employee may be able to access a pdf copy of the completed inventor declaration via the completed task panel/portion 706.

In various embodiments, the open and completed tasks that populate the open task and completed task panels/portions 704, 706 may be generated based on information/data access from the distributed ledger. In various embodiments, the open and completed tasks that populate the open task and completed task panels/portions 704, 706 may be generated based on information/data stored in and/or managed via an external application that interacts with the distributed ledger system 100 via the external application integration module 414. For instance, the open and completed tasks that populate the open task and completed task panels/portions 704, 706 may be determined, generated, and/or the like based on a docketing program that is maintained by the member entity (e.g., by a node computing entity 200 and/or an external computing entity 40 operated by and/or on behalf of the member entity) corresponding to and/or associated with the user/employee.

In various embodiments, the current status panel/portion 708 may provide a user with a snapshot of the status of various IP assets that the user is associated with. For example, the current status panel/portion 708 may provide a user/employee with information/data regarding the status of one or more patent applications that list the user/employee as an inventor. The information/data provided via the current status panel/portion 708 may be access from and/or generated based on information/data stored in the distributed ledger and/or accessed via a member entity docketing program.

In various embodiments, the project panel/portion 710 provides a user/employee with access to project specific information/data and/or the like for projects to which the user/employee is assigned. For instance, multiple user/employees may be assigned to a project and the IUI may be configured to provide a project specific portal comprising webpages, portals, shared folders and/or community collaboration tools and platforms, calendars, instant messaging and/or chat room functions, a wiki, documentation, and/or the like, corresponding to the project such that a user may access the project specific portal via the project panel/portion 710.

Continuing with FIG. 5, at step/operation 506, the development information/data and/or IDR is stored. In an example embodiment, the user computing entity 30 may store the IDR, provide the IDR to a node computing entity 200 for recording in the distributed ledger, and/or provide the IDR to an external computing entity 40 operated by and/or on behalf of the corresponding member entity for storing the IDR in an innovation disclosure database. In an example embodiment, the IDR is associated with an IP asset identifier and stored in association with the IP asset identifier. For example, the user computing entity 30, external computing entity 40, and/or node computing entity 200 may automatically generate (or request generation thereof from another computing entity) an IP asset identifier that uniquely identifies the IP asset of the IDR within the member entities records (e.g., docketing program) and/or within the distributed ledger. The IDR is then stored in association with the IP asset identifier.

At step/operation 508, an assignment of the IP asset of the IDR is captured. For instance, the user/employee may submit the IDR via the inventor interface 700. The inventor interface 700 may then provide (e.g., display) an assignment assigning the IP asset disclosed in the IDR to the member entity (and/or a related entity) that the user may electronically sign and/or print, sign, scan/electronically capture, and upload the assignment. Thus, for example, the assignment of the IP asset may be captured at the time an IDR disclosing the IP asset is submitted. In an example embodiment, the assignment of the IP asset may cross-reference the assignment agreement corresponding to the user/employee and recorded/stored to the distributed ledger.

At step/operation 510, the IDR and the corresponding assignment are recorded/stored in the distributed ledger. For example, the user computing entity 30 may provide the IDR and the corresponding executed assignment to a node computing entity 200. The node computing entity 200 may then initiate a consensus/voting process (e.g., via the consensus/voting process module 422) for recording the IDR and the corresponding assignment in the distributed ledger. In various embodiments, the IDR is provided to the node computing entity 200 in an encrypted manner to protect the confidentiality of the IDR. In an example embodiment, the recording the IDR and the corresponding assignment to the distributed ledger comprises one or more user identifiers corresponding to the user/employees listed as inventors in the IDR, the IP asset identifier assigned to the IP asset of the IDR, an assignee identifier identifying the member entity and/or related entity to which the inventor(s) assigned the IP asset, one or more assignor identifiers identifying the one or more inventors that completed and submitted the assignment, an innovation disclosure title providing a brief description/title for the IP asset disclosed in the IDR, a timestamp indicating the date and/or time the IDR was submitted via the IUI and/or the date and/or time the IDR and the corresponding assignment are being recorded/stored to the distributed ledger, a status indicator, and/or the like. In an example embodiment, the information/data recorded/stored to the distributed ledger comprises the IDR itself (possibly in an encrypted format). In an example embodiment, the information/data recorded/stored to the distributed ledger does not include the IDR itself, but rather includes an IDR reference number identifying the IDR stored, for instance, by an external computing entity 40 operated by and/or on behalf of the corresponding member entity; a hash of at least a portion of the IDR, and/or the like. In an example embodiment, a status indicator corresponding to an IDR may indicate that the IP asset has been internally disclosed (e.g., within the corresponding member entity), that all named inventors have completed an assignment, that assignments are still needed from one or more inventors, the IP asset has been externally disclosed (e.g., under a confidentiality agreement, via a press release, and/or the like), and/or the like.

FIG. 8 provides an example interface of a recordation confirmation message 800, in accordance with an example embodiment. For example, once a user has submitted a document and/or information/data to be recorded/stored in the distributed ledger of the distributed ledger system 100 (e.g., submitted an IDR and/or corresponding assignment) via the IUI provided by the user computing entity 30, the node computing entity 200 may receive the document and/or information/data to be recorded/stored in the distributed ledger, record/store the document and/or information/data, and provide a confirmation communication such that the user computing entity 30 receives the confirmation communication. The user computing entity 30 may receive and process the confirmation communication, and, in response thereto, provide a recordation confirmation message 800 via the IUI. In an example embodiment, the recordation confirmation message 800 provides an indication that document and/or information/data was recorded/stored to the distributed ledger, a timestamp 802 indicating a date and/or time when the document and/or information/data was recorded/stored, a user identifier 804 of the user that submitted the document and/or information/data, permissioning information/data 806 indicating which users, groups of users, and/or the like are able to access the recorded/stored document and/or information/data, a reference hash 808 that may be used to access the recorded/stored document and/or information/data from the distributed ledger (e.g., the reference hash 808 may be a hash of a location in the distributed ledger where the document and/or information/data was recorded/stored), a done element 810 that may be selected (e.g., clicked, pressed, and/or the like) via the IUI to dismiss the recordation confirmation message 800, and/or the like.

Returning to FIG. 5, at some point in time, at step/operation 512, a request to access the IDR via the distributed ledger is received. For instance, a user operating a user computing entity 30 may provide input via an IUI provided by the user computing entity 30 requesting to view an IDR and/or information/data corresponding to the IDR. The user computing entity 30 may provide (e.g., transmit) a request to access the IDR such that a node computing entity 200 receives the request. In various embodiments, the request to access the IDR may comprise a document reference number identifying the IDR, the IP asset identifier, one or more keywords of the innovation disclosure title, the name of at least one inventor named in the IDR, a requesting user identifier that identifies the user requesting to view the IDR, and/or the like.

At step/operation 514, the node computing entity 200 determines whether the requesting user is permitted and/or allowed to view the requested IDR and/or information/data corresponding to the IDR. For example, the permissioning/access control module 426 may determine if the requesting user is allowed to view the requested IDR and/or corresponding information/data. In an example embodiment, the permissioning/access control module 426 may determine if the requesting user is allowed to access the requested IDR and/or corresponding information/data based on the user identifier of the requesting user (e.g., which may be used to access the corresponding user profile) and the assignee identifier associated with the IDR, the status associated with the IDR, the one or more user identifiers corresponding to the user/employees listed as inventors in the IDR, and/or the like. For instance, the permissioning/access control module 426 may only provide access to the IDR and/or information/data corresponding thereto if the user profile associated with the user identifier of the requesting user include a member identifier that matches and/or is a related party of the entity identified by the assignee identifier of the IDR.

In an example embodiment, the permissioning/access control module 426 may select a permissioning protocol for the IDR based on a status identifier for the IP asset stored in the distributed ledger. In an example embodiment, the permissioning/access control module 426 may search the distributed ledger to identify the most recently recorded/stored status identifier for the IP asset (e.g., using the corresponding IP asset identifier as a key). In an example embodiment, if the most recently recorded/stored status identifier indicates that a patent application corresponding to the IP asset is published, the permissioning/access control module 426 may determine the IDR and/or portion(s) may be accessed by any user corresponding to a valid user profile. In an example embodiment, if the most recently recorded/stored status identifier indicates that a patent application corresponding to the IP asset has been filed with a non-publication request or has not yet been published, the permissioning/access control module 426 may determine the IDR and/or portion(s) may only be accessed by users corresponding to user profiles that list a member entity identifier that matches the assignee identifier of the IDR and/or is known to be a related entity of the entity identified by the assignee identifier of the IDR. For example, User A may be a member of the legal team at Company A and the IDR may be assigned to Company B that is a parent company of Company A, a daughter company of Company A, an IP holding company associated with Company A, and/or the like and, as a result, the permissioning/access control module 426 may determine that User A is allowed to access the IDR. Additionally, the permissioning/access control module 426 may consider an asset type associated with the IP asset to determine if the requesting user is permitted and/or allowed to access information/data corresponding to the IP asset. For instance, if the asset type of the IP asset is trade secret, only requesting users associated with a member identifier that matches the identifier identifying the owner of the IP asset and/or a related entity may access any of the asset information/data corresponding to the IP asset.

If it is determined at step/operation 514 that the requesting user is not permitted to access the requested IDR and/or information/data corresponding thereto, the process continues to step/operation 516. At step/operation 516, the node computing entity 200 may provide (e.g., transmit) an error message such that the user computing entity 30 receives the error message. The user computing entity 30 may receive and process the error message. In an example embodiment, the processing of the error message causes the user computing entity 30 to provide (e.g., display) an error notification via the IUI provided by the user interface of the user computing entity 30. For example, the error notification may state: "Our apologies, but it appears you are not permitted to access the requested IDR. If you believe you are receiving this message in error, please contact your network administrator."

If it is determined at step/operation 514 that the requesting user is permitted to access the request IDR and/or information/data corresponding thereto, the process continues to step/operation 518. At step/operation 518, the node computing entity 200 may access the IDR and/or information/data corresponding thereto from the distributed ledger and provide (e.g., transmit) the IDR and/or information/data corresponding thereto such that the user computing entity 30 operated by the requesting user receives the IDR and/or information/data corresponding thereto. The user computing entity 30 may receive and process the IDR and/or information/data corresponding thereto and provide (e.g., display) at least a portion of the IDR and/or information/data corresponding thereto via the IUI provided by the user interface of the user computing entity 30. In an example embodiment, the information/data corresponding to the IDR is an attestation that an IDR associated with a particular IP asset identifier, having a particular title, naming particular inventors, assigned to a particular assignee, and/or the like was recorded/stored at a date and/or time provided by the timestamp recorded/stored in association with the IDR and/or information/data corresponding thereto. In an example embodiment, the IDR itself and/or the corresponding assignment are provided. In an example embodiment, the determination of whether the IDR is provided and/or an attestation of the recording of the IDR is provided is performed by the permissioning/access control module 426 based on the user profile associated with the user identifier of the requesting user.

b. Filing for IP Rights

Various embodiments of the distributed ledger system 100 are configured to capture and record application filing details, publication details, and/or grant details regarding applications for IP rights corresponding to an IP asset. In various embodiments, application filing details, publication details, and/or grant details comprise information/data corresponding to the application filing, publication, and/or grant, respectively. In an example embodiment, application filing details, publication details, and/or grant details may further comprise metadata corresponding to the information/data, such as a corresponding IP asset identifier, timestamp, IP asset type, status indicator, source of the information/data (e.g., user entry, extracted from an official document such as a Filing Receipt, Notice of Publication, Notice of Issuance, the Official Gazette, and/or the like), and/or other meta data corresponding to the application filing, publication, and/or grant information/data, respectively. Various embodiments provide an IUI configured for receiving application filing details, publication details, and/or grant details for providing such to the distributed ledger system 100 for recordation in the distributed ledger. Various embodiments provide an IUI configured to provide (e.g., display) various elements of the application filing details, publication details, and/or grant details regarding an application for IP rights corresponding to an IP asset.

FIG. 9 provides a flowchart illustrating processes, steps, procedures, operations, and/or the like for filing for IP rights for an IP asset and attesting to the granting of IP rights based on the filing, in accordance with an example embodiment. For instance, a user/employee may have accessed an inventor interface 700 and submitted an IDR. An individual associated with the legal team and/or intellectual property team of the corresponding member entity may review the IDR and decide to purse IP rights corresponding to the IP asset of the IDR by filing an application for IP rights (e.g., a patent application, trademark application, plant variety protection application, utility model application, and/or the like). The process may begin at step/operation 902. In various embodiments, at step/operation 902, outside counsel (e.g., one or more users) may be provided with the IDR for the purposes of drafting an application directed to the IP asset of the IDR. In an example embodiment, the individual associated with the legal team and/or intellectual property team may provide the IDR (e.g., as a pdf document and/or the like) to the outside counsel (e.g., one or more users). In an example embodiment, the user profile corresponding to an outside counsel user may be modified such that the outside counsel user (e.g., a user that is an employee of the outside counsel firm) can access the IDR and/or information/data corresponding thereto from the distributed ledger. In an example embodiment, the status indicator associated with the IP asset may be updated (e.g., by recording a new status indicator associated with the IP asset identifier to the distributed ledger) such that the outside counsel user would be able to access the IDR and/or information/data corresponding thereto via the distributed ledger. For example, a status indicator that indicates that the IDR has been released to Law Firm XYZ or that Law Firm XYZ has power-of-attorney may be recorded/stored such that an outside counsel user associated with Law Firm XYZ (e.g., the user profile corresponding to the outside counsel user includes a member identifier corresponding to Law Firm XYZ) may access the IDR and/or information/data corresponding thereto via the distributed ledger. For example, in an example embodiment, the power-of-attorney for an IP asset, an application corresponding to an IP asset, and/or a portfolio of IP assets may be recorded to the distributed ledger system 100, accessed from the distributed ledger system 100, and/or the like. In an example embodiment, the permissioning/access control module 426 may access a power-of-attorney recorded to the distributed ledger to determine if a user (e.g., associated with an entity named in the power-of-attorney) is allowed to access asset information/data corresponding to an IP asset corresponding to the power-of-attorney.

The application for IP rights may be prepared and filed. At step/operation 904, an indication of the filing of the application for IP rights may be received and information/data regarding the application filing (e.g., application filing details) may be recorded/stored to the distributed ledger. For instance, a user may access the IUI via a user computing entity 30 and enter application filing details regarding an application for IP rights. The application filing details may then be provided (e.g., transmitted) by the user computing entity 30 such that a node computing entity 200 receives the application filing details. For example, the application filing details may include an IP asset identifier configured to identify the IP asset associated with the application filing, applicant identifier identifying the entity listed as the applicant of the application; assignee identifier identifying the entity listed as the assignee of the application; inventor identifier(s) identifying the user(s)/employee(s) listed as the inventors of the application; application number or other filing reference number; a filing type (e.g., trademark, patent, copyright, plant variety protection, utility model, and/or the like); an IP authority (e.g., the intellectual property office with whom the application was filed); an assignment reference number identifying an executed assignment corresponding to the application and/or a reference to recorded/stored assignment agreement details; a filing date; priority information/data; any continuity information/data; information/data regarding whether inventor declarations were filed at the time the application was filed; number of figures or sheets of figures filed; application title; a timestamp indicating when the application filing details were captured and/or recorded/stored; and/or the like. The application filing details may be associated with the corresponding IP asset identifier. In an example embodiment, the application filing details may be automatically captured from a reporting email or letter provided by outside counsel (e.g., one or more users), a filing report that is internal generated by the member entity, a filing receipt for the application, and/or the like. For instance, a machine user and/or an external application (e.g., operating on a user computing entity 30, external computing entity 40, and/or node computing entity 200) may identify and provide the application filing details such that the node computing entity 200 receives the application filing details and the voting/consensus module 422 initiates a voting/consensus process such that the application filing details are recorded/stored to the distributed ledger. In various embodiments a status corresponding to the IP asset is updated by recording a new status indicator to the distributed ledger (e.g., along with the application filing details) indicating that an application for IP rights corresponding to the IP asset has been filed.

In various embodiments, the distributed ledger may be updated to include publication details when the application for IP rights publishes. For example, an indication of the publication of the application for IP rights may be received and information/data regarding the publication (e.g., publication details) may be recorded/stored to the distributed ledger. For instance, a user may access the IUI via a user computing entity 30 and enter publication details regarding the publication of the application for IP rights. The publication details may then be provided (e.g., transmitted) by the user computing entity 30 such that a node computing entity 200 receives the publication details. For example, the publication details may include an application number, a publication number, a publication date, priority information/data, information/data regarding the assignee named at the time of publication, application title, and/or the like. The publication details may be associated with the corresponding IP asset identifier. In an example embodiment, the publication details may be automatically captured from a reporting email or letter provided by outside counsel (e.g., one or more users), a publication report that is internal generated by the member entity, a Notice of Publication for the application, the publication itself (e.g., from the Official Gazette, and/or the like), and/or the like. For instance, a machine user and/or an external application (e.g., operating on a user computing entity 30, external computing entity 40, and/or node computing entity 200) may identify and provide the publication details such that the node computing entity 200 receives the publication details and the voting/consensus module 422 initiates a voting/consensus process such that the publication details are recorded/stored to the distributed ledger. In various embodiments a status corresponding to the IP asset is updated by recording a new status indicator to the distributed ledger (e.g., along with the publication details) indicating that an application for IP rights corresponding to the IP asset has published.

If the filing details indicate formal documents for one or more inventors (e.g., an inventor declaration and/or assignment) was not filed at the time the application was filed, the formal documents for the inventor may be automatically generated, in an example embodiment. An open task corresponding to execution of the formal documents may be added to the open task panel/portion 706 of the inventor interface corresponding to the inventor for whom formal documents were not filed. In an example embodiment, a notification regarding the formal documents is added to a notification panel/portion of the inventor interface and/or one or more other user interfaces (e.g., the user interfaces of the individual in the legal team and/or intellectual property team corresponding to the member entity that is in charge of overseeing or managing the application for IP rights). For example, the individual in the legal team and/or intellectual property team corresponding to the member entity may access a team member interface to perform various tasks and/or to consume information/data corresponding to the application.

FIG. 10 provides an example interface of a team member interface 1000, according to an example embodiment. For instance, the team member interface 1000 may comprise a create project element 1002, a create task element 1004, an open task panel/portion 1006, a completed task panel/portion 1008, a current status panel/portion 1010, and a project panel/portion 1012. For example, the user may select (e.g., press, click, and/or the like) the create project element 1002 to be provided with a digital form and/or IUI interface where the user may enter and/or select (e.g., via a user input device) information/data for generating a new project. For instance, the user may enter a project name, assign one or more users to the project, create project specific interfaces, and/or the like, via the IUI. In an example embodiment, the user may select (e.g., press, click, and/or the like) the create task element 1004 to be provided with a digital form and/or IUI interface where the user may enter and/or select (e.g., via a user input device) information/data for generating a new task. For example, the user may enter a task name, select a corresponding IP asset, select one or more users to complete the task, provide and/or link one or more documents for completing the task (e.g., providing a digital copy of an inventor declaration to be executed, and/or the like), provide or select a deadline for completing the task, and/or the like.

The open task panel/portion 1006 may provide a list, tiled, or other view of open tasks corresponding to the user. For instance, tasks corresponding to the user may include review of a draft of an application, an office action response, or an IDR, following up with inventors regarding formal documents, providing instructions to outside counsel (e.g., one or more users), and/or the like. Each of the tasks corresponds to a particular IP asset. In various embodiments, each task is associated with a due date and/or deadline. Once the user has completed a task and marked the task as completed, the completed task may be added to the completed task panel/portion 1008. The illustrated embodiment of the completed task panel/portion 1008 shows the IP asset identifier, title, status indicator, and filing date of the corresponding IP asset. The completed task panel/portion 1008 may further provide the user with access to one or more documents generated, completed, and/or the like during the completion of the corresponding task. For example, if the user has completed the task of reviewing a draft response to an office action and providing outside counsel (e.g., one or more users) with instructions related thereto, the user may be able to access a copy of the reviewed office action response and/or instructions provided to outside counsel (e.g., one or more users) via the completed task panel/portion 1008.

In various embodiments, the open and completed tasks that populate the open task and completed task panels/portions 1006, 1008 may be generated based on information/data access from the distributed ledger. For instance, one or more smart contracts 424 that operate and/or are generated based on information/data stored in the distributed ledger may cause the automatic generation of one or more tasks. In various embodiments, the open and completed tasks that populate the open task and completed task panels/portions 1006, 1008 may be generated based on information/data stored in and/or managed via an external application that interacts with the distributed ledger system 100 via the external application integration module 414. For example, the open and completed tasks that populate the open task and completed task panels/portions 1006, 1008 may be determined, generated, and/or the like based on a docketing program that is maintained by the member entity (e.g., by a node computing entity 200 and/or an external computing entity 40 operated by and/or on behalf of the member entity) corresponding to and/or associated with the user/employee. As noted above, the user may also generate one or more tasks via interaction with the create task element 1004.

In various embodiments, the current status panel/portion 1010 may provide a user with a snapshot of the status of various IP assets that the user is associated with. For instance, the current status panel/portion 1010 my provide a user with information/data regarding the status of one or more patent applications that list the user is in charge of overseeing and/or managing. For example, if an IP asset is related to a particular project (e.g., was generated under a particular project) and the user is assigned to that project, the status of that IP asset may be listed in the current status panel/portion 1010 of the team member interface 800 associated with the user profile corresponding to the user. The information/data provided via the current status panel/portion 810 may be accessed from and/or generated based on information/data stored in the distributed ledger and/or accessed via a member entity docketing program.

In various embodiments, the project panel/portion 1012 provides a user with access to project specific information/data, interfaces, and/or the like for projects to which the user is assigned. For instance, multiple users may be assigned to a project and the IUI may be configured to provide project specific interfaces, such as webpages, portals, shared folders and/or community collaboration tools and platforms, calendars, instant messages and/or chat rooms, wikis, documentation, and/or the like, corresponding to the project such that a user may access the project specific interfaces via the project panel/portion 1012. For example, the project specific interfaces may be configured to aid in the project management of the project.

As noted above, an inventor interface and/or team member interface may be associated with and/or comprise a notification panel/portion via which one or more notifications may be delivered to the corresponding user. For instance, notification of a new task, notification of a status update of an IP asset, and/or notifications regarding events corresponding to one or more IP assets may be provided (e.g., displayed) via the notification panel/portion of the IUI.

FIG. 11 illustrates an example inventor interface 700 with the notification panel/portion 1100 open, according to an example embodiment. For example, a user accessing an inventor interface 700 may select (e.g., press, click, and/or the like) the notifications element 712 to cause the notification panel/portion 1100 to be provided (e.g., displayed) via the IUI. Similarly, a user accessing a team member interface may select (e.g., press, click, and/or the like) the notifications element 1014 to cause the notification panel/portion 1100 to be provided (e.g., displayed) via the IUI. In an example embodiment, the notification panel/portion 1100 provides one or more notifications 1102. Each notification comprises the corresponding IP asset identifier, the title associated with the IP asset identifier, and an indication of what the corresponding task is and/or what event has occurred. If the notification corresponds to a task to be completed by the user, an action element 1104 may be provided via the notification panel/portion 1100. The user may select (e.g., press, click, and/or the like) the action element 1104, in an example embodiment, and be provided with instructions and/or an IUI for completing the task (e.g., electronically signing an assignment, and/or the like). In an example embodiment, a notification 1102 may be provided with a transfer element 1106. In an example embodiment, a user (e.g., operating the user computing entity 30) viewing the notification 1102 via the notification panel/portion 1100 of the IUI may select (e.g., click, press, and/or the like) the transfer element 1106 to be provided with a form for entering a name, contact information/data (e.g., email address, phone number, and/or the like), user identifier, and/or the like identifying and/or corresponding to another user to whom the notification 1102 and/or an open task corresponding to the notification 1102 should be transferred. Various notifications may be provided via the notifications panel/portion 1100, as appropriate for the application and a role indicator associated with the corresponding user profile, in various embodiments.

Continuing with FIG. 9, at step/operation 906, assignment information/data corresponding to the application (and/or the corresponding IP asset) is captured and recorded/stored in the distributed ledger in association with the application filing details. For instance, an executed assignment document, a reference to an executed assignment document, a reference to a recorded/stored assignment agreement, a Notice of Recordation, a recordation location (e.g., reel/frame number); and/or the like may be captured and recorded/stored to the distributed ledger in association with the application filing details. For example, the node computing entity 200 may capture and/or receive assignment information/data corresponding to the application (and/or the corresponding IP asset) and initiate a voting/consensus process via the voting/consensus module 422 for recording the assignment information/data to the distributed ledger in association with the corresponding IP asset identifier and/or application filing details.

At step/operation 908, proof of IP usage may be optionally captured and recorded/stored. For instance, if the IP asset is a trademark, proof of usage of the IP asset may be captured. For example, a machine user and/or a human user may provide (e.g., via the IUI provide by the user interface of a user computing entity 30) an indication of a digital file comprising proof of usage of an IP asset. For instance, the digital file may be a digital copy of a publication, poster, advertisement, and/or the like wherein the IP asset is used. For example, the digital file may provide documentation of the usage of the IP asset. The user computing entity 30 may provide the digital file and/or information/data identifying the digital file such that the node computing entity 200 receives the digital file and/or information/data identifying the digital file. The node computing entity 200 may then initiate a voting/consensus process via the voting/consensus module 422 for recording the digital file and/or information/data identifying the digital file to the distributed ledger.

At step/operation 910, an indication of a grant of IP rights corresponding to the IP asset is received and information/data regarding the grant of IP rights (e.g., grant details) may be recorded/stored to the distributed ledger. For instance, a user may access the IUI via a user computing entity 30 and enter grant details regarding the granting of IP rights corresponding to an IP asset. The grant details may then be provided (e.g., transmitted) by the user computing entity 30 such that a node computing entity 200 receives the grant details. For example, the grant details may include an IP asset identifier, an IP authority (e.g., the intellectual property office granting the grant), a jurisdiction corresponding to the grant, an owner identifier identifying the entity owning the grant, an assignment reference number identifying an executed assignment corresponding to the application and/or a reference to recorded/stored assignment agreement details, an application number, a grant number (e.g., a registered trademark identifier, patent number, plant variety protection certificate number, utility model number), a filing date, a grant date, priority information/data, any continuity information/data, information/data regarding the assignee named at the time of the grant, grant title, classification of the granted application, one or more claims of the grant, a representative figure, an expiration date and/or maintenance fee/annuity deadlines, and/or the like. The grant details may be associated with the corresponding IP asset identifier. In an example embodiment, the grant details may be automatically captured from a reporting email or letter provided by outside counsel (e.g., one or more users), a grant report that is internally generated by the member entity, a Notification of Issuance for the application, from the grant itself (e.g., the published patent from the Official Gazette), and/or the like. For instance, a machine user and/or an external application (e.g., operating on a user computing entity 30, external computing entity 40, and/or node computing entity 200) may identify and provide the grant details such that the node computing entity 200 receives the grant details and the voting/consensus module 422 initiates a voting/consensus process such that the grant details are recorded/stored to the distributed ledger. In various embodiments a status corresponding to the granted IP asset is updated by recording a new status indicator to the distributed ledger (e.g., along with the grant details) indicating the IP asset has granted.

At some point in time, at step/operation 912, a request for attestation of the grant of IP rights for the IP asset via the distributed ledger is received. For example, a user operating a user computing entity 30 may provide input via an IUI provided by the user computing entity 30 requesting attestation of the grant of IP rights for the IP asset. The user computing entity 30 may provide (e.g., transmit) a request for a grant attestation such that a node computing entity 200 receives the request. In various embodiments, the request for a grant attestation may comprise a grant number, the IP asset identifier, one or more keywords of the IP grant title, the name of at least one inventor named in grant, a requesting user identifier that identifies the user requesting the grant attestation, and/or the like.

In general, the grant of IP rights is public information/data. For instance, a granted patent is publicly available. In various embodiments, the permissioning/access control module 426 may act accordingly. For example, for an IP asset associated with the status of granted, the grant details may be provided regardless of the user identifier of the requesting user. For instance, at step/operation 914, responsive to the request for grant attestation, the node computing entity 200 may access the grant details from the distributed ledger and provide (e.g., transmit) at least a portion of the grant details such that the user computing entity 30 operated by the requesting user receives the at least a portion of the grant details. The user computing entity 30 may receive and process the at least a portion of the grant details and provide (e.g., display) at least a portion of the grant details via the IUI provided by the user interface of the user computing entity 30.

c. Performing a Search

Various embodiments of the distributed ledger system 100 are configured for performing searches of IP assets based on keywords; application filing dates, publication dates, grant dates, IDR submission dates, proof of usage dates, grant expiration date, and/or other dates associated with an IP asset; a status of the IP asset; an assignee and/or assignor of the IP asset; jurisdiction of an application and/or grant of IP rights; inventor(s); current owner of IP asset; and/or the like. Various embodiments of the distributed ledger system 100 provide an IUI configured to receive one or more query elements and generate a search request based on the received query elements. Various embodiments of the distributed ledger system 100 provide an IUI configured to receive search results and provide (e.g., display) search results. In various embodiments information/data regarding the search (e.g., date and/or time search was performed, query elements of search, search results, user identifier corresponding to the user that requested the search, and/or the like) may be recorded/stored in the distributed ledger such that the performance of the search may be attested to at a later time.

FIG. 12 provides a flowchart illustrating processes, steps, procedures, operations, and/or the like that may be performed, in an example embodiment, to perform a search and to attest to the performance of the search. Starting at step/operation 1202, a search request is received and stored. For example, a node computing entity 200 may receive and store a search request. In various embodiments, the search request may comprise one or more query elements. For instance, a user operating a user computing entity 30 may access the IUI via an Internet portal or through a dedicated application operating on the user computing entity 30. In an example embodiment, the IUI may be provided via execution of application program code corresponding to the IUI module 412 by processing device and/or element 205, 308 of a node computing entity 200 and/or the user computing entity 30. The user may operate the user computing entity 30 to provide, enter, and/or select (e.g., via a user input device) one or more query elements. In various embodiments, the one or more query elements may comprise keywords; application filing dates, publication dates, grant dates, IDR submission dates, proof of usage dates, grant expiration date, and/or other dates associated with an IP asset; a status of the IP asset; an assignee and/or assignor of the IP asset; jurisdiction of an application and/or grant of IP rights; inventor(s); current owner of IP asset; one or more licensing terms or conditions of a license corresponding to an IP asset and/or the like. After providing, entering, and/or electing the one or more query elements, the user may select (e.g., press, click, and/or the like) a submission element. In response to the user selecting the submission element, the user computing entity 30 may generate and provide (e.g., transmit) a search request such that the node computing entity 200 receives the search request. In various embodiments, the search request comprises at least one of the one or more query elements provided, entered, and/or selected by the user. In various embodiments, the user computing entity 30 and/or node computing entity 200 may store the search request in association with a timestamp indicating the date and/or time the search request was generated and/or provided. In an example embodiment, the user computing entity 30 may further provide the search request to an external computing entity 40 and the external computing entity 40 may store the search request in association with the time stamp.

FIG. 13 provides an example search panel/portion 1300 of the IUI, according to an example embodiment. For example, a user operating a user computing entity 30 accessing an inventor interface 700 may select search element 714 to access the search panel/portion 1300 and/or a user accessing a team member interface 1000 may select search element 1016 to access the search panel/portion 1300. In various embodiments, the search panel/portion 1300 provides a plurality of query input elements 1302. For instance, the query input elements 1302 may comprise a keyword string field into which a user may type one or more keywords; date selection elements via which a user may select one or more dates (e.g., application filing date, publication date, grant date, expiration date, and/or the like) and/or a date type; a jurisdiction selection element; an IP asset status selection element; and/or the like. For example, the user may interact with one or more query input elements (e.g., via the IUI and one or more input devices) to provide, enter, and/or select the one or more query elements. After providing, entering, and/or selecting the one or more query elements, a user may select (e.g., press, click, and/or the like) the submit element 1304 to initiate the search. For instance, responsive to the user selecting the submit element 1304, the user computing entity may generate and provide a search request comprising the one or more user provided, entered, and/or selected query elements. In various embodiments, the search panel/portion 1300 may provide the user with the ability to select one or more filters for filtering and/or ordering the search results returned via the IUI.

Returning to FIG. 12, at step/operation 1204, the search is performed. For example, the node computing entity 200 may perform the search. For instance, the node computing entity 200 may search the information/data stored in the distributed ledger and/or one or more data stores external to the distributed ledger using at least one query element of the one or more query elements of the search request. For example, one or more IP assets and/or one or more records of the distributed ledger containing information/data regarding the IP asset may be identified based on at least one query element of the one or more query elements of the search request.

In various embodiments, the node computing entity 200 performs a search of the distributed ledger and/or information/data stored in the distributed ledger in response to the search request. In an example embodiment, an external computing entity 40 and/or user computing entity 30 may perform a search of one or more data stores other than the distributed ledger (instead of and/or in addition to the search of the distributed ledger by the node computing entity 200) in response to the search request. The search results may be provided (e.g., by the node computing entity 200 and/or external computing entity 40) such that the user computing entity 30 that provided the search request receives the search results. The user computing entity 30 may receive and process the search results and, in response thereto, may provide (e.g., display) at least a portion of the search results via the IUI provided via the user interface of the user computing entity 30.

For instance, FIG. 14 provides an example via a search result panel/portion 1400 of the IUI, in accordance with an example embodiment. For example, the search result panel/portion 1400 may provide (e.g., display) search results 1402. For instance, the search results 1402 may provide a list, tile, and/or other view of information/data corresponding to one or more IP assets identified based on the query element(s) of the search request. In an example embodiment, the information/data corresponding to the one or more IP assets identified based on the query element(s) of the search request comprise an IP asset identifier 1404 for each of the identified IP assets, an application number 1406 for each of the identified IP assets (if relevant to that IP asset), a filing/submission date 1408 indicating when the application corresponding to the IP asset was filed, a status 1410 of each IP asset and/or the corresponding application, actions 1412 corresponding to each IP asset, a permissions indicator 1414 for each IP asset indicating the permissioning/access control settings corresponding to each IP asset, and a detail expansion element 1416 corresponding to each IP asset. In an example embodiment, the actions 1412 may provide access to view formal documents (e.g., inventor declaration(s), assignment(s), and/or the like) corresponding to the IP asset and/or the corresponding application, open tasks corresponding to the corresponding IP asset and/or the corresponding application, and/or the like. In an example embodiment, the status 1410 of an IP asset reflects and/or is determined based on a most recently recorded/stored status of the IP asset (e.g., based on the status indicator associated with the IP asset that was most recently recorded/stored in the distributed ledger). In various embodiments, the permission and/or access control settings corresponding to an IP asset indicate and/or control which users are able to view information/data recorded/stored to the distributed ledger and corresponding to the IP asset, as enforced by the permissioning/access control module 426. In various embodiments, the search results may further list a title, one or more additional dates corresponding to the IP asset (e.g., an IDR submission date, application filing date, publication date, grant date, expiration date, and/or the like), and/or the like. In an example embodiment, at least one of the elements of information/data listed and/or provided with the search results is determined based on a user provided, entered, and/or selected query element. For example, if the query elements indicated the search was to identify IP assets associated with a filing date between a first date and a second date, the search results may include a column, for instance, listing the filing date of each identified IP asset. In an example embodiment, when a user selects (clicks, presses, and/or the like) a detail expansion element 1416 corresponding to an IP asset, expanded asset information/data 1420 may be provided (e.g., displayed) via the search result panel/portion 1400 of the IUI. In the illustrated embodiment, the expanded asset information/data comprises an abstract of the application corresponding to the IP asset, one or more assignors of the application corresponding to the IP asset, one or more dates corresponding to the IP asset and/or a corresponding application/grant, a number of claims in the application/grant corresponding to the IP asset, a number of drawings in the application/grant corresponding to the IP asset, a grant number for the grant corresponding to the IP asset, a jurisdiction for the application/grant corresponding to the IP asset, a representative claim of the IP asset, and/or the like.

Continuing with FIG. 12, at step/operation 1206, search details corresponding to the completed search may be recorded/stored. For example, the node computing entity 200 may capture search details corresponding to the completed search and initiate a voting/consensus process via the voting/consensus module 422 for recording the search details to the distributed ledger. In various embodiments, the search details comprise information/data corresponding to the search and metadata corresponding to the information/data corresponding to the search. For instance, the search details may include the user identifier corresponding to the user that initiated the search (e.g., the requesting user who provided, entered, and/or selected the query elements and/or to whom the search results were returned), a timestamp indicating a date and/or time the search was conducted, a search execution indicator configured to indicate if the search was completed or halted part way through the search, a jurisdiction corresponding to the search (e.g., a particular country or region, worldwide, and/or the like), IP asset identifiers for each IP asset identified by the search (e.g., based on the at least one of the one or more query elements of the search request), and/or the like. In an example embodiment, the search details may comprise at least one of the one or more query elements.

At some point in time, at step/operation 1208, a request for attestation of the performed search is received. For example, a user operating a user computing entity 30 may provide input via an IUI provided by the user computing entity 30 requesting attestation of the performed search. The user computing entity 30 may provide (e.g., transmit) a request for a search attestation such that a node computing entity 200 receives the request. In various embodiments, the request for a search attestation may comprise a search identifier, a date and/or date range when the search was performed, one or more query elements corresponding to the search, one or more IP assets identified in the search, and/or the like.

In various embodiments, the permissioning/access control module 426 may determine if the user requesting the search attestation is permitted and/or allowed to access the search attestation. For instance, in various embodiments, when a user requests a search, the user may provide an indication that the search attestation corresponding to the search should only be available to users corresponding to user profiles that are associated with one or more particular member identifiers. In an example embodiment, the determination of which users are permitted and/or allowed to access the search attestation may be determined based on the most recent status indicator of one or more IP assets identified in the search (e.g., based on the IP asset identifiers recorded/stored as part of the search details) and/or the status of one or more IP assets identified in the search at the time the search was performed (e.g., as determined based on the timestamp of the search details and the timestamp associated with each of one or more status indicators associated with a IP asset identifier listed in the search details). For example, if one or more of the IP assets was publicly known at the time of the search and/or at the time of the request for the search attestation, the search attestation may be provided regardless of the requesting user. For instance, when an application corresponding to the IP asset was published and/or IP rights corresponding to the IP asset have been granted and/or expired, the status indicator corresponding to the IP asset may indicate the IP asset is publicly known. In an example embodiment, the requesting user may only be permitted and/or allowed to access search details corresponding to IP assets that are currently publicly known and/or were publicly known at the time the search was performed (e.g., if the user profile corresponding to the requesting user is not associated with a user identifier that is permitted to access information/data corresponding to the non-publicly known IP assets). In such a scenario, a redacted search attestation may be returned such that the redacted search attestation only comprises search details that the requesting user is permitted and/or allowed to access. Thus, the permissioning/access control module 426 may determine if the user requesting the search attestation is permitted and/or allowed to access the search attestation and/or which parts of the search details the user is permitted and/or allowed to access.

At step/operation 1210, responsive to the request for search attestation (and the permissioning/access control module 426 determining that the requesting user is permitted and/or allowed to access the search attestation) the node computing entity 200 may access the search details from the distributed ledger and provide (e.g., transmit) at least a portion of the search details such that the user computing entity 30 operated by the requesting user receives the at least a portion of the search details. In an example embodiment, the node computing entity 200 redacts at least some of the search details based on a determination of the permissioning/access control module 426 and provides a redacted version of the search details such that the user computing entity 30 receives the redacted version of the search details. The user computing entity 30 may receive and process the at least a portion of the search details and provide (e.g., display) at least a portion of the search details via the IUI provided by the user interface of the user computing entity 30.

In various embodiments, a user may perform a search to access licensing and/or sale details regarding IP assets that are similar to a particular IP asset. For example, as described in more detail elsewhere herein, license and/or sale agreement details and/or transaction details corresponding to transactions related to a license and/or sale agreement may be stored in the distributed ledger. In various embodiments a user may search for IP assets that are similar to a particular IP asset based on subject matter, remaining term, and/or the like via and IUI provided by a user computing entity 30. The user computing entity 30 then provides a search request such that a node computing entity 200 receives the search request. For instance, the node computing entity 200 may, in response to a search request, identify IP assets that are similar to a particular IP asset based on subject matter, remaining term, compensation structure, and/or the like. For the IP assets identified as being similar to the particular IP asset, the noted computing entity 200 may determine which IP assets have license and/or sale details associated therewith. The node computing entity 200 may then access the license and/or sale details from the distributed ledger for the IP assets identified as being similar to the particular IP asset. The license and/or sale details associated with the IP assets identified as being similar to the particular IP asset may then be provided (e.g., by the node computing entity 200) such that a user computing entity 30 receives the license and/or sale details and may provide the license and/or sale details to the user via the IUI. In an example embodiment, the license and/or sale details may be provided for individual IP assets. In such embodiments, the license and/or sale details may or may not be provided with information/data identifying the corresponding IP asset, commercial terms, and/or grant of IP rights corresponding to the IP asset. For example, the license and/or sale details may be anonymized. For instance, license information/data may be provided, but the patent number corresponding to the license may not be provided if the requested user corresponds to a user profile that is not associated with a member identifier that matches a licensee identifier and/or licensor identifier (and/or related entity) of the license information/data. In an example embodiment, a summary of the license and/or sale details for the IP assets identified as being similar to the particular IP asset may be provided via the IUI. For example, an average royalty value and/or upfront payment, an average sale price, common terms and/or conditions, and/or the like may be determined (e.g., by the node computing entity 200 and/or by the user computing entity 30) and provided for consumption by the user via the IUI. In various embodiments, the summary of license and/or sale details may allow a user that is not permitted and/or allowed to view license and/or sale details regarding individual IP assets to obtain some information/data regarding the licensing and/or sale of IP assets similar to a particular IP asset while still maintaining the confidentiality of license and/or sale agreement details of individual IP assets. For instance, a summary of license and/or sale details for the IP assets identified as being similar to the particular IP asset may be used to determine reasonable royalties and/or the like when determining damages of legal proceeding settlement corresponding to and/or involving the particular IP asset.

d. Maintenance of an IP Grant

Various embodiments provide for the maintenance of a grant for IP rights corresponding to an IP asset. For example, the distributed ledger system 100 may capture one or more details regarding the expiration of and/or a maintenance fee and/or annuity due to maintain a grant corresponding to an IP asset. In an example embodiment, the distributed ledger system 100 may generate and/or initiate a smart contract 424 based on the one or more details regarding the expiration of and/or a maintenance fee and/or annuity due to maintain a grant corresponding to an IP asset. The smart contract 424 may be configured to cause one or more users to be notified (e.g., via a notification panel/portion 900) regarding the expiration of a grant corresponding to an IP asset and/or maintenance fees and/or annuities (or other actions) due to maintain IP rights provided by a grant corresponding to an IP asset.

FIG. 15 provides a flowchart illustrating process, procedures, operations, and/or the like for managing renewal (e.g., trademark renewal, payment of maintenance fees and/or annuities) of a grant for IP rights corresponding to an IP asset, according to an example embodiment. Starting at step/operation 1502, an indication of a grant of IP rights corresponding to an IP asset is received. For instance, as described above with respect to step/operation 910, an indication of a grant of IP rights corresponding to the IP asset is received and information/data regarding the grant of IP rights (e.g., grant details) may be recorded/stored to the distributed ledger. For example, a user may access the IUI via a user computing entity 30 and enter grant details regarding the granting of IP rights corresponding to an IP asset. The grant details may then be provided (e.g., transmitted) by the user computing entity 30 such that a node computing entity 200 receives the grant details. For instance, the grant details may include an IP asset identifier, an IP authority (e.g., the intellectual property office granting the grant), a jurisdiction corresponding to the grant, an owner identifier identifying the entity owning the grant, an assignment reference number identifying an executed assignment corresponding to the application and/or a reference to recorded/stored assignment agreement details, an application number, a grant number (e.g., a registered trademark identifier, patent number, plant variety protection certificate number, utility model number), a filing date, a grant date, priority information/data, any continuity information/data, information/data regarding the assignee named at the time of the grant, grant title, classification of the granted application, one or more claims of the grant, a representative figure, an expiration date and/or maintenance fee/annuity deadlines and/or amounts, and/or the like. The grant details may be associated with the corresponding IP asset identifier. In an example embodiment, the grant details may be automatically captured from a reporting email or letter provided by outside counsel, a grant report that is internally generated by the member entity, a Notification of Issuance for the application, from the grant itself (e.g., the published patent from the Official Gazette), and/or the like. For example, a machine user and/or an external application (e.g., operating on a user computing entity 30, external computing entity 40, and/or node computing entity 200) may identify and provide the grant details such that the node computing entity 200 receives the grant details and the voting/consensus module 422 initiates a voting/consensus process such that the grant details are recorded/stored to the distributed ledger. In various embodiments a status corresponding to the granted IP asset is updated by recording a new status indicator to the distributed ledger (e.g., along with the grant details) indicating the IP asset has granted.

At step/operation 1504, responsive to receiving the grant details and/or indication of the grant of IP rights corresponding to the IP asset, maintenance information/data corresponding to the grant is captured and recorded/stored. In an example embodiment, the maintenance information/data corresponding to the grant are recorded/stored as part of the grant details. For instance, the grant details recorded/stored to the distributed ledger may include the maintenance information/data. For example, the maintenance information/data may comprise a type of grant (e.g., which may be used to determine maintenance fees and/or annuity deadlines based on a filing date and/or priority information/data), filing date, priority information/data, patent term adjustment (PTA) information/data, information/data regarding any terminal disclaimers filed in connection to the grant, jurisdiction information/data (e.g., for determining applicable maintenance fee and/or annuity regulations), and/or the like.

At step/operation 1506, a smart contract 424 may be generated based on the maintenance information/data. For instance, in an example embodiment, the ledger protocol layer 420 may comprise a smart contract generation module 428 configured to generate one or more smart contracts 424 based on maintenance information/data. In an example embodiment, a user may access a maintenance interface of an IUI and manually cause the generation of a smart contract based on the maintenance information/data. For example, in an example embodiment, a smart contract generation module 428 may generate a smart contract 424 configured to cause a notification regarding one or more renewal deadlines related to renewal of a grant (e.g., renewal of a trademark, filing a declaration of continuing use, payment of a maintenance fee and/or annuity) when one or more date criteria are met. In an example embodiment, the one or more date criteria may comprise one or more predetermined amounts of time before the renewal deadline (e.g., six months, three months, one month, two weeks, one week, the day before the renewal deadline, and/or the like), whether or not an indication of renewal of the grant has been received, and/or the like. For instance, the smart contract may be configured to cause a notification regarding one or more renewal deadlines related to renewal of a grant to be provided via the notification panel/portion 1100 corresponding to one or more users six months before the renewal deadline, and, if an indication of the renewal has not already been received, two weeks before the renewal deadline, in an example embodiment.

In various embodiments, the renewal deadlines relevant to a grant may be determined by user input, information/data provided by a granting organization (e.g., the U.S. Patent and Trademark Office, or other intellectual property office), and/or automatically based on the maintenance information/data. For example, the jurisdiction and type of grant may be used to determine renewal criteria and renewal deadlines for a grant corresponding to an IP asset, in an example embodiment. In an example embodiment, the filing date, grant date, and/or priority information/data corresponding to a grant corresponding to an IP asset may be used (e.g., in addition to the jurisdiction and/or type of grant) to determine renewal criteria and renewal deadlines for the grant. In various embodiments, the renewal criteria may include paying of a maintenance fees and/or annuities (e.g., through automated electronic transfers by interacting via the external application integration module with the relevant IP authorities), filing for a grant renewal, filing a particular form and any corresponding fees, providing additional seeds to a plant variety protection seed repository, and/or the like. In an example embodiment, the smart contract may indicate which users are to be notified when the date criteria are met and/or that different users may be notified when different date criteria are met. In an example embodiment, the users to be notified may be determined based on a member identifier and/or role indicator associated with the user profiles of the users to be notified. For instance, given the possibility of employee turnover over the time span corresponding to a grant's lifetime, the smart contract may indicate that notifications should be provided to any user having a user profile associated with a particular member identifier and a particular role indicator.

After the smart contract has been generated, the smart contract may be initiated, in an example embodiment. For example, the computer-executable code of the smart contract may be prepared, generated, drafted, and/or the like and then the computer-executable code of the smart contract may be compiled, executed, initiated, and/or the like.

At step/operation 1508, it is determined that the date criteria of a smart contract is satisfied and a notification is provided regarding the renewal of the corresponding grant is provided to one or more users. For instance, the smart contract 424 executing on the node computing entity 200 may determine that the date criteria of the smart contract has been notified, identify one or more user identifiers corresponding to users to identify, and cause the IUI module 412 to provide notifications to the users (e.g., via an inventor and/or team member interface and/or notification panel/portion accessed by the corresponding user). For example, when a user logs into the IUI via a user computing entity 30, the IUI module 412 may determine if there are any notifications to be provided to the user (e.g., based on the corresponding user identifier) and cause the notification (e.g., regarding renewal of the grant) to be provided (e.g., displayed) via the IUI (e.g., via the notification panel). For instance, the node computing entity 200 may provide a notification regarding renewal of a grant corresponding to an IP asset such that a user computing entity 30 receives the notification and causes a notification message to be provided (e.g., displayed) via the IUI (e.g., provided via the user interface of the user computing entity 30).

At step/operation 1510, it is determined if the grant corresponding to the IP asset has been renewed. For example, a node computing entity 200 may determine if an indication has been received that a renewal was filed to the grant corresponding to the IP asset by the renewal deadline. For instance, it may be determined if an electronic filing receipt corresponding to the filing of a renewal (e.g., the paying of any required fees and/or filing of any required forms and/or documents) and/or any other documentation indicating the filing of the renewal by the renewal deadline has been received. For example, it may be determined if a user has provided, entered, and/or selected information/data regarding the filing of a renewal for the grant (e.g., via an IUI provided via a user computing entity 30) by the renewal deadline, uploaded any documents (e.g., via the IUI) corresponding to the filing of the renewal, and/or the like, by the renewal deadline. In various embodiments, the smart contract 424 may cause the node computing entity 200 to determine if an indication of the filing of the renewal of the grant corresponding to the IP asset by the renewal deadline has been received. In an example embodiment, the determination of whether an indication of the renewal has been filed for the grant corresponding to the IP asset by the renewal deadline may be determined on the day after the renewal deadline, two days after the renewal deadline, a week after the renewal deadline, and/or the like. In an example embodiment, the acknowledgement that a renewal was filed can be recorded on the distributed ledger by interacting via the external application integration module with the relevant IP authority.

If, at step/operation 1510, it is determined that the renewal for the grant corresponding to the IP asset was not filed (e.g., any required fees were not paid and/or any required forms and/or documents were not filed), the process continues to step/operation 1512. At step/operation 1512, the expiration of the grant corresponding to the IP asset is recorded/stored. For instance, execution of the smart contract 424, responsive to determining that an indication of renewal of the grant corresponding to the IP asset was not received by the renewal deadline, may cause a recordation of an indication of the expiration of the grant corresponding to the IP asset to the distributed ledger. For example, the smart contract 424 may cause the voting/consensus module 422 to initiate a voting/consensus process for recording an indication of the expiration of the grant corresponding to the IP asset to the distributed ledger. In an example embodiment, an indication of the expiration of the grant comprises expiration details. In an example embodiment, the expiration details comprise information/data corresponding to the expiration of the grant and metadata corresponding to the information/data corresponding to the expiration of the grant. For instance, in an example embodiment, the expiration details comprise the IP asset identifier, a status indicator (e.g., expired), an expiration date, a grant number corresponding to the grant, a reason for expiration (e.g., renewal not filed, maintenance fees not paid, end of term of grant), and/or the like. In an example embodiment, a notification of the expiration of the grant corresponding to the IP asset may be provided to one or more users (e.g., determined based on the recorded/stored information/data corresponding to the IP asset) via a corresponding notification panel/portion 1100.

If, at step/operation 1510, it is determined that the renewal for the grant corresponding to the IP asset was filed (e.g., any required fees were paid and/or any required forms and/or documents were filed) by the renewal deadline, the process continues to step/operation 1514. At step/operation 1514, renewal details are captured and recorded/stored. For example, the node computing entity 200 may determine, through execution of the smart contract 424, that an indication of the filing of the renewal of the grant was performed by the renewal deadline and may cause the renewal details to be automatically captured. In an example embodiment, the renewal details comprise information/data corresponding to the renewal of the grant and metadata corresponding to the information/data corresponding to the renewal of the grant. For instance, in an example embodiment, the renewal details include a date of the filing of the renewal, the amount of any fees paid, an indication of any other action taken (e.g., filing of particular forms, filing of documents, providing of seeds, and/or the like), and/or the like. In various embodiments, the smart contract 424 may cause the renewal details to be recorded/stored to the distributed ledger. For example, the smart contract 424 may cause the voting/consensus module 422 to initiate a voting/consensus process for recording renewal details corresponding to the grant corresponding to the IP asset to the distributed ledger.

In an example embodiment, the smart contract 424 may cause the generation and/or initiation of a new smart contract corresponding to the next renewal deadline and/or expiration date of the grant corresponding to the IP asset. For instance, the smart contract 424 may cause the smart contract generation module 428 to generate a new smart contract based on the maintenance information/data and/or the renewal details such that one or more notifications may be provided ahead of the next renewal deadline for the grant corresponding to the IP asset. For example, the process may return to step/operation 1506 and a new smart contract may be generated and/or initiated based on the maintenance information/data and/or the renewal details.

At some point in time, at step/operation 1516, a request for attestation of the renewal of the grant corresponding to the IP asset via the distributed ledger is received. For instance, a user operating a user computing entity 30 may provide input via an IUI provided by the user computing entity 30 requesting attestation of the renewal of the grant of IP rights for the IP asset. The user computing entity 30 may provide (e.g., transmit) a request for a renewal attestation such that a node computing entity 200 receives the request. In various embodiments, the request for a renewal attestation may comprise a grant number, the IP asset identifier, one or more keywords of the IP grant title, the name of at least one inventor named in grant, a requesting user identifier that identifies the user requesting the renewal attestation, and/or the like.

In general, the grant and renewal of IP rights is public information/data. For example, a granted patent is publicly available and information/data regarding whether a maintenance fee for the granted patent is publicly available. In various embodiments, the permissioning/access control module 426 may act accordingly. For instance, for an IP asset associated with the status of granted, renewed, expired, and/or the like, the renewal details (and/or expiration details, if appropriate) may be provided regardless of the user identifier of the requesting user. For example, responsive to the request for renewal attestation, the node computing entity 200 may access the renewal and/or expiration details from the distributed ledger and provide (e.g., transmit) at least a portion of the renewal and/or expiration details such that the user computing entity 30 operated by the requesting user receives the at least a portion of the renewal and/or expiration details. The user computing entity 30 may receive and process the at least a portion of the renewal and/or expiration details and provide (e.g., display) at least a portion of the renewal and/or expiration details via the IUI provided by the user interface of the user computing entity 30. For instance, if the grant identified in the request for a renewal attestation was not renewed (e.g., was allowed to expire), the node computing entity 200 may provide expiration details for display by the user computing entity 30. In another example, if the grant identified in the request for a renewal attestation was renewed, the node computing entity 200 may provide renewal details for display by the user computing entity 30.

e. Legal Proceeding Status

Various embodiments are configured to capture and record legal proceeding details corresponding to an IP asset. In various embodiments, legal proceeding details comprise information/data corresponding to an IP asset and one or more legal proceedings related to the IP asset. In an example embodiment, the legal proceeding details comprise metadata corresponding to the information/data corresponding to the one or more legal proceedings. For example, if an IP asset is named in a legal proceeding, legal proceeding details may be captured and recorded/stored in the distributed ledger. In various embodiments, the legal proceeding details may comprise parties of the legal proceeding, IP asset identifiers identifying any IP assets related to and/or involved in the legal proceeding, status of the legal proceeding, a legal proceeding type indicator configured to indicate a type of legal proceeding, a challenger identifier configured to identify the challenger of the legal proceeding, a case reference number configured to identify the legal proceeding, an owner identifier configured to identify the owner and/or assignee of the IP asset, a legal proceeding status indicator configured to indicate the status of the legal proceeding, one or more IP asset outcome indicators indicating an output corresponding to the IP asset identifier related to the legal proceeding, a grant number (e.g., application number, patent number, trademark number, plant variety protection certificate number, utility model number, and/or the like) identifying any grant corresponding to an IP asset related to and/or involved in the legal proceeding, an IP authority identifier configured to identify an IP authority corresponding to and/or involved in the legal proceeding, a jurisdiction and/or territory in which the legal proceeding is taking place, a tribunal identifier configured to indicate the tribunal related to and/or involved in the legal proceeding, one or more licensee/licensor identifiers configured to identify any licensees/licensors of the one or more IP assets related to and/or involved in the legal proceeding, and/or the like.

FIG. 16 provides a flowchart illustrating processes, steps, procedures, operations, and/or the like for capturing and recording legal proceeding details, according to an example embodiment. Starting at step/operation 1602, an indication that legal proceedings regarding and/or involving IP rights corresponding to one or more IP assets is received. For instance, a user may access an IUI provided via a user computing entity 30 and enter and/or provide information/data regarding a legal proceeding regarding and/or involving IP rights corresponding to one or more IP assets. In another example, a machine user (e.g., operating on user computing entity 30, external computing entity 40, and/or node computing entity 200 and interacting with the distributed ledger system 100 via the external application integration module 414) may parse and/or otherwise extract information/data regarding legal proceedings (e.g., legal proceeding details) from an official bulletin and provide an indication of an identified legal proceeding regarding and/or involving IP rights corresponding to one or more IP assets.

At step/operation 1604, legal proceeding details may be stored (e.g., in external computing entity 40) at various points during the legal proceedings. For example, an external computing entity 40 (or a node computing entity 200) may receive legal proceeding details at various points throughout the legal proceeding. For instance, the external computing entity 40 (or an node computing entity 200) may receive legal proceeding details at the initiation of the legal proceeding, in response to one or more filings corresponding to the legal proceedings (e.g., filing of briefs, motions, at the beginning and/or ending of a discovery period, at the beginning and/or ending of a pre-trial period, at the beginning and/or ending of a trial period, at final disposition or settlement of the legal proceeding, and/or the like).

At step/operation 1606, legal proceeding details are recorded/stored to the distributed ledger at one or more trigger points during the legal proceeding. For example, the node computing entity 200 may receive legal proceeding details from a user computing entity 30 and/or external computing entity 40 at various trigger points during the legal proceedings and cause at least a portion of the legal proceedings details to be recorded/stored in the distributed ledger. For instance, the user computing entity 30 and/or external computing entity 40 may provide legal proceeding details such that the node computing entity 200 receives the legal proceedings details in response to trigger points such as the initiation of the legal proceeding, one or more filings corresponding to the legal proceedings (e.g., filing of briefs, motions, the beginning and/or ending of a discovery period, the beginning and/or ending of a pre-trial period, the beginning and/or ending of a trial period, final disposition or settlement of the legal proceeding, and/or the like). In an example embodiment, the node computing entity 200 causes the voting/consensus module 422 to initiate a voting/consensus process for recording at least a portion of the legal proceeding details to the distributed ledger.

In an example embodiment, legal proceeding details— such as a case reference number configured to identify the legal proceeding, an owner identifier configured to identify the owner and/or assignee of the IP asset, a legal proceeding status indicator configured to indicate the status of the legal proceeding, as parties of the legal proceeding, IP asset identifiers identifying any IP assets related to and/or involved in the legal proceedings, a legal proceeding type indicator configured to indicate a type of legal proceeding, a challenger identifier configured to identify the challenger of the legal proceeding, one or more IP asset outcome indicators indicating an output corresponding to the IP asset identifier related to the legal proceeding, a grant number (e.g., application number, patent number, trademark number, plant variety protection certificate number, utility model number, and/or the like) identifying any grant corresponding to an IP asset related to and/or involved in the legal proceeding, an IP authority identifier configured to identify an IP authority corresponding to and/or involved in the legal proceeding, a jurisdiction and/or territory in which the legal proceeding is taking place, a tribunal identifier configured to indicate the tribunal related to and/or involved in the legal proceeding, one or more licensee/licensor identifiers configured to identify any licensees/licensors of the one or more IP assets related to and/or involved in the legal proceeding, a timestamp corresponding to the recording of the legal proceeding details, and/or the like—are recorded/stored in response to the initiation and/or final disposition and/or settlement of a legal proceeding. At intermediate trigger points within the legal proceeding (e.g., trigger points between the initiation of the legal proceeding and the final disposition and/or settlement of the legal proceeding), a status of the legal proceedings according to the distributed ledger system 100 may be updated by recording a case reference number configured to identify the legal proceeding, a legal proceeding status indicator configured to indicate the status of the legal proceeding, and a timestamp corresponding to the recording of the status update at various points during the legal proceedings.

At some point in time, at step/operation 1608, a request for attestation regarding the legal proceeding corresponding to and/or involving the IP asset via the distributed ledger is received. For example, a user operating a user computing entity 30 may provide input via an IUI provided by the user computing entity 30 requesting attestation regarding the legal proceeding corresponding to and/or involving the IP asset. The user computing entity 30 may provide (e.g., transmit) a request for a legal proceeding attestation such that a node computing entity 200 receives the request. In various embodiments, the request for a legal proceeding attestation may comprise a grant number, the IP asset identifier, one or more keywords of the IP grant title, the name of at least one inventor named in grant, a case reference number configured to identify the legal proceeding, a requesting user identifier that identifies the user requesting the renewal attestation, and/or the like.

In general, the final disposition and/or settlement of a legal proceeding is public information/data. For instance, if a grant corresponding to an IP asset is confirmed or held to be invalid is publicly available and information/data regarding the settlement of the legal proceeding is publicly available. In various embodiments, the permissioning/access control module 426 may act accordingly. For example, for a legal proceeding associated with a status of the legal proceeding of finally disposed, settled, closed, and/or the like, the legal proceeding details may be provided regardless of the user identifier of the requesting user. For instance, responsive to the request for legal proceeding attestation, the node computing entity 200 may access the legal proceeding details from the distributed ledger and provide (e.g., transmit) at least a portion of the legal proceeding details such that the user computing entity 30 operated by the requesting user receives the at least a portion of the legal proceeding details. If the legal proceedings are associated with a status of the legal proceeding that is other than finally disposed, settled, closed, and/or the like (e.g., initiated, under-going discovery, and/or the like), the permissioning/access control module 426 may limit access to the legal proceeding details. For example, the permissioning/access control module 426 may only permit and/or allow access to portions of the legal proceeding details that provide information/data that is publicly available if the user profile corresponding to the requesting user does not indicate that the user is associated with a member identifier identifying a member entity and/or entity related to a member entity that is a party to the legal proceeding, in an example embodiment. If the user profile corresponding to the requesting user does indicate that the user is associated with a member identifier identifying a member entity and/or entity related to a member entity that is a party to the legal proceeding (and the user profile is associated with an appropriate role indicator, in an example embodiment), the complete legal proceeding details may be provided, in an example embodiment. For instance, the node computing entity 200 may access legal proceeding details based on the legal proceeding attestation request and/or a determination the permissioning/access control module 426 and provide at least a portion of the accessed legal proceeding details such that the user computing entity 30 receives the at least a portion of the accessed legal proceeding details.

The user computing entity 30 may receive and process the at least a portion of the legal proceeding details provided by the node computing entity 200 and provide (e.g., display) at least a portion of the legal proceeding details via the IUI provided by the user interface of the user computing entity 30.

f. Licensing and/or Sale of IP Assets; Leasing of Equipment Embodying IP Assets

In various embodiments, the owner of an IP asset may negotiate with a counter-party for the counter-party to license or purchase the IP asset. In various embodiments, the distributed ledger system 100 may be configured to generate a smart contract 424 (e.g., via the smart contract generation module 428) based on a negotiated agreement for licensing and/or selling an IP asset between the current owner of the IP asset and the counter-party (e.g., licensee and/or IP asset purchaser) or leasing equipment embodying an IP asset (e.g., a lessee). In an example embodiment, both parties (e.g., the owner of the IP asset and the counter-party) may review and accept the generated smart contract 424. The smart contract 424 may then be initiated (e.g., executed by a processing element 205, 308 of a node computing entity 200) to cause one or more transactions corresponding to the license and/or sale agreement to be conducted and recorded/stored in the distributed ledger.

FIG. 17 provides a flowchart illustrating processes, steps, procedures, operations, and/or the like for executing a license and/or sale agreement via the distributed ledger system 100 and recording transactions corresponding to the execution of the license, sale and/or lease agreement via the distributed ledger, according to an example embodiment. Starting at step/operation 1702, license/sale/lease agreement details are received. In various embodiments, license/sale/lease agreement details comprise information/data corresponding to a license, sale, and/or lease agreement. In an example embodiment, the license/sale/lease agreement details further comprise metadata corresponding to the information/data corresponding to a license, sale, and/or lease agreement. For example, the node computing entity may receive license/sale/lease agreement details. For instance, an owner of an IP asset and a counter-party may negotiate the license and/or sale of an IP asset (and/or group of IP assets) or lease of equipment embodying an IP asset. In an example embodiment, a human user (e.g., operating a user computing entity 30) may provide license/sale/lease agreement details via an IUI provided by the user computing entity 30 (e.g., via one or more user input devices). In an example embodiment, a machine user (e.g., operating on a user computing entity 30 and/or external computing entity 40) may capture the license/sale/lease agreement details from one or more documents accessible to the machine user and provide the license/sale/lease agreement details via the external application integration module 414.

Thus, the node computing entity 200 may receive the license/sale agreement details. In various embodiments, the license/sale/lease details may comprise a timestamp indicating the date and/or time the license/sale/lease agreements details were received and/or recorded/stored to the distributed ledger; one or more IP asset identifiers identifying the IP assets being licensed and/or sold; one or more equipment identifiers identifying the equipment being leased; an agreement reference number configured to uniquely identify the agreement in a member entity docketing program and/or in the distributed ledger system 100; an assignor identifier configured to identify a member entity and/or other entity assigning and/or selling the IP asset(s); an assignee identifier configured to identify a member entity or other entity receiving and/or purchasing the IP asset(s); an application and/or grant number corresponding to each IP asset being licensed and/or sold; a licensee identifier configured to identify a member entity and/or other entity licensing the IP asset(s); a lesee identifier configured to identify a member entity and/or other entity leasing the equipment; a licensor identifier configured to identify a member entity and/or other entity offering the IP asset(s) for license; an agreement effective date; an agreement expiration date; one or more commercial terms and/or conditions of the agreement; agreement type indicator (e.g., license, sale, or lease); an IP authority identifier configured to identify an IP authority corresponding to the license and/or sale agreement; a jurisdiction and/or territory corresponding to the license, sale, and/or lease agreement; and/or the like. In various embodiments, the one or more commercial terms and/or conditions of the agreement may comprise a sale price, a royalty amount and/or method for determining royalty amount, an upfront payment, terms regarding how the sale price, upfront payment, and/or royalty amount is to be paid, leasing terms, and/or other terms and/or conditions of the agreement. In an example embodiment, the royalty amount may be determined based on one or more indices, commodity derivatives, costs of goods or raw materials, and/or the like. For example, a royalty rate can executably operate as a function of one or more of such dynamic factors and, accordingly, itself float to track market fluctuations. In an example embodiment, one or more of the terms and/or conditions may be provided as logic statements, computer-executable code snippets and/or portions, and/or the like. In an example embodiment, one or more of the terms and/or conditions may be provided as human language statements (e.g., not logic statements or snippets/portions of computer-executable code).

At step/operation 1704, a smart contract is generated based on the license/sale/lease agreement details. For example, the node computing entity 200 may cause the smart contract generation module 428 to generate one or more smart contracts 424 based on the license/sale/lease agreement details. For instance, the smart contract generation module 428 may generate (e.g., automatically and/or via human interaction, in various embodiments) a smart contract 424 that corresponds to and/or encodes the license, sale and/or lease agreement. For example, the smart contract generation module 428 may generate a smart contract 424 to convey ownership of an IP asset from an assignor identified by the assignor identifier of the license/sale/lease agreement details to an assignee identified by the assignee identifier of the license/sale/lease agreement details in exchange for a payment from the assignee to the assignor in an amount and method indicated by the terms and/or conditions of the license/sale/lease agreement details. In another example, the smart contract generation module 428 may generate a smart contract 424 to provide a license of an IP asset owned by a licensor identified by the licensor identifier of the license/sale/lease agreement details to a licensee identified by the licensee identifier of the license/sale/lease agreement details in exchange for royalty and/or upfront payments of an amount and via a method indicated by the terms and/or conditions of the license/sale/lease agreement details. In yet another example, the smart contract generation module 428 may generate a smart contract 424 to trigger delivery from a lessor identified by the lessor identifier of the lease agreement details to a lessee identified by the lessee identifier of the lease agreement details in exchange for a payment from the lessee to the lessor in an amount and method indicated by the terms and/or conditions of the lease agreement details. In an example embodiment directed to towel dispensers, the smart contract can cooperate with an IoT 70 system to trigger delivery of refills of towel rolls when a replenishment alert is received.

After the smart contract 424 is generated, the smart contract 424 may be provided such that a user computing entity 30 receives the smart contract 424 and may provide the smart contract 424 to a user via an IUI provided by a user interface of the user computing entity 30. For instance, the smart contract 424 may be provided (e.g., displayed via the IUI) for review and/or approval to one or more users that correspond to user profiles associated with a particular role and a member entity that matches and/or is related to the licensor, assignor, and/or lessor of the license, sale, and/or lease agreement. For example, the node computing entity 200 may automatically generate and add an open task for one or more users regarding review and/or approval of the smart contract 424. For instance, the node computing entity 200 may add a notification to the notification panel/portion of one or more users regarding the review and/or approval of the smart contract 424. The one or more users may then review the smart contract 424 via the IUI and, via interaction with the IUI (e.g., by selecting, pressing, and/or the like an accept element provided via the IUI using a user input device), at least one user may approve the smart contract 424, edit the smart contract 424, and/or provide instructions for a developer to edit the smart contract 424 (e.g., to edit the computer-executable code of the smart contract 424).

FIG. 18 provides an example smart contract generation panel/portion 1800 provided via the IUI for generation of a smart contract corresponding to a license and/or sale agreement, according to an example embodiment. In particular, the smart contract generation panel/portion 1800 is for generation of a license agreement. The smart contract generation panel/portion 1800 comprises IP asset identifying information/data 1802, such as the IP asset identifier, IP asset title, equipment embodying an IP asset, and/or the like. In an example embodiment, the smart contract generation panel/portion 1800 comprises an add IP asset(s) element 1804 such that a contract corresponding to multiple IP assets may be generated. In an example embodiment, the smart contract generation panel/portion 1800 comprises a licensee/lessee identifier field 1806 configured to receive an identifier configured to identify an entity that is to be a licensee/lessee of the license, sale and/or lease agreement, a licensor/lessee identifier field 1808 configured to receive an identifier configured to identify an entity that is to be a licensor/lessor of the license, sale and/or lease agreement (in an example embodiment, the licensor identifier field 1808 may be automatically populated based on the owner of the IP asset(s) identified by the IP asset identifying information/data 1802), an effective date field 1810 configured to receive an effective date of the license, sale and/or lease agreement, an expiration date field 1812 configured to receive an expiration date of the license, sale and/or lease agreement, an add terms and/or conditions element 1814 that may be selected (e.g., clicked, pressed, and/or the like) to select and/or enter one or more additional types of terms and/or conditions to be added to the smart contract, a frequency of payments panel/portion 1816 configured to receive information/data regarding the frequency with which licensing and/or royalty/lease fees are to be paid by the licensee/lessee to the licensor/lessor, a terms of jurisdiction panel/portion 1818 configured to receive information/data regarding the jurisdiction corresponding and/or relevant to the license, sale, and/or lease agreement, and/or the like. As noted, additional terms and/or conditions panels/portions may be added to the smart contract generation panel/portion 1800 via selection of the add terms and/or conditions element 1814. Some example terms and/or conditions panels/portions that may be added to the smart contract generation panel/portion 1800 (e.g., for generating a smart contract corresponding to a license agreement) comprise a terms of jurisdiction panel/portion 1818, a variable licensing and/or royalty fee panel, a fixed licensing and/or royalty fee panel, an exceptions terms and/or conditions panel, a most favorite nations panel/portion (e.g., configured to change the licensing and/or fee terms to a currency of a most favorite and/or preferred national currency of the licensee or licensor), a licensing terms panel, a frequency of payments panel/portion 1816, a milestone of payments panel, and/or the like. As should be understood, similar terms and/or conditions panels/portions may be available for generating a smart contract corresponding to a sale and/or lease agreement, as appropriate. In an example embodiment, the smart contract generation panel/portion 1800 may further comprise a licensor agreement element 1820 that the user (e.g., who in the illustrated embodiment is associated with the licensor entity) filling out the form of the smart contract generation panel/portion 1800 (e.g., via the IUI provided via the user interface of the user computing entity 30) can indicate that the licensor entity agrees to the terms and/or conditions provided via the smart contract generation panel/portion 1800. In an example embodiment, the smart contract generation panel/portion 1800 comprises a save as a draft element 1822, such that the information/data entered via the smart contract generation panel/portion 1800 may be saved for later editing and/or submission. In an example embodiment, the smart contract generation panel/portion 1800 comprises a create smart contract element 1824. In an example embodiment, responsive to receiving user input selecting (e.g., pressing, clicking, and/or the like) the create smart contract element 1824, the user computing entity 30 may provide (e.g., transmit) the licensing/sale agreement details provided via the smart contract generation panel/portion 1800 such that the node computing entity 200 receives the licensing/sale agreement details. In an example embodiment, the node computing entity 200 receives and processes the licensing/sale agreement details and causes the smart contract generation module 428 to generate a smart contract (e.g., computer-executable code) encoding the licensing/sale agreement details. In an example embodiment, the selection of the smart contract element 1824 may cause an indication of acceptance of the smart contract by the licensor/entity that submitted the licensing/sale agreement details to be provided to the node computing entity 200 (e.g., if the licensor agreement element 1820 is checked so as to indicate the licensor/entity submitting the licensing/sale agreement details agrees with the submitted licensing/sale agreement details).

Continuing with FIG. 17, at step/operation 1706, responsive to receiving an indication of acceptance of the smart contract 424, the smart contract 424 may be provided to the counter-party. For example, the node computing entity 200 may receive an indication (e.g., via the IUI) that one or more users that correspond to user profiles associated with a particular role and a member entity that matches and/or is related to the licensor, assignor and/or lessor of the license, sale and/or lease agreement have approved the smart contract 424. Responsive to receiving the indication that the one or more users associated with the licensor, assignor and/or lessor of the agreement have approved the smart contract, 424, the node computing entity 200 may provide the smart contract 424 to one or more users associated with the licensee, assignee and/or lessee for approval. For instance, the smart contract 424 may be provided such that a user computing entity 30 receives the smart contract 424 and may provide the smart contract 424 to a user associated with the licensee, assignee and/or lessee of a license, sale and/or lease agreement via an IUI provided by a user interface of the user computing entity 30. For example, the smart contract 424 may be provided (e.g., displayed via the IUI) for review and/or approval to one or more users that correspond to user profiles associated with a particular role and a member entity that matches and/or is related to the licensee, assignee and/or lessee of the license, sale, and/or lease agreement. For instance, the node computing entity 200 may automatically generate and add an open task for one or more users regarding review and/or approval of the smart contract 424. For example, the node computing entity 200 may add a notification to the notification panel/portion of one or more users regarding the review and/or approval of the smart contract 424.

FIG. 19 provides an example counter-party agreement notification 1900 that may be provided to a user associated with a counter-party (e.g., licensee) of a license, sale, and/or lease agreement via the IUI provided via the user interface of the user computing entity 30. In an example embodiment, the counter-party agreement notification 1900 comprises IP asset identifying information/data 1902 identifying the one or more IP assets involved in the corresponding license, sale, and/or lease agreement, view terms and conditions element 1904 configured to provide the user with access to the terms and/or conditions of the license, sale, and/or lease agreement (e.g., via the IUI), an agree element 1906, a disagree element 1908, and/or the like. In an example embodiment, responsive to receiving user input indicating user selection of the agree element 1906, the user computing entity 30 may provide (e.g., transmit) an indication of approval to the license and/or sale agreement by counter-party (e.g., licensee, assignee, and/or lessee) of the license, sale, and/or lease agreement such that the node computing entity 200 receives the indication of approval. In an example embodiment, responsive to receiving user input indicating user selection of the disagree element 1908, the user may be provided with a mechanism for providing feedback and/or to revise the terms and/or conditions of the license, sale, and/or lease agreement such that the feedback and/or revisions may be provided to the party that generated the license, sale, and/or lease agreement (e.g., the licensor, assignor, and/or lessor) for approval, further revision, further negotiation, and/or the like.

At step/operation 1708, an indication of approval from at least one user associated with the licensee, assignee and/or lessee of the license, sale, and/or lease agreement is received. For instance, one or more users associated with the licensee, assignee, and/or lessee of the license, sale, and/or lease agreement may review the smart contract 424 via the IUI and, via interaction with the IUI (e.g., by selecting, pressing, and/or the like an accept element provided via the IUI using a user input device), at least one user may approve the smart contract 424, edit the smart contract 424, and/or provide instructions for a developer to edit the smart contract 424. Thus, an indication of approval of the smart contract 424 by at least one user associated with the licensor, assignor, and/or lessor of the license, sale, and/or lease agreement and at least one user associated with the licensee, assignee, and/or lessee of the license, sale, and/or lease agreement.

At step/operation 1710, the smart contract 424 corresponding to and/or encoding the license, sale, and/or lease agreement is executed. For example, the node computing entity 200 may execute the smart contract 424 (e.g., using processing element 205, 308) to enact the license, sale, and/or lease agreement. For instance, execution of the smart contract 424 may cause one or more transactions to be implemented, completed, and/or the like. For example, the execution of the smart contract 424 may cause the ownership of an IP asset involved in the license, sale, and/or lease agreement to change from the assignor to the assignee. For instance, the execution of the smart contract 424 may cause a value indicated by the agreement to be transferred from an account (e.g., as part of an SAP or ERP system or the like), wallet, and/or the like corresponding to the licensee, assignee and/or lessee to an account, wallet, and/or the like corresponding to the licensor, assignor, and/or lessor in accordance with the license/sale/lease agreement details. For example, the value may be exchanged as a digital asset (e.g., cryptocurrency and/or digital currency) of the distributed ledger system 100, a fiat currency (e.g., via initiation of an automated clearing house (ACH) transfer), a commodity currency, services rendered and/or to be rendered, and/or the like. The one or more transactions may occur all at one time (e.g., in the same hour, day, week, month, and/or the like) or over an extended period of time (e.g., over the course of multiple years) based on the terms and/or conditions of the license and/or sale agreement. In an example embodiment, royalty payments in a license can stream to the licensor as frequently as a royalty-triggering transaction occurs, by the smart contract interacting with the accounting and payment transfer systems of the licensee. In another example embodiment, a towel dispenser can be issued a shut-down remote command when unauthorized towel rolls are used by the lessee (e.g., through detection of physical, chemical, optical, electrical or temporal (e.g., delays between orders) indicators), by the smart contract interacting with an IoT system operating the towel dispenser.

At step/operation 1712, transaction details corresponding to one or more transactions enacted via execution of the smart contract 424 by the node computing entity 200 are captured and recorded/stored to the distributed ledger. For instance, the node computing entity 200 may capture transaction details corresponding to one or more transactions enacted via the execution of the smart contract 424. In an example embodiment, the transaction details comprise information/data corresponding to and/or enacting the transaction and metadata corresponding to the information/data corresponding to and/or enacting the transaction. The node computing entity 200 may then initiate a voting/consensus process via the voting/consensus module 422 to record the transaction details to the distributed ledger. In various scenarios, a transaction may be enacted and/or completed via recording of the transaction details to the distributed ledger. For example, a transaction of value in the form of a digital asset (e.g., cryptocurrency and/or digital currency) of the distributed ledger system 100 may be enacted and/or completed by recording a transaction regarding the transaction of value to the distributed ledger. In various embodiments, the transaction details comprise a portion of the license/sale/lease agreement details and/or other information/data corresponding to the transaction such as a conveyor identifier identifying a member entity and/or other entity conveying a conveyance in the transaction, a receiver identifier identifying a member entity and/or other entity receiving the conveyance in the transaction, a description of the conveyance, a description of the manner in which the conveyance is conveyed, and/or the like. In various embodiments, recording the transaction details to the distributed ledger may further include updating a status of an IP asset by recording a status indicator in association with an IP asset identifier. For instance, the status of an IP asset may be updated to indicate that the IP asset has a corresponding grant of IP rights and is licensed, and/or the like.

At some point in time, at step/operation 1714, a request for attestation regarding the license, sale, and/or lease agreement corresponding to and/or involving the IP asset via the distributed ledger is received. For example, a user operating a user computing entity 30 may provide input via an IUI provided by the user computing entity 30 requesting attestation regarding the license, sale, and/or lease agreement corresponding to and/or involving the IP asset. The user computing entity 30 may provide (e.g., transmit) a request for an agreement attestation such that a node computing entity 200 receives the request. In various embodiments, the request for an agreement attestation may comprise an agreement reference number, the IP asset identifier, an application and/or grant number, one or more keywords, a licensee, assignee, and/or lessnee, a licensor, assignor, and/or lessor, and/or the like.

In various embodiments, the terms and/or conditions of the license, sale and/or lease agreement indicate which users will be able to view which transactions and/or which portions of which transactions. For instance, the terms and/or conditions of the license, sale, and/or lease agreement as enacted by the smart contract 424 may indicate the permissions associated with various transactions of the license and/or sale agreement and/or different portions of the license, sale, and/or lease agreement. For example, the terms and/or conditions of a license, sale, and/or lease agreement enacted by the smart contract 424 may indicate that the change of title of an IP asset from the assignor to the assignee is to be publicly available (e.g., accessible to any user) but that the value exchanged from the assignee to the assignor is to be available to only particular users (e.g., users corresponding to user profiles associated with member identifiers that match and/or are related to parties of the license and/or sale, associated with particular role indicators, and/or the like). In various embodiments, the permissioning/access control module 426 may access transaction details from the distributed ledger and provide the transaction details in accordance with the permissioning of the transactions and/or portions of the transactions in response to receiving and processing the request for an agreement attestation. For instance, the permissioning/access control module 426 may only permit and/or allow access to portions of the transactions details corresponding to transactions related to the license, sale, and/or lease agreement that provide information/data that the requesting user is permitted and/or allowed to access. For example, responsive to the request for an agreement attestation, the node computing entity 200 may access the transaction details corresponding to the agreement from the distributed ledger and provide (e.g., transmit) at least a portion of the transaction details that the requesting user is permitted and/or allowed to access such that the user computing entity 30 operated by the requesting user receives the at least a portion of the transaction details. The user computing entity 30 may receive and process the at least a portion of the transaction details provided by the node computing entity 200 and provide (e.g., display) at least a portion of the transaction details via the IUI provided by the user interface of the user computing entity 30.

g. Due Diligence Search

Various embodiments provide for performing due diligence searches via the distributed ledger. In various embodiments, the asset information/data (e.g., disclosure details, filing details, publication details, grant details, legal proceeding details, license/sale agreement details and/or corresponding transaction details, and/or the like) is captured from official documents (e.g., filing receipts, grants, and/or other documents issued by an intellectual property office), provided by trusted sources (e.g., member entities and users associated therewith), and/or verifiable. For instance, the distributed ledger may store one or more documents, hashes of one or more documents, document reference numbers and/or links, and/or the like that may be used to verify one or more instances of asset information/data stored in the distributed ledger. For example, the distributed ledger may store one or more executed assignments, hashes of one or more executed assignments, document reference numbers and/or links to one or more executed assignments, and/or the like that may be used to verify the assignment of an IP asset from an assignor to an assignee. In an example embodiment, a due diligence search may be performed via the distributed ledger to provide a complete and verifiable history and/or current status of an IP asset.

FIG. 20 provides a flowchart illustrating various processes, steps, procedures, operations, and/or the like for providing the results of a due diligence search, in accordance with an example embodiment. Starting at step/operation 2002, a due diligence search request is received. For instance, a node computing entity 200 may receive a due diligence search request. In various embodiments, the due diligence search request may comprise one or more query elements and/or one or more filter elements. For example, a user operating a user computing entity 30 may access the IUI via an Internet portal or through a dedicated application operating on the user computing entity 30. In an example embodiment, the IUI may be provided via execution of application program code corresponding to the IUI module 412 by processing device and/or element 205, 308 of a node computing entity 200 and/or the user computing entity 30. The user may operate the user computing entity 30 to provide, enter, and/or select (e.g., via a user input device) one or more query elements and/or filter elements. In various embodiments, the one or more query elements may comprise one or more IP asset types; an IP asset identifier; an IP asset title; one or more keywords corresponding to one or more IP assets; one or more dates corresponding to one or more IP assets and a corresponding type of date (disclosure date, filing date, publication date, grant date, grant expiration date, and/or the like); current owner of IP asset; a jurisdiction corresponding to the IP asset and/or a corresponding application/grant; an application and/or grant number; and/or the like. In an example embodiment, the one or more filter elements may indicate the type of asset information/data the requesting user would like to access regarding the one or more IP assets identified based on the one or more query elements. For instance, the one or more filter elements may comprise a chain of title, lien details, license/sale agreement details, legal proceeding details, status details, and/or the like.

After providing, entering, and/or selecting the one or more query elements and/or one or more filter elements, the user may select (e.g., press, click, and/or the like) a submission element. In response to the user selecting the submission element, the user computing entity 30 may generate and provide (e.g., transmit) a search request such that the node computing entity 200 receives the search request. In various embodiments, the search request comprises at least one of the one or more query elements and/or at least one of the one or more filter elements provided, entered, and/or selected by the user. In various embodiments, the user computing entity 30 and/or node computing entity 200 may store the search request in association with a timestamp indicating the date and/or time the search request was generated and/or provided. In an example embodiment, the user computing entity 30 may further provide the search request to an external computing entity 40 and the external computing entity 40 may store the search request in association with the time stamp.

FIG. 21 provides an example due diligence search interface 2100 of the IUI, according to an example embodiment. For example, a user operating a user computing entity 30 accessing an inventor interface 700 and/or a team member interface 1000 may select a due diligence search element to access the due diligence search interface 2100. In various embodiments, the due diligence search interface 2100 provides a plurality of query input elements 2102. For instance, the query input elements 2102 may comprise IP asset type selectors; a string field configured to receive one or more IP asset identifiers; a string field configured to receive one or more IP asset titles; a string field configured to receive one or more keywords corresponding to one or more IP assets; one or more selectors and/or fields configured to receive user input and/or selection of one or more dates corresponding to one or more IP assets and a corresponding type of date (disclosure date, filing date, publication date, grant date, grant expiration date, and/or the like); a string field configured to receive a name or other identifier of a current owner of IP asset(s) of interest; a string field and/or selector configured for indicating a jurisdiction corresponding to the IP asset and/or a corresponding application/grant; a string field configured to receive one or more application and/or grant numbers; and/or the like. For example, the user may interact with one or more query input elements (e.g., via the IUI and one or more input devices) to provide, enter, and/or select the one or more query elements.

In an example embodiment, the due diligence search interface further comprises one or more filter input elements 2104. For instance, a user may interact (e.g., via the IUI and one or more input devices) with the filter input elements 2104 to select types of asset information/data that the user wishes to access. For example, in an example embodiment, a filter input element 2104 may comprise selectable elements corresponding to various types of asset information/data. In an example embodiment, the filter input element 2104 comprises a selector providing a mechanism for a user to select one or more a chain of title, lien details, agreement details, legal proceeding details, status details, and/or the like.

After providing, entering, and/or selecting the one or more query elements and/or one or more filter elements, a user may select (e.g., press, click, and/or the like) the submit element 2106 to initiate the search. For instance, responsive to the user selecting the submit element 2106, the user computing entity may generate and provide a search request comprising the one or more user provided, entered, and/or selected query elements and/or filter elements.

Returning to FIG. 20, at step/operation 2004, a search of the distributed ledger is performed based on the search request. For example, the node computing entity 200 may perform a search of the distributed ledger based on one or more query elements provided in the search request. For instance, the node computing entity 200 may identify one or more IP assets corresponding to at least one of the one or more query elements provided in the search request. The node computing entity 200 may then access asset information/data from the distributed ledger corresponding to the identified IP asset(s) and based on at least one filter element provided in the search request. In various embodiments, the asset information/data accessed from the distributed ledger and/or provided in response to the search request is in accordance with the permissioning/access control rules and/or settings of the distributed ledger, IP asset(s), one or more instances of asset information/data corresponding to the identified IP asset(s), and/or the user profile corresponding to the requesting user. For example, the permissioning/access control module 426 may determine the asset information/data to be accessed from the distributed ledger corresponding to an IP asset identified based on the one or more query elements, the one or more filter elements, and the requesting user (e.g., the user identifier and/or user profile corresponding to the requesting user).

If the search request (e.g., the filter elements provided by the search request) indicates that the user would like to access asset information/data corresponding to a chain of title of an IP asset, chain of title details are provided at step/operation 2006. In various embodiments, chain of title details comprise information/data regarding ownership of the IP asset, exchange and/or change of ownership of the IP asset, and/or the like and metadata corresponding to the information/data regarding ownership of the IP asset, exchange and/or change of ownership of the IP asset, and/or the like. For instance, the node computing entity 200 may access assignment details (e.g., information/data corresponding to assignments and corresponding metadata) corresponding to the IP asset (e.g., assignment details associated with the IP asset identifier configured to identify the IP asset) from the distributed ledger. For example, the node computing entity 200 may access one or more assignment documents conveying ownership and/or partial ownership of the IP asset and provide the assignment details such that the user computing entity 30 receives the assignment details. In an example embodiment, the node computing entity 200 provides assignment details in accordance with permissioning/access control rules and/or settings of the distributed ledger, IP asset(s), one or more instances of asset information/data corresponding to the identified IP asset(s), and/or the user profile corresponding to the requesting user. In various embodiments, the assignment details may comprise one or more assignment documents, access to one or more assignment documents, images of one or more assignment documents, a location where information/data corresponding to one or more assignments may be found (e.g., reel/frame numbers of a recordation of an assignment with the U.S. Patent Trademark Office), and/or the like. In various embodiments, the chain of title details may provide a complete chain of title from the inventors to the current owner of the IP asset. In an example embodiment, the chain of title details may provide a complete and verifiable chain of title from the inventors to the current owner of the IP asset. In an example embodiment the chain of title details provide a complete chain of title from the inventors to the current owner of the IP asset along with verification documents (and/or references thereto such as reel/frame numbers of a recordation of an assignment with the U.S. Patent Trademark Office) that may be used to verify the chain of title of the IP asset. In various embodiments, the node computing entity 200 may provide the chain of title details such that the user computing entity 30 receives the chain of title details and provides (e.g., displays) the chain of titles details via an IUI provided via the user interface of the user computing entity 30. In an example embodiment, the chain of title details include lien details, which are described in more detail below.

In various embodiments, an owner of an IP asset and/or an assignee of a license and/or sale agreement involving the IP asset may purchase title insurance for the IP asset based on the chain of title details corresponding to the IP asset. For instance, the chain of title details may be determined to be sufficiently robust, complete, verified and/or verifiable to serve as the basis and/or to permit the underwriting of a title insurance policy corresponding to the IP asset. In another example embodiment, an IP asset and/or a title insurance policy corresponding to the IP asset may be used as a derivative in a swap based on the chain of title details corresponding to the IP asset. In various embodiments, the lien details, described in detail below, may also be taken into account when considering the a title insurance policy corresponding to an IP asset and/or the use of the IP asset and/or the title insurance policy corresponding to the IP asset as a derivative in a swap.

FIG. 22 provides an example view of a chain of title list view panel/portion 2200 of the IUI provided via the user interface of the user computing entity 30, according to an example embodiment. In an example embodiment, the chain of title list view panel/portion 2200 comprises IP asset identifying information/data 2202 such as the IP asset identifier, IP asset title, and/or the like. In an example embodiment, the chain of title list view panel/portion 2200 comprises an abstract 2204 and/or access to one or more claims 2206 of a grant and/or application corresponding to the IP asset identified by the IP asset identifying information/data 2202. In an example embodiment, the chain of title list view panel/portion 2200 comprises a view selector 2208. For example, the view selector 2208 may allow a user (e.g., operating the user computing entity 30) to select to view the chain of title details via a list view, a tree view, and/or the like. In an example embodiment, the chain of title list view panel/portion 2200 comprises assignment summaries 2210 provides assignment details regarding one or more assignments corresponding to the IP asset identified by the IP asset identifying information/data 2202. In an example embodiment, the assignment summaries 2210 provide a complete chain of title from the inventors of the IP asset to the current owner of the IP asset. In an example embodiment, an assignment summary 2210 may comprise a document identifier referencing a particular executed assignment document (e.g., recorded/stored to the distributed ledger, recorded/stored via an IP authority recordation program such as recorded/stored with the U.S. Patent and Trademark Office, stored by an external computing entity 40, and/or the like), an application and/or grant number, a date corresponding to the application and/or grant (e.g., a filing date, publication date, grant date, and/or the like), inventors, a jurisdiction corresponding to the assignment and/or the application and/or grant, a date of the assignment, an assignor of the assignment (e.g., original assignee), an assignee of the assignment (e.g., current assignee and/or owner), and/or the like.

In an example embodiment, the chain of title list view panel/portion 2200 shown in FIG. 22 is provided via an IUI accessed by a user corresponding to a user profile that is permitted and/or allowed to view licensing agreements and assignments corresponding to the IP asset identified by the IP asset identifying information/data 2202. Thus, the chain of title list view panel/portion 2200 comprises a view licensing agreement element 2212 and a view assignment element 2214. In various embodiments, the user (e.g., operating the user computing entity 30) may select (e.g., click, press, and/or the like) the view licensing agreement element 2212 to view licensing agreements corresponding to the IP asset identified by the IP asset identifying information/data 2202. In an example embodiment, the user (e.g., operating the user computing entity 30) may select (e.g., click, press, and/or the like) the view assignment element 2214 to view assignments corresponding to the IP asset identified by the IP asset identifying information/data 2202.

For instance, responsive to receiving input indicating that the user (e.g., operating the user computing entity 30) selected (e.g., click, press, and/or the like) the view licensing agreement element 2212, the IUI may provide the user with license agreement panel/portion 2300, as shown in FIG. 23. In an example embodiment, the license agreement panel/portion 2300 comprises IP asset identifying information/data 2202 such as the IP asset identifier, IP asset title, and/or the like, an abstract 2204 and/or access to one or more claims 2206 of a grant and/or application corresponding to the IP asset identified by the IP asset identifying information/data 2202, a view licensing agreement element 2212, a view assignment element 2214, and/or the like. In an example embodiment, the license agreement panel/portion 2300 further comprises the terms and/or conditions of the license 2302. For example, the license agreement panel/portion 2300 may comprise a human language version of the license agreement. Similarly, if a user selects the view assignment element 2214, a user may be provided with an assignment panel/portion that provides the user with a human language version of one or more executed assignment documents corresponding to the IP asset identified by the IP asset identifying information/data 2202.

For instance, responsive to receiving input indicating that the user (e.g., operating the user computing entity 30) selected (e.g., click, press, and/or the like) the tree view via the view selector 2208 (e.g., from the chain of title list view panel/portion 2200), the IUI may provide the user with a chain of title tree view panel/portion 2400, as shown in FIG. 24. In an example embodiment, the chain of title tree view panel/portion 2400 comprises IP asset identifying information/data 2202 such as the IP asset identifier, IP asset title, and/or the like, an abstract 2204 and/or access to one or more claims 2206 of a grant and/or application corresponding to the IP asset identified by the IP asset identifying information/data 2202, a view selector 2208, a view licensing agreement element 2212, a view assignment element 2214, and/or the like. In an example embodiment, the chain of title tree view panel/portion 2400 further comprises a tree view 2402 of the assignment and/or licensing agreements corresponding to the IP asset identified by the IP asset identifying information/data 2202. For example, the tree view 2402 of the assignment and/or licensing agreements may comprise one or more assignment symbols 2404 configured to represent assignments corresponding to the IP asset. An assignment symbol 2404 may provide a summary of the corresponding assignment, access to a summary of the corresponding assignment, a document identifier identifying the corresponding executed assignment, access to the corresponding executed assignment, and/or the like. In an example embodiment, the tree view 2402 of the assignment and/or licensing agreements may comprise one or more license symbols 2406 configured to represent licenses corresponding to the IP asset. A license symbol 2406 may provide a summary of the corresponding license agreement, access to a summary of the corresponding license agreement, a document identifier identifying the corresponding license agreement, access to the corresponding license agreement, and/or the like. In various embodiments, the agreement and/or license symbols 2404, 2406 are positioned in the tree view 2402 so as to represent the flow of the title from the inventors to the current owner of the IP asset. In an example embodiment, the agreement and/or license symbols 2404, 2406 are positioned in the tree view 2402 so as to indicate which assignee/owner in the chain of title licensed the IP asset (and/or portions thereof) to the licensees of any licenses represented by license symbols 2406.

For instance, responsive to receiving input indicating that the user (e.g., operating the user computing entity 30) selected (e.g., click, press, and/or the like) an assignment symbol 2404 from the chain of title tree view panel/portion 2400, the IUI may provide the user with an assignment summary pop-up 2500, as shown in FIG. 25. In an example embodiment, the assignment summary pop-up 2500 provides an assignment summary 2502 that may be similar to an assignment summary 2210. For example, an assignment summary 2502 may provide assignment details regarding the assignment corresponding to the selected assignment symbol 2404. In an example embodiment, an assignment summary 2502 may comprise a document identifier referencing a particular executed assignment document (e.g., recorded/stored to the distributed ledger, recorded/stored via an IP authority recordation program such as recorded/stored with the U.S. Patent and Trademark Office, stored by an external computing entity 40, and/or the like), an application and/or grant number, a date corresponding to the application and/or grant (e.g., a filing date, publication date, grant date, and/or the like), inventors, a jurisdiction corresponding to the assignment and/or the application and/or grant, a date of the assignment, an assignor of the assignment (e.g., original assignee), an assignee of the assignment (e.g., current assignee and/or owner), and/or the like. In an example embodiment, the assignment summary pop-up 2500 may provide the user with a view assignment element 2504 that a user may select (e.g., click, press, and/or the like) to be provided with a copy of the corresponding executed assignment document. In an example embodiment, the assignment summary pop-up 2500 may provide the user a dismiss element 2506 that the user may select (e.g., click, press, and/or the like) to return to the chain of title tree view panel/portion 2400 (e.g., to close the assignment summary pop-up 2500).

For instance, responsive to receiving input indicating that the user (e.g., operating the user computing entity 30) selected (e.g., click, press, and/or the like) a license symbol 2406 from the chain of title tree view panel/portion 2400, the IUI may provide the user with a license summary pop-up 2600, as shown in FIG. 26. In an example embodiment, the license summary pop-up 2600 provides a license summary 2602. For example, a license summary 2602 may provide license details regarding the license corresponding to the selected license symbol 2406. In an example embodiment, a license summary 2602 may comprise a document identifier referencing a particular license agreement document (e.g., recorded/stored to the distributed ledger, a date corresponding to the license agreement (e.g., an effective date, an expiration date, and/or the like), a jurisdiction corresponding to the license, a licensor of the license agreement (e.g., the owner), a licensee of the license agreement, and/or the like. In an example embodiment, the license summary pop-up 2600 may provide the user with a view license agreement element 2604 that a user may select (e.g., click, press, and/or the like) to be provided with a copy of the corresponding license agreement (e.g., a license agreement panel/portion 2300). In an example embodiment, the license summary pop-up 2600 may provide the user a dismiss element 2606 that the user may select (e.g., click, press, and/or the like) to return to the chain of title tree view panel/portion 2400 (e.g., to close the license summary pop-up 2600).

As noted above, FIG. 22 illustrates an example chain of title list view panel/portion 2200 provided via an IUI accessed by a user corresponding to a user profile that is permitted and/or allowed to view licensing agreements and assignments corresponding to the IP asset identified by the IP asset identifying information/data 2202. FIG. 27 provides an example chain of title list view panel/portion 2200' that may be provided via an IUI accessed by a user corresponding to a user profile that is not permitted and/or allowed to view licensing agreements and assignments corresponding to the IP asset identified by the IP asset identifying information/data 2202. The chain of title list view panel/portion 2200' is similar to the chain of title list view panel/portion 2200 in that the chain of title list view panel/portion 2200' may comprise IP asset identifying information/data 2202 such as the IP asset identifier, IP asset title, and/or the like, an abstract 2204 and/or access to one or more claims 2206 of a grant and/or application corresponding to the IP asset identified by the IP asset identifying information/data 2202, and assignment summaries 2210. However, rather than including view licensing agreement element 2212 and a view assignment element 2214, the chain of title list view panel/portion 2200' comprises an indication 2702 that the user is not able to view licensing agreements and/or assignments corresponding to the IP asset identified by the IP asset identifying information/data 2202. Thus, the information/data regarding the chain of title of the IP asset may be provided in accordance with permissioning/access control rules and/or settings of the distributed ledger, IP asset(s), one or more instances of asset information/data corresponding to the identified IP asset(s), and/or the user profile corresponding to the requesting user.

If the search request (e.g., the filter elements provided by the search request) indicates that the user would like to access asset information/data corresponding to liens against an IP asset, lien details are provided at step/operation 2008. For instance, the node computing entity 200 may access lien details corresponding to the IP asset (e.g., lien details and/or corresponding transaction details associated with the IP asset identifier configured to identify the IP asset) from the distributed ledger. In various embodiments, the lien details comprise information/data regarding one or more liens and metadata corresponding to the information/data regarding the one or more liens. In various embodiments, one or more liens against an IP asset may be generated and/or resolved via a license and/or sale agreement and/or a corresponding transaction. For example, the lien details may comprise instances of information/data pulled and/or accessed from transaction and/or license/sale agreement details recorded/stored to the distributed ledger. For instance, the node computing entity 200 may access transaction details corresponding to one or more transactions that generated and/or resolved one or more liens against the IP asset and provide the lien details such that the user computing entity 30 receives the lien details. In an example embodiment, the node computing entity 200 provides lien details in accordance with permissioning/access control rules and/or settings of the distributed ledger, IP asset(s), one or more instances of asset information/data corresponding to the identified IP asset(s), and/or the user profile corresponding to the requesting user. In various embodiments, the lien details may comprise information/data identifying the holder(s) of any liens against the IP asset, an indication of whether each lien against the IP asset are in force or resolved, information/data regarding how a lien is to be resolved (e.g., from terms and/or conditions of agreement details corresponding to a transaction that generated the lien against the IP asset), and/or the like. In various embodiments, the node computing entity 200 may provide the lien details such that the user computing entity 30 receives the lien details and provides (e.g., displays) the lien details via an IUI provided via the user interface of the user computing entity 30.

If the search request (e.g., the filter elements provided by the search request) indicates that the user would like to access asset information/data corresponding to licensing and/or sale agreements involving an IP asset, license/sale agreement details are provided at step/operation 2010. For example, the node computing entity 200 may access license/sale agreement details corresponding to the IP asset (e.g., license/sale agreement details and/or corresponding transaction details associated with the IP asset identifier configured to identify the IP asset) from the distributed ledger. For instance, the license/sale agreement details may comprise instances of information/data pulled and/or accessed from transaction details corresponding to one or more transactions recorded/stored to the distributed ledger and/or license/sale agreement details recorded/stored to the distributed ledger. For example, the node computing entity 200 may access transaction details corresponding to one or more transactions that were generated via the execution of a smart contract 424 that corresponds to and/or encodes the license and/or sale agreement so as to access license/sale agreement details. The node computing entity 200 may then provide the license/sale agreement details such that the user computing entity 30 receives the license/sale agreement details. In an example embodiment, the node computing entity 200 provides license/sale agreement details in accordance with permissioning/access control rules and/or settings of the distributed ledger, IP setting(s), one or more instances of asset information/data corresponding to the identified IP asset(s), and/or the user profile corresponding to the requesting user. In various embodiments, the node computing entity 200 may provide the license/sale agreement details such that the user computing entity 30 receives the license/sale agreement details and provides (e.g., displays) the license/sale agreement details (and/or at least a portion thereof) via an IUI provided via the user interface of the user computing entity 30.

If the search request (e.g., the filter elements provided by the search request) indicates that the user would like to access asset information/data corresponding to legal proceedings involving an IP asset, legal proceedings details are provided at step/operation 2012. For instance, the node computing entity 200 may access legal proceedings details corresponding to the IP asset (e.g., legal proceeding details associated with the IP asset identifier configured to identify the IP asset identified based on the one or more query elements) from the distributed ledger. The node computing entity 200 may then provide the legal proceedings details such that the user computing entity 30 receives the legal proceedings details. In an example embodiment, the node computing entity 200 provides legal proceedings details in accordance with permissioning/access control rules and/or settings of the distributed ledger, IP asset(s), one or more instances of asset information/data corresponding to the identified IP asset(s), and/or the user profile corresponding to the requesting user. In various embodiments, the node computing entity 200 may provide the legal proceedings details such that the user computing entity 30 receives the legal proceedings details and provides (e.g., displays) the legal proceedings details (and/or at least a portion thereof) via an IUI provided via the user interface of the user computing entity 30.

If the search request (e.g., the filter elements provided by the search request) indicates that the user would like to access asset information/data corresponding to a status of an IP asset, status details are provided at step/operation 2014. In various embodiments, the status details comprise information/data regarding past, current, and/or expected future statuses of an IP asset and metadata corresponding to the information/data regarding past, current, and/or expected future statuses of the IP asset. For example, the node computing entity 200 may access status indicators corresponding to the IP asset (e.g., status indicators stored in the distributed ledger in association with the IP asset identifier configured to identify the IP asset identified based on the one or more query elements) from the distributed ledger. In an example embodiment, the node computing entity 200 may also access any upcoming deadlines associated with the IP asset. For instance, if a renewal and/or expiration date for a grant corresponding to an IP asset is recorded/stored in the distributed ledger, the node computing entity 200 may also access the renewal and/or expiration date such that a future status may be indicated in addition to current and/or past statuses of the IP asset. For example, in an example embodiment, the status details may comprise a timeline of statuses indicated by the status indicators corresponding to the IP asset stored in the distributed ledger and the corresponding timestamps. For instance, the status details may comprise a disclosure date, application filing date, application publication date, grant date, one or more licensing dates, one or more sale dates, one or more legal proceeding status dates, renewal date(s), expiration date, and/or the like. The dates may include past dates and/or future dates. In an example embodiment, the status details only indicate a current status of the IP asset as indicated by the status indicator corresponding to the IP asset most recently recorded/stored to the distributed ledger. In an example embodiment, the status details include a current status of the IP asset and one or more dates in the future when the status of the IP may and/or is expected to change (e.g., the renewal dates and/or expiration date of the IP asset).

The node computing entity 200 may then provide the status details such that the user computing entity 30 receives the status details. In an example embodiment, the node computing entity 200 provides status details in accordance with permissioning/access control rules and/or settings of the distributed ledger, IP asset(s), one or more instances of asset information/data corresponding to the identified IP asset(s), and/or the user profile corresponding to the requesting user. For example, if the member identifier associated with the user profile corresponding to the requesting user does not match an identifier of the current owner of the IP asset or an entity related to the current owner of the IP asset, the returned status details may include the application filing date, publication date, grant date, sale date(s), renewal date(s), and expiration date, but may not include a disclosure date and/or licensing date(s), in an example embodiment. In various embodiments, the node computing entity 200 may provide the status details such that the user computing entity 30 receives the status details and provides (e.g., displays) the status (and/or at least a portion thereof) via an IUI provided via the user interface of the user computing entity 30.

As should be understood, in various embodiments, the node computing entity 200 may provide the asset information/data corresponding to two or more of the filter elements provided by the search request at a time (e.g., in a single data packet or file, as a data stream, and/or the like) such that the user computing entity 30 receives the asset information/data. The user computing entity 30 may then provide the asset information/data to a user via the IUI provided via a user interface of the user computing entity 30. For instance, the IUI may provide (e.g., display) the asset information/data corresponding to different filter elements in a single document (e.g., a pdf file) and/or web pages, in separate documents, on different web pages, in different tabs, in different windows, and/or the like, as appropriate for the application.

h. Technical Advantages

Various embodiments provide a variety of technical improvements. For instance, various embodiments provide a technical solution to the technical problem of managing, verifying, and providing asset information/data in a manner that provides verified and/or verifiable asset information/data in an access controlled manner. For example, various embodiments provide for the capturing of various types of asset information/data and the attestation of various types of asset information/data in a secure manner that protects the confidentiality required for various types of assets, assets of various statuses, and/or asset information/data of various types. For instance, various embodiments provide for the capturing of IP assets during the development of the IP asset (e.g., during the development process and/or prior to the submission of an IDR) and the assigning of the IP asset during the development of the IP asset (e.g., through recording of assignment agreements and/or the like). In another example, various embodiments provide for the automated generation of smart contracts configured to provide a notification of a grant corresponding to IP rights corresponding to an IP asset at one or more predetermined times ahead of a renewal deadline and/or to update the status of a grant corresponding to an IP asset and/or the IP asset in the distributed ledger when the grant is renewed and/or expires.

Various embodiments provide for the automated generation of smart contracts configured to encode and/or enact transactions, terms, and/or conditions of license, sale, and/or lease agreements corresponding to assets. Thus, various embodiments provide a complete and verifiable history of an asset, can enact transactions corresponding to the asset, and provide attestations of the asset information/data corresponding to the asset in an access controlled manner, with reduced legal risk and commercial uncertainty easing the need for material transactional costs associated with common insurance and audit demands. For example, various embodiments provide a distributed ledger system 100 that is configured to determine if a user is permitted and/or allowed to access asset information/data corresponding to an asset not merely based on the user profile corresponding to the user, but also based on a status of the asset and a type of the asset. Thus, various embodiments provide a new form of permissioning/access control of information/data stored in a distributed ledger. Various embodiments enable the capturing of IP assets earlier in the IP asset development process Various embodiments further provide an IUI configured to enable a user to provide asset information/data to be recorded/stored to the distributed ledger and/or stored in data stores external to the distributed ledger, access asset information/data recorded/stored to the distributed ledger, receive notifications regarding open tasks for the user, provide project specific pages that are used to capture IP assets during development, and/or the like.

In various embodiments, the distributed ledger system 100 provides transparent, accurate, and comprehensive asset information/data. For example, various embodiments provide enhanced traceability of assets through the asset lifecycle in the overall ecosystem. For example, various embodiments provide enhanced traceability of IP assets through the IP asset lifecycle in the overall IP ecosystem.

Various embodiments provide improved transactions, minimize reputational risk, and provide improved accessibility to IP asset information/data. Various embodiments improve the overall quality of asset information/data across the overall ecosystem and across various entities within the ecosystem. Various embodiments reduce errors and associated fees through use of verifiable asset information/data. Various embodiments record relevant and new asset information/data in the distributed ledger with a clear indication of users assigned and/or associated with each asset. Various embodiments provide for capturing asset information/data that has not been traditionally captured (e.g., the capturing of assignment data prior to the submission of an IDR corresponding to the IP asset). Various embodiments provide increased transactional efficiency by providing seamless and quick submission of documents and/or asset information/data between entities that are members of the distributed ledger system 100. For example, various embodiments reduce intermediaries and fees associated therewith. In another example, the exchange of value (e.g., corresponding to the licensing and/or sale of IP assets) between entities that are members of the distributed ledger system 100 is conducted through smart contracts, in an example embodiment. Various embodiments provide for increased collaboration between entities that are members of the distributed ledger system 100 and between users within a member entity (e.g., collaboration between users/employees/inventors and users that are part of the legal team and/or intellectual property team. For example, various embodiments encourage the improved sharing of knowledge about IP assets throughout the IP asset ecosystem.

Thus, various embodiments of the distributed ledger system 100 and the corresponding IUI provide technical improvements in the field of distributed ledger systems, IUIs, and/asset information/data capture and management.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
providing, by one or more processors, an interactive user interface (IUI), wherein the IUI is configured to interact with a user and a distributed ledger system;
receiving, by the one or more processors, user input from the user, the user input comprising an assignment agreement associated with (a) a member identifier identifying an entity within the distributed ledger system, and (b) a user identifier identifying the user within the distributed ledger system;
providing, by the one or more processors, the assignment agreement in association with the member identifier and the user identifier such that a node computing entity of the distributed ledger system causes the assignment agreement to be recorded in a distributed ledger of the distributed ledger system in association with the member identifier and the user identifier;
receiving, by the one or more processors, development information corresponding to an asset through a project specific portal accessible via the IUI and storing the development information as part of the project specific portal, wherein the project specific portal provides access to resources dedicated to a project within which the asset is being developed;
determining, by the one or more processors and based at least in part on the development information, the user identifier corresponding to the user associated with the development information;
linking, by the one or more processors, the user identifier to the development information;
providing, by one or more processors, an indication of the development information such that a node computing entity of the distributed ledger causes the indication of the development information to be recorded in a distributed ledger of the distributed ledger system in association with the member identifier, the user identifier, and an asset identifier identifying the asset associated with the development information;
extracting, by the one or more processors, innovation disclosure information comprising at least a partial description of the asset, wherein extracting the innovation disclosure information comprises analyzing the resources dedicated to the project using one or more machine learning models;
compiling, by the one or more processors, the innovation disclosure information into a document accessible through the project specific portal via the IUI; and
updating both permissions for accessing the project specific portal and a status indicator corresponding to the project.

2. The method of claim 1, wherein the development information is received prior to the submission of a related innovation disclosure report.

3. The method of claim 2, further comprising receiving user input (a) revising the innovation disclosure information, and (b) submitting the revised innovation disclosure information as the innovation disclosure report.

4. The method of claim 1, wherein the development information is part of an innovation disclosure report.

5. The method of claim 1, further comprising, responsive to receiving the development information, generating and providing an assignment document for presentation via the IUI.

6. The method of claim 1, further comprising, receiving an executed assignment document, and providing the executed assignment document such that a node computing entity causes assignment information corresponding to the executed assignment document to be recorded in a distributed ledger of the distributed ledger system.

7. The method of claim 1, wherein the development information is associated with one or more user identifiers, the one or more user identifiers each respectively identifying a user.

8. A computing system comprising a non-transitory computer readable storage medium and one or more processors, the computing system configured to:
provide an interactive user interface (IUI), wherein the IUI is configured to interact with a user and a distributed ledger system;
receive user input from the user, the user input comprising an assignment agreement associated with (a) a member identifier identifying an entity within the distributed ledger system, and (b) a user identifier identifying the user within the distributed ledger system;

provide the assignment agreement in association with the member identifier and the user identifier such that a node computing entity of the distributed ledger system causes the assignment agreement to be recorded in a distributed ledger of the distributed ledger system in association with the member identifier and the user identifier;

receive development information corresponding to an asset through a project specific portal accessible via the IUI and store the development information as part of the project specific portal, wherein the project specific portal provides access to resources dedicated to a project within which the asset is being developed;

determining, at least in part on the development information, the user identifier corresponding to the user associated with the development information;

linking, by the one or more processors, the user identifier to the development information;

provide an indication of the development information such that a node computing entity of the distributed ledger causes the indication of the development information to be recorded in a distributed ledger of the distributed ledger system in association with the member identifier the user identifier and an asset identifier identifying the asset associated with the development information;

extract innovation disclosure information comprising at least a partial description of the asset, wherein extracting the innovation disclosure information comprises analyzing the resources dedicated to the project using one or more machine learning models;

compile the innovation disclosure information into a document accessible through the project specific portal via the IUI; and updating both permissions for accessing the project specific portal and a status indicator corresponding to the project.

9. The computing system of claim 8, wherein the development information is received prior to the submission of a related innovation disclosure report.

10. The computing system of claim 9, wherein the computing system is further configured to receive user input (a) revising the innovation disclosure information, and (b) submitting the revised innovation disclosure information as the innovation disclosure report.

11. The computing system of claim 8, wherein the development information is part of an innovation disclosure report.

12. The computing system of claim 8, wherein the computing system is further configured to, responsive to receiving the development information, generate and provide an assignment document for presentation via the IUI.

13. The computing system of claim 8, wherein the computing system is further configured to receive an executed assignment document, and providing the executed assignment document such that a node computing entity causes assignment information corresponding to the executed assignment document to be recorded in a distributed ledger of the distributed ledger system.

14. The computing system of claim 8, wherein the development information is associated with one or more user identifiers, the one or more user identifiers each respectively identifying a user.

15. A computer program product comprising a non-transitory computer readable medium having computer program instructions stored therein, the computer program instructions when executed by a processor, cause the processor to:

provide an interactive user interface (IUI), wherein the IUI is configured to interact with a user and a distributed ledger system;

receive user input from the user input comprising an assignment agreement associated with (a) a member identifier identifying an entity within the distributed ledger system, and (b) a user identifier identifying the user within the distributed ledger system;

provide the assignment agreement in association with the member identifier and the user identifier such that a node computing entity of the distributed ledger system causes the assignment agreement to be recorded in a distributed ledger of the distributed ledger system in association with the member identifier and the user identifier;

receive development information corresponding to an asset through a project specific portal accessible via the IUI and store the development information as part of the project specific portal, wherein the project specific portal provides access to resources dedicated to a project within which the asset is being developed;

determining, at least in part on the development information, the user identifier corresponding to the user associated with the development information;

linking, by the one or more processors, the user identifier to the development information; and provide an indication of the development information such that a node computing entity of the distributed ledger causes the indication of the development information to be recorded in a distributed ledger of the distributed ledger system in association with the member identifier, the user identifier, and an asset identifier identifying the asset associated with the development information;

extract innovation disclosure information comprising at least a partial description of the asset, wherein extracting the innovation disclosure information comprises analyzing the resources dedicated to the project using one or more machine learning models;

compile the innovation disclosure information into a document accessible through the project specific portal via the IUI; and updating both permissions for accessing the project specific portal and a status indicator corresponding to the project.

16. The computer program product of claim 15, wherein the development information is received prior to the submission of a related innovation disclosure report.

17. The computer program product of claim 16, wherein the computer program instructions when executed by the processor, further cause the processor to receive user input (a) revising the innovation disclosure information, and (b) submitting the revised innovation disclosure information as the innovation disclosure report.

18. The method of claim 1, wherein the one or more machine learning models comprises a natural language processing engine.

* * * * *